United States Patent
Lea et al.

(10) Patent No.: US 9,609,530 B2
(45) Date of Patent: Mar. 28, 2017

(54) APERTURE-FED, STACKED-PATCH ANTENNA ASSEMBLY

(71) Applicant: CBF Networks, Inc., San Jose, CA (US)

(72) Inventors: David Andrew G. Lea, Vancouver (CA); Kevin J. Negus, Hyattville, WY (US)

(73) Assignee: CBF Networks, Inc., Santa Clara, CA (US)

( * ) Notice: Subject to any disclaimer, the term of this patent is extended or adjusted under 35 U.S.C. 154(b) by 239 days.

(21) Appl. No.: 14/559,859

(22) Filed: Dec. 3, 2014

(65) Prior Publication Data

US 2015/0084826 A1 Mar. 26, 2015

Related U.S. Application Data

(63) Continuation of application No. 14/197,158, filed on Mar. 4, 2014, now Pat. No. 8,928,542, which is a
(Continued)

(51) Int. Cl.
*H01Q 1/38* (2006.01)
*H01Q 1/48* (2006.01)
(Continued)

(52) U.S. Cl.
CPC ............ *H04W 24/02* (2013.01); *H01Q 1/246* (2013.01); *H01Q 1/50* (2013.01); *H01Q 9/0407* (2013.01);
(Continued)

(58) Field of Classification Search
CPC ..... H01Q 9/0414; H01Q 9/0407; H01Q 21/24
See application file for complete search history.

(56) References Cited

U.S. PATENT DOCUMENTS

| D307,274 S | 4/1990 | Sasaki et al. |
| D335,128 S | 4/1993 | Soren |

(Continued)

FOREIGN PATENT DOCUMENTS

| EP | 2745539 | 6/2014 |
| EP | 2767102 | 8/2014 |

(Continued)

OTHER PUBLICATIONS

Notice of Allowance in U.S. Appl. No. 14/337,744, dated Jan. 12, 2015.
(Continued)

*Primary Examiner* — Dameon E Levi
*Assistant Examiner* — Ricardo Magallanes
(74) *Attorney, Agent, or Firm* — Nixon Peabody LLP

(57) ABSTRACT

Directive gain antenna elements implemented with an aperture-fed patch array antenna assembly are described. A feed network for the aperture-fed patch array may include offset apertures and may also include meandering feed lines. Scalable aperture shapes and orientations that can be used with antennas operating at any frequency and with dual orthogonal polarizations are also disclosed. Directive gain antenna elements implemented with arrays of orthogonal reflected dipoles are also described with optimal feed networks and parasitic elements to achieve desired directive gain characteristics. Such arrayed dipole antennas feature dual orthogonal polarizations with assembly tabs that lower cost and improve reliability. Backhaul radios that incorporate said antennas are also disclosed.

66 Claims, 24 Drawing Sheets

Related U.S. Application Data continuation-in-part of application No. 13/645,472, filed on Oct. 4, 2012, now Pat. No. 8,811,365, which is a continuation of application No. 13/371,366, filed on Feb. 10, 2012, now Pat. No. 8,311,023, which is a continuation of application No. 13/212,036, filed on Aug. 17, 2011, now Pat. No. 8,238,318.

(51) Int. Cl.

| | |
|---|---|
| *H01Q 13/10* | (2006.01) |
| *H01Q 21/00* | (2006.01) |
| *H04W 24/02* | (2009.01) |
| *H01Q 9/28* | (2006.01) |
| *H01Q 21/26* | (2006.01) |
| *H01Q 1/24* | (2006.01) |
| *H01Q 21/24* | (2006.01) |
| *H01Q 21/29* | (2006.01) |
| *H01Q 25/00* | (2006.01) |
| *H01Q 9/04* | (2006.01) |
| *H01Q 21/06* | (2006.01) |
| *H01Q 21/08* | (2006.01) |
| *H01Q 1/50* | (2006.01) |
| *H04W 72/08* | (2009.01) |
| *H04W 76/04* | (2009.01) |
| *H04L 27/26* | (2006.01) |
| *H04L 25/03* | (2006.01) |

(52) U.S. Cl.
CPC .......... *H01Q 9/0414* (2013.01); *H01Q 9/285* (2013.01); *H01Q 21/0018* (2013.01); *H01Q 21/0075* (2013.01); *H01Q 21/065* (2013.01); *H01Q 21/08* (2013.01); *H01Q 21/24* (2013.01); *H01Q 21/26* (2013.01); *H01Q 21/29* (2013.01); *H01Q 25/00* (2013.01); *H01Q 25/005* (2013.01); *H04W 72/082* (2013.01); *H04W 76/046* (2013.01); *H04L 27/265* (2013.01); *H04L 2025/03414* (2013.01)

(56) References Cited

U.S. PATENT DOCUMENTS

| | | |
|---|---|---|
| D349,897 S | 8/1994 | Soren et al. |
| D373,771 S | 9/1996 | Messelhi |
| 5,579,367 A | 11/1996 | Raymond et al. |
| D376,367 S | 12/1996 | Mailandt |
| D376,600 S | 12/1996 | Vallilee et al. |
| 5,604,744 A | 2/1997 | Andersson et al. |
| 5,809,422 A | 9/1998 | Raleigh et al. |
| D401,592 S | 11/1998 | Nishimura et al. |
| 5,890,055 A | 3/1999 | Chu et al. |
| RE36,591 E | 2/2000 | Hayashi et al. |
| 6,253,060 B1 | 6/2001 | Komara et al. |
| 6,310,584 B1 | 10/2001 | Reece et al. |
| D455,420 S | 4/2002 | Arpe |
| 6,377,217 B1 | 4/2002 | Zhu et al. |
| 6,462,710 B1 * | 10/2002 | Carson ............... H01Q 21/065 343/700 MS |
| 6,463,303 B1 | 10/2002 | Zhao |
| 6,486,828 B1 | 11/2002 | Cahn et al. |
| 6,529,172 B2 | 3/2003 | Zimmerman |
| 6,912,195 B2 | 6/2005 | Vook et al. |
| D507,263 S | 7/2005 | Narita |
| 6,985,123 B2 | 1/2006 | Gottl |
| 6,995,712 B2 * | 2/2006 | Boyanov ............. H01Q 9/0435 343/700 MS |
| 7,027,837 B1 | 4/2006 | Uhlik et al. |
| 7,171,223 B2 | 1/2007 | Herscovich et al. |
| 7,221,722 B2 | 5/2007 | Thomas et al. |
| 7,260,141 B2 | 8/2007 | Bierly et al. |
| 7,280,082 B2 | 10/2007 | Theobold et al. |
| 7,292,663 B1 | 11/2007 | Van Wechel et al. |
| D565,534 S | 4/2008 | Ingalsbe et al. |
| 7,394,439 B1 | 7/2008 | Johnson et al. |
| 7,403,501 B2 | 7/2008 | Bordonaro et al. |
| D595,274 S | 6/2009 | Skottke et al. |
| D596,627 S | 7/2009 | Cho et al. |
| 7,587,177 B1 | 9/2009 | Kwong |
| 7,593,729 B2 | 9/2009 | Barak et al. |
| 7,599,290 B2 | 10/2009 | Dos Remedios et al. |
| D604,724 S | 11/2009 | Vorreiter et al. |
| 7,616,554 B2 | 11/2009 | Asai et al. |
| 7,620,370 B2 | 11/2009 | Barak et al. |
| D619,571 S | 7/2010 | Lee |
| 7,756,519 B2 | 7/2010 | Barak et al. |
| D622,256 S | 8/2010 | Lockenwitz |
| 7,848,241 B2 | 12/2010 | Natarajan et al. |
| 7,948,942 B2 | 5/2011 | Zhang et al. |
| 7,978,144 B2 | 7/2011 | Tanabe et al. |
| D643,025 S | 8/2011 | Podduturi |
| 8,078,109 B1 | 12/2011 | Mulcay |
| 8,175,535 B2 | 5/2012 | Mu |
| 8,238,318 B1 | 8/2012 | Negus |
| 8,249,527 B2 | 8/2012 | Rybicki |
| 8,300,590 B1 | 10/2012 | Negus et al. |
| 8,311,023 B1 | 11/2012 | Negus |
| 8,385,305 B1 | 2/2013 | Negus et al. |
| 8,422,540 B1 | 4/2013 | Negus et al. |
| 8,467,363 B2 | 6/2013 | Lea et al. |
| 8,487,813 B2 | 7/2013 | Leiba et al. |
| 8,502,733 B1 | 8/2013 | Negus et al. |
| 8,638,839 B2 | 1/2014 | Negus et al. |
| D704,174 S | 5/2014 | Negus et al. |
| 8,761,100 B2 | 6/2014 | Negus et al. |
| 8,811,365 B2 | 8/2014 | Negus |
| 8,824,442 B2 | 9/2014 | Lea et al. |
| 8,830,943 B2 | 9/2014 | Negus et al. |
| 8,872,715 B2 | 10/2014 | Lea et al. |
| 8,928,542 B2 | 1/2015 | Lea et al. |
| 8,942,216 B2 | 1/2015 | Negus et al. |
| 8,948,235 B2 | 2/2015 | Negus et al. |
| 9,001,809 B2 | 4/2015 | Lea et al. |
| 9,049,611 B2 | 6/2015 | Negus et al. |
| 9,055,463 B2 | 6/2015 | Negus et al. |
| 9,178,558 B2 | 11/2015 | Lea et al. |
| 9,179,240 B2 | 11/2015 | Negus et al. |
| 9,226,295 B2 | 12/2015 | Negus et al. |
| 9,282,560 B2 | 3/2016 | Negus |
| 9,350,411 B2 | 5/2016 | Lea et al. |
| 2001/0030939 A1 | 10/2001 | Vijayan et al. |
| 2001/0035844 A1 | 11/2001 | Reece et al. |
| 2001/0050927 A1 | 12/2001 | Johnson |
| 2002/0048062 A1 | 4/2002 | Sakamoto |
| 2002/0060993 A1 | 5/2002 | Dent |
| 2002/0064141 A1 | 5/2002 | Sakakura |
| 2004/0006573 A1 | 1/2004 | Takashi |
| 2004/0137924 A1 | 7/2004 | Herscovich et al. |
| 2004/0151238 A1 | 8/2004 | Masenten |
| 2004/0165650 A1 | 8/2004 | Miyazaki et al. |
| 2005/0026616 A1 | 2/2005 | Cavalli et al. |
| 2005/0068231 A1 | 3/2005 | Regnier et al. |
| 2005/0075078 A1 | 4/2005 | Makinen et al. |
| 2005/0219140 A1 | 10/2005 | Browne et al. |
| 2006/0056365 A1 | 3/2006 | Das et al. |
| 2006/0079290 A1 | 4/2006 | Seto et al. |
| 2006/0141929 A1 | 6/2006 | Lockie et al. |
| 2006/0164271 A1 | 7/2006 | Hirt et al. |
| 2006/0209746 A1 | 9/2006 | Asai et al. |
| 2006/0253526 A1 | 11/2006 | Welch et al. |
| 2006/0273952 A1 | 12/2006 | Krikorian et al. |
| 2007/0097899 A1 | 5/2007 | Larsson et al. |
| 2007/0146225 A1 | 6/2007 | Boss et al. |
| 2007/0155431 A1 | 7/2007 | Munzner et al. |
| 2007/0243878 A1 | 10/2007 | Taira et al. |
| 2007/0264935 A1 | 11/2007 | Mohebbi |
| 2008/0014948 A1 | 1/2008 | Scheinert |
| 2008/0043882 A1 | 2/2008 | Zhang et al. |
| 2008/0080364 A1 | 4/2008 | Barak et al. |
| 2008/0090575 A1 | 4/2008 | Barak et al. |
| 2008/0159212 A1 | 7/2008 | Zhang et al. |

(56) References Cited

U.S. PATENT DOCUMENTS

| | | |
|---|---|---|
| 2008/0181282 A1 | 7/2008 | Wala et al. |
| 2008/0240307 A1 | 10/2008 | Wang et al. |
| 2008/0242232 A1 | 10/2008 | Zavadsky et al. |
| 2008/0274745 A1 | 11/2008 | Barak et al. |
| 2009/0010238 A1 | 1/2009 | Barak et al. |
| 2009/0052411 A1 | 2/2009 | Leung et al. |
| 2009/0067526 A1 | 3/2009 | Ratermann et al. |
| 2009/0111463 A1 | 4/2009 | Simms et al. |
| 2009/0121963 A1 | 5/2009 | Greene |
| 2009/0143017 A1 | 6/2009 | Barak et al. |
| 2009/0252134 A1 | 10/2009 | Schlicht et al. |
| 2009/0274130 A1 | 11/2009 | Boch |
| 2009/0304055 A1 | 12/2009 | Nino et al. |
| 2009/0312022 A1 | 12/2009 | Viorel et al. |
| 2009/0323621 A1 | 12/2009 | Touboul et al. |
| 2010/0009694 A1 | 1/2010 | Fischer |
| 2010/0033396 A1 | 2/2010 | Tanabe et al. |
| 2010/0046439 A1 | 2/2010 | Chen et al. |
| 2010/0056205 A1 | 3/2010 | Fuss |
| 2010/0157970 A1 | 6/2010 | Gotman et al. |
| 2010/0202391 A1 | 8/2010 | Palanki et al. |
| 2010/0261423 A1 | 10/2010 | Stanforth et al. |
| 2010/0272006 A1 | 10/2010 | Bertrand et al. |
| 2010/0309048 A1 | 12/2010 | Polisetty et al. |
| 2011/0044279 A1 | 2/2011 | Johansson et al. |
| 2011/0070855 A1 | 3/2011 | Mariotti |
| 2011/0085525 A1 | 4/2011 | Patini |
| 2011/0103292 A1 | 5/2011 | Pasad et al. |
| 2011/0164186 A1 | 7/2011 | Sadek |
| 2011/0182174 A1 | 7/2011 | Pi et al. |
| 2011/0206155 A1 | 8/2011 | Fujimura et al. |
| 2011/0235514 A1 | 9/2011 | Huang et al. |
| 2011/0250852 A1 | 10/2011 | Greene |
| 2012/0058777 A1 | 3/2012 | Nguyen et al. |
| 2012/0063472 A1 | 3/2012 | Le Pallec et al. |
| 2012/0108284 A1 | 5/2012 | Patel et al. |
| 2012/0122477 A1 | 5/2012 | Sadek et al. |
| 2012/0135724 A1 | 5/2012 | Lewis et al. |
| 2012/0184222 A1 | 7/2012 | Seok |
| 2012/0213086 A1 | 8/2012 | Matsuura et al. |
| 2013/0089041 A1 | 4/2013 | Negus et al. |
| 2013/0089042 A1 | 4/2013 | Negus et al. |
| 2013/0089083 A1 | 4/2013 | Negus et al. |
| 2013/0095765 A1 | 4/2013 | Greene |
| 2013/0100897 A1 | 4/2013 | Negus |
| 2013/0272217 A1 | 10/2013 | Negus et al. |
| 2013/0273974 A1 | 10/2013 | Lea et al. |
| 2013/0288593 A1 | 10/2013 | Norin et al. |
| 2013/0293419 A1 | 11/2013 | Negus et al. |
| 2014/0120966 A1 | 5/2014 | Fischer et al. |
| 2014/0184455 A1 | 7/2014 | Lea et al. |
| 2014/0329562 A1 | 11/2014 | Proctor, Jr. et al. |
| 2015/0016362 A1 | 1/2015 | Negus et al. |
| 2015/0016561 A1 | 1/2015 | Negus et al. |
| 2015/0049720 A1 | 2/2015 | Negus et al. |
| 2015/0156777 A1 | 6/2015 | Negus et al. |
| 2015/0194999 A1 | 7/2015 | Lea et al. |
| 2015/0200709 A1 | 7/2015 | Negus et al. |
| 2015/0223082 A1 | 8/2015 | Negus et al. |
| 2015/0230105 A1 | 8/2015 | Negus et al. |
| 2015/0372738 A1 | 12/2015 | Negus et al. |
| 2016/0135191 A1 | 5/2016 | Negus et al. |
| 2016/0135192 A1 | 5/2016 | Negus |
| 2016/0192374 A1 | 6/2016 | Negus |
| 2016/0248467 A1 | 8/2016 | Lea et al. |
| 2016/0278093 A1 | 9/2016 | Negus et al. |
| 2016/0285532 A1 | 9/2016 | Negus et al. |
| 2016/0285611 A1 | 9/2016 | Fischer et al. |
| 2016/0316477 A1 | 10/2016 | Negus et al. |

FOREIGN PATENT DOCUMENTS

| | | |
|---|---|---|
| EP | 2839693 | 2/2015 |
| EP | 2843863 A1 | 3/2015 |
| WO | 2007146685 | 12/2007 |
| WO | 2008007375 A2 | 1/2008 |
| WO | 2011030960 | 3/2011 |
| WO | 2011080299 | 7/2011 |
| WO | WO 2013025413 A1 | 2/2013 |
| WO | WO 2013055947 A1 | 4/2013 |
| WO | WO 2013158237 A2 | 10/2013 |
| WO | WO2014040083 A2 | 3/2014 |

OTHER PUBLICATIONS

Office Action in U.S. Appl. No. 14/502,471, dated Jan. 5, 2015.
Notice of Allowance in U.S. Appl. No. 14/498,959, dated Jan. 12, 2015.
"TV Whitespaces" reuse: A detailed description of the program is provided in FCC order FCC-10-174A1, and the rules for unlicensed devices that operate in the TV bands are set forth in 47 C.P.R. §§ 15.701-.717. See Title 47—Telecommunication; Chapter I—Federal Communications Commission; Subchapter A—General, Part 15—Radio Frequency Devices, Subpart H—Television Band Devices (Available online at http://www.ecfr.gov/cgi-bin/text-idx?c=ecfr&SID=30f46f0753577b10de41d650c7adf941&rgn=div6&view=text&node=47:1.0.1.1.16.8&idno=47:1.0.1.1.16.8&idno=47, retrieved Feb. 25, 2015).
Office Action in U.S. Appl. No. 13/632,993, dated Jan. 30, 2015.
Office Action in U.S. Appl. No. 14/552,431, dated Mar. 12, 2015.
Extended European Search Report in European Patent Application No. 14177662.5, dated Feb. 3, 2015.
U.S. Appl. No. 14/632,624, filed Feb. 26, 2015.
U.S. Appl. No. 14/624,365, filed Feb. 17, 2015.
"AccessGate—RAN Optimization for Mobile Backhaul Systems," Product Data Sheet, Memotec, 2009, Montreal, Quebec, Canada, 2 pages.
"Advances in Backhaul Synchronization—Maximizing ROI," Application Brief, Symmetricom Inc., 2008, 6 pages.
"Carrier Ethernet Services Overview," Presentation, MEF, Aug. 2008, 32 pages.
"Clock Distribution and Synchronization over Ethernet: IEEE1588v2 and SyncE," Presentation, VITESSE, Sep. 2009, 9 pages.
"Clock Synchronization in Carrier Ethernet Networks—Synchronous Ethernet and 1588v2 on Juniper Networks MX Series 3D Universal Edge Routers," White Paper, Juniper Networks, Inc., 2010, 11 pages.
"DAN2400-PTP—Open SoC Platform for Sub-6GHz Wireless Point-to-Point Systems," DesignArt Networks, Jul. 2008, 2 pages.
"Doubling Capacity in Wireless Channels," Provigent Inc., 2008, 3 pages.
"Evolving Microwave Mobile Backhaul for Next-Generation Networks," White Paper, NEC Corp., Feb. 2008, 4 pages.
"GainSpan GS1011M Low Power Wi-Fi® Module Family," Product Brief—Preliminary, GainSpan Corp., 2009, 2 pages.
"HMC536MS8G / 536MS8GE—GaAs MMIC Positive Control T/R Switch, DC—6GHz," Data Sheet, Switches—SMT, Hittite Microwave Corp., 2008, pp. 10.295-10.299.
"IEEE 1588v2 (Precision Time Protocol) Testing," Application Note, IXIA, Dec. 2009.
"Information Technology—Open Systems Interconnection—Basic Reference Model: The Basic Model," International Standard, ISO/IEC 7498-1, Second Edition Nov. 15, 1994, Corrected and Reprinted Jun. 15, 1996, 68 pages.
"MGA-21108—Broadband Fully Integrated Matched Low-Noise Amplifier MMIC," Data Sheet, Avago Technologies, Aug. 2009, 21 pages.
"MGA-22003—2.3-2.7 GHz 3×3mm WiMAX/WiBro and WiFi Linear Amplifier Module," Data Sheet, Avago Technologies, Mar. 2010, 15 pages.
"MGA-23003—3.3-3.8 GHz 3×3mm WiMAX Power Amplifier," Data Sheet, Avago Technologies, Mar. 2010, 16 pages.
"MGA-25203—5.1-5.9GHz 3×3mm WiFi and WiMAX Power Amplifier," Data Sheet, Avago Technologies, Mar. 2010, 14 pages.
"MGA-43328—High Linearity Wireless Data Power Amplifier for 2.5 to 2.7 GHz Applications," Application Note, Avago Technologies, Apr. 2010, 10 pages.

(56) References Cited

OTHER PUBLICATIONS

"MGA-43328—(2.5-2.7) GHz 29dBm High Linearity Wireless Data Power Amplifier," Data Sheet, Avago Technologies, Mar. 2010, 19 pages.
"MGA-645T6—Low Noise Amplifier with Bypass/Shutdown Mode in Low Profile Package," Data Sheet, Avago Technologies, Nov. 2009, 16 pages.
"MGA-655T6—Low Noise Amplifier with Bypass Mode in Low Profile Package," Data Sheet, Avago Technologies, Nov. 2009, 14 pages.
"MGA-675T6—Low Noise Amplifier with Shutdown Mode in Low Profile Package for 4.9-6 GHz Application," Data Sheet, Avago Technologies, Nov. 2009, 16 pages.
"Part 11: Wireless LAN Medium Access Control (MAC) and Physical Layer (PHY) Specifications—Amendment 5: Enhancements for Higher Throughput," IEEE Standard for Information Technology—Telecommunications and Information Exchange Between Systems—Local and Metropolitan Area Networks—Specific Requirements, IEEE Computer Society, IEEE Std 802.11, Sep. 2009, 536 pages.
"Part 11: Wireless LAN Medium Access Control (MAC) and Physical Layer (PHY) Specifications," IEEE Standard for Information Technology—Telecommunications and Information Exchange Between Systems—Local and Metropolitan Area Networks—Specific requirements, IEEE Computer Society, IEEE Std 802.11, Jun. 2007, 1233 pages.
"Part 16: Air Interface for Fixed and Mobile Broadband Wireless Access Systems—Amendment 2: Physical and Medium Access Control Layers for Combined Fixed and Mobile Operation in Licensed Bands and Corrigendum 1," IEEE Standard for Local and Metropolitan Area Networks, IEEE Computer Society and the IEEE Microwave Theory and Techniques Society, IEEE Std 802.16c-2005 and IEEE Std 802.16-2004/CorI-2005, Feb. 2006, 864 pages.
"Part 16: Air Interface for Fixed Brodband Wireless Access Systems," IEEE Standard for Local and Metropolitan Area Networks, IEEE Std 802.16, IEEE Computer Society and the IEEE Microwave Theory and Techniques Society, Oct. 2004, 895 pages.
"PC203-PC203-10—Basestation PHY Processor," Wireless Communications Processors, Product Brief, picoChip Flexible Wireless, 2008, 4 pages.
"SC-FDMA—Single Carrier FDMA in LTE," Data Sheet, IXIA Corp., Nov. 2009, 16 pages.
"Spectrum Sharing: The Promis and the Reality", RYSAVY Research, LLC, White Paper, Jul. 2012, pp. 1-12, available at http://www.rysavy.com.
"Technical Report: Electromagnetic Compatibility and Radio Spectrum Matters (ERM); System Reference Document (SRdoc); Mobile Broadband Services in the 2 300 MHz-2 400 MHz frequency band under Licensed Shared Access Regime", ETSI TR 103 113 V1.1.1 (Jul. 2013), European Telecommunications Standards Institute, France, 2013, pp. 1-37.
"Understanding MPLS-TP and Its Benefits," White Paper, Cisco Systems Inc., 2009, 6 pages.
"WiMAX/WiBro RF MxFE Transceiver, AD9352," Data Sheet, Analog Devices, 2007.
"WiMAX RF MxFE Transceiver, AD9352-5," Data Sheet, Analog Devices, 2008.
"WiMAX RF MxFE Transceiver, AD9353," Data Sheet, Analog Devices, 2007.
"WiMAX/WiBro RF MxFE MISO Transceiver, AD9354," Data Sheet, Analog Devices, 2008-2009.
"WiMAX/WiBro RF MxFE MISO Transceiver, AD9355," Data Sheet, Analog Devices, 2008-2009.
"WiMAX/BWA/WiBRO/LTE RF MxFE 2×2 MIMO Transceiver, AD9356," Data Sheet, Analog Devices, 2010.
"WiMAX/BWA/LTE RF MxFE 2×2 MIMO Transceiver, AD9357," Data Sheet, Analog Devices, 2010.

Baum, D.S. et al., "An Interim Channel Model for Beyond-3G Systems—Extending the 3GPP Spatial Channel Model (SCM)," IEEE, Vehicular Technology Conference, vol. 5, 2005, pp. 3132-3136.
Beller, D. et al., "MPLS-TP—The New Technology for Packet Transport Networks," Alcatel-Lucent Deutschland AG, Stuttgart, 2009, 11 pages.
Chundury, R., "Mobile Broadband Backhaul: Addressing the Challenge," Planning Backhaul Networks, Ericsson Review, 2008, pp. 4-9.
Conrat, J-M. et al., "Typical MIMO Propagation Channels in Urban Macrocells at 2 GHz," EURASIP Journal on Wireless Communications and Networking, vol. 2007, Iss. 2, Jan. 2007, 9 pages.
Coon, J.P. et al., "Adaptive Frequency-Domain Equalization for Single-Carrier Multiple-Input Multiple-Output Wireless Transmissions," IEEE Transactions on Signal Processing, vol. 53, No. 8, Aug. 2005, pp. 3247-3256.
Coon, J.P. et al., "An Investigation of MIMO Single-Carrier Frequency-Domain MMSE Equalization," Centre for Communications Research, University of Bristol, Sep. 2002, 4 pages.
Durgin, G.D., "Wideband Measurements of Angle and Delay Dispersion for Outdoor and Indoor Peer-to-Peer Radio Channels at 1920 MHz," IEEE Transactions on Antennas and Propagation, vol. 51. No. 5, May 2003, pp. 936-944.
Falconer, D.D. et al., "Broadband Wireless Using Single Carrier and Frequency Domain Equalization," Invited Overview Paper for WPMC '02, Honolulu, Oct. 2002, 10 pages.
Falconer, D.D. et al., "Frequency Domain Equalization for Single-Carrier Broadband Wireless Systems," Wideband Wireless Access Technologies to Broadband Internet, IEEE Communications Magazine, Apr. 2002, pp. 58-66.
Frost, D. et al., "MPLS Transport Profile Data Plane Architecture," Internet Engineering Task Force, RFC 5960, Aug. 2010, 16 pages.
Gao, S.C. et al., "Dual-polarized slot coupled planar antenna with wide bandwidth," IEEE Trans. Antennas and Propagation, vol. 51, No. 3, pp. 441-448, 2003.
Garner, G.M., "IEEE 1588 Version 2," ISPCS Ann Arbor '08, Sep. 2008, 89 pages.
Hentschel, T. et al., "The Digital Front-End—Bridge Between RF and Baseband-Processing," Software Defined Radio: Enabling Technologies by Walter Tuttlebee, Chapter 6, Jun. 2002, 58 pages.
Lashkarian, N., "Reconfigurable Digital Front-end Architecture for Wireless Base-Station Transmitters: Analysis, Design and FPGA Implementation," Seminar Presentation, University of California, Berkeley, Apr. 2006, 86 pages.
Nathanzon, G. et al., "Cost-Effective Backhaul Alternatives for WiMAX Networks: Challenges & Solutions," Provigent Inc., Jun. 2008, 16 pages.
Padhi, S.K, et al., "A Dual Polarized Aperture Coupled Circular Patch Antenna Using a C-Shaped Coupling Slot," IEEE Transactions on Antennas and Propagation, vol. 51, No. 12, Dec. 2003, pp. 3295-3298.
Pancaldi, F. et al., "Single-Carrier Frequency Domain Equalization—A Focus on Wireless Applications," IEEE Signal Processing Magazine, Sep. 2008, 22 pages.
Pozar, D.M. et al., "Improved coupling for aperature-coupled microstrip antennas," Electron. Lett., vol. 27, No. 13, pp. 1129-1131, 1991.
Pozar, D.M., "A microstip antenna aperture-coupled to a microstripline," Electron. Lett., vol. 21, No. 2, pp. 49-50, 1985.
Sharony, J., "Introduction to Wireless MIMO—Theory and Applications," CEWIT—Center of Excellence in Wireless and Informational Technology, Stony Brook University, IEEE LI, Nov. 15, 2006, 63 pages.
Soffer, R., "Microwave Wireless Backhaul for LTE Networks—Meeting the Rapidly-Increasing Demand for Mobile Data," Provigent Inc., Jan. 2010, 18 pages.
Soffer, R., "ProviBand—Next Generation Wireless Backhaul Technology," Technical White Paper, Provigent Inc., Jan. 2006, 13 pages.
Stuber, G.L. et al., "Broadband MIMO-OFDM Wireless Communications," Invited Paper, Proceedings of the IEEE, vol. 92, No. 2, Feb. 2004, pp. 271-294.

(56) References Cited

OTHER PUBLICATIONS

Tubbax, J., "OFDM Versus Single Carrier with Cyclic Prefix: A System-based Comparison for Binary Modulation," IMEC, Belgium, Jan. 2011, 4 pages.
Notice of Allowance in U.S. Appl. No. 13/212,036, dated Apr. 3, 2012.
Office Action in U.S. Appl. No. 13/271,051, dated Jun. 14, 2013.
Amendment and Response to Office Action in U.S. Appl. No. 13/271,051, filed Dec. 16, 2013.
Notice of Allowance in U.S. Appl. No. 13/271,051, dated Feb. 3, 2014.
Office Action in U.S. Appl. No. 13/371,346, dated Sep. 26, 2012.
Amendment and Response to Office Action in U.S. Appl. No. 13/371,346, filed Dec. 21, 2012.
Applicant Initiated Interview Summary in U.S. Appl. No. 13/371,346, filed Jan. 10, 2013.
Supplemental Amendment and Response to Office Action in U.S. Appl. No. 13/371,346, filed Jan. 25, 2013.
Notice of Allowance in U.S. Appl. No. 13/371,346, dated Apr. 2, 2013.
Office Action in U.S. Appl. No. 13/371,366, dated Apr. 19, 2012.
Amendment and Response to Office Action in U.S. Appl. No. 13/371,366, dated Jul. 19, 2012.
Notice of Allowance in U.S. Appl. No. 13/371,366, dated Sep. 21, 2012.
Office Action in U.S. Appl. No. 13/415,778, mailed Apr. 26, 2012.
Applicant Initiated Interview Summary in U.S. Appl. No. 13/415,778, filed Jul. 5, 2012.
Amendment and Response to Office Action in U.S. Appl. No. 13/415,778, dated Jul. 26, 2012.
Notice of Allowance in U.S. Appl. No. 13/415,778, mailed Sep. 17, 2012.
Office Action in U.S. Appl. No. 13/448,294, dated on Jun. 21, 2012.
Amendment and Response to Office Action in U.S. Appl. No. 13/448,294, dated Sep. 21, 2012.
Notice of Allowance in U.S. Appl. No. 13/448,294, dated Oct. 23, 2012.
Notice of Allowance in U.S. Appl. No. 13/536,927, dated Feb. 19, 2013.
Notice of Allowance in U.S. Appl. No. 29/429,634 dated Dec. 5, 2013.
Office Action in U.S. Appl. No. 13/632,961, dated May 6, 2014.
Notice of Allowance in U.S. Appl. No. 13/633,028, dated May 1, 2014.
Office Action in U.S. Appl. No. 13/645,472, dated May 24, 2013.
Amendment and Response to Office Action in U.S. Appl. No. 13/645,472, dated Nov. 25, 2013.
Supplemental Amendment and Response to Office Action in U.S. Appl. No. 13/645,472, dated Jan. 27, 2014.
Notice of Allowance in U.S. Appl. No. 13/645,472, dated Apr. 4, 2014.
Notice of Allowance in U.S. Appl. No. 13/748,544, dated Aug. 15, 2014.
Notice of Allowance in U.S. Appl. No. 13/898,429, dated Apr. 8, 2014.
Office Action in U.S. Appl. No. 13/934,175, dated Oct. 15, 2014.
Notice of Allowance in U.S. Appl. No. 14/197,158, dated Sep. 3, 2014.
Examiner Initiated Interview Summary in U.S. Appl. No. 14/197,158, filed Sep. 3, 2014.
Office Action in U.S. Appl. No. 14/151,190 dated Mar. 28, 2014.
Applicant Initiated Interview Summary in U.S. Appl. No. 14/151,190, dated May 29, 2014.
Amendment and Response to Office Action in U.S. Appl. No. 14/151,190, dated Jun. 30, 2014.
Examiner Initiated Interview Summary in U.S. Appl. No. 14/151,190, dated Oct. 14, 2014.
Notice of Allowance in U.S. Appl. No. 14/151,190, dated Oct. 14, 2014.
Office Action in U.S. Appl. No. 14/098,456 dated Apr. 4, 2014.
Amendment and Response to Office Action in U.S. Appl. No. 14/098,456, dated Jul. 7, 2014.
Amendment and Response to Office Action in U.S. Appl. No. 14/098,456, dated Jul. 15, 2014.
Office Action in U.S. Appl. No. 14/098,456, dated Jul. 30, 2014.
Amendment and Response to Office Action in U.S. Appl. No. 14/098,456, dated Sep. 26, 2014.
Notice of Allowance in U.S. Appl. No. 14/098,456, dated Oct. 8, 2014.
Examiner Initiated Interview Summary in U.S. Appl. No. 14/199,734, dated Jun. 13, 2014.
Notice of Allowance in U.S. Appl. No. 14/199,734, dated Jun. 13, 2014.
Notice of Allowance in U.S. Appl. No. 14/336,958, dated Nov. 26, 2014.
Applicant Response and Amendment in U.S. Appl. No. 14/337,744, dated Oct. 6, 2014.
Preliminary Amendment and Response in U.S. Appl. No. 14/337,744, dated Aug. 20, 2014.
International Search Report and Written Opinion for PCT Application No. PCT/US2012/049948 dated Oct. 22, 2012.
International Search Report and Written Opinion for PCT Application No. PCT/US2012/059797 dated Jan. 2, 2013.
International Search Report and Written Opinion for PCT Application No. PCT/US2013/029731 dated May 13, 2013.
International Search Report and Written Opinion in PCT Application No. PCT/US2013/48782, dated Jul. 29, 2013.
U.S. Appl. No. 14/098,456, filed Dec. 5, 2013.
U.S. Appl. No. 14/337,744, filed Jul. 22, 2014.
U.S. Appl. No. 14/502,471, filed Sep. 30, 2014.
U.S. Appl. No. 14/498,959, filed Sep. 26, 2014.
U.S. Appl. No. 14/552,431, filed Nov. 24, 2014.
U.S. Appl. No. 14/572,725, filed Dec. 16, 2014.
U.S. Appl. No. 14/535,972, filed Nov. 7, 2014.
Amendment and Response to Office Action in U.S. Appl. No. 13/632,993, dated Jul. 27, 2015.
Notice of Allowance in U.S. Appl.. No. 13/632,993, dated Aug. 21, 2015.
Applicant Response and Amendment in U.S. Appl. No. 14/502,471, dated Jul. 2, 2015.
Office Action in U.S. Appl. No. 14/502,471, dated Jul. 22, 2015.
Office Action in U.S. Appl. No. 14/552,431, dated Jul. 14, 2015.
Applicant Response and Amendment in U.S. Appl. No. 14/552,431, dated Aug. 10, 2015.
Notice of Allowance in U.S. Appl. No. 14/552,431, dated Aug. 19, 2015.
Office Action in U.S. Appl. No. 14/686,674, dated Jul. 23, 2015.
Amendment and Response to Office Action in U.S. Appl. No. 14/686,674, dated Aug. 31, 2015.
Notice of Allowance in U.S. Appl. No. 14/686,674, dated Oct. 5, 2015.
Office Action in U.S. Appl. No. 14/688,550, dated Jul. 29, 2015.
Amendment and Response to Office Action in U.S. Appl. No. 14/688,550, dated Oct. 29, 2015.
Notice of Allowance in U.S. Appl. No. 14/688,550, dated Dec. 4, 2015.
Notice of Allowance in U.S. Appl. No. 14/837,797, dated Dec. 30, 2015.
Notice of Allowance in U.S. Appl. No. 14/839,018, dated Dec. 21, 2015.
Extended European Search Report in European Patent Application No. 12824072.8, dated Jul. 15, 2015.
Notice of Allowance in U.S. Appl. No. 13/934,175, dated May 28, 2015.
Partial European Search Report in European Patent Application No. 12839752.8, dated Jun. 16, 2015.
Notice of Allowance in U.S. Appl. No. 14/632,624, dated May 26, 2015.
U.S. Appl. No. 14/686,674, filed Apr. 14, 2015.
U.S. Appl. No. 14/688,550, filed Apr. 16, 2015.
Notice of Allowance in U.S. Appl. No. 14/950,354, dated Feb. 17, 2016.

(56) References Cited

OTHER PUBLICATIONS

Notice of Allowance in U.S. Appl. No. 14/988,578, dated Mar. 30, 2016.
Notice of Allowance in U.S. Appl. No. 15/060,013, dated Jun. 9, 2016.
Notice of Allowance in U.S. Appl. No. 15/084,867, dated Oct. 6, 2016.
Notice of Allowance in U.S. Appl. No. 15/142,793, dated Oct. 11 2016.
Notice of Allowance in U.S. Appl. No. 15/165,504, dated Sep. 30, 2016.
Notice of Allowance in U.S. Appl. No. 15/203,658, dated Oct. 7, 2016.

* cited by examiner

APERTURE-FED, STACKED-PATCH ANTENNA ASSEMBLY

CROSS-REFERENCE TO RELATED APPLICATIONS

The present application is a continuation application of U.S. patent application Ser. No. 14/197,158, filed on Mar. 4, 2014, which is a continuation-in-part application of U.S. patent application Ser. No. 13/645,472, filed on Oct. 4, 2012, now U.S. Pat. No. 8,811,365, which is a continuation application of U.S. patent application Ser. No. 13/371,366, filed on Feb. 10, 2012, now U.S. Pat. No. 8,311,023, which is a continuation application of U.S. patent application Ser. No. 13/212,036, filed on Aug. 17, 2011, now U.S. Pat. No. 8,238,318, the disclosures of which are hereby incorporated herein by reference in their entireties.

The present application is also related to U.S. patent application Ser. No. 13/898,429, filed May 20, 2013 and U.S. Pat. No. 8,467,363, the disclosures of which are hereby incorporated herein by reference in their entirety.

The present application is also related to U.S. patent application Ser. No. 13/271,051, filed Oct. 11, 2011 and U.S. Pat. No. 8,300,590, the disclosures of which are hereby incorporated herein by reference in their entirety.

The present application is also related to U.S. patent application Ser. No. 14/108,200, filed Dec. 16, 2013 and U.S. Pat. Nos. 8,638,839 and 8,422,540, the disclosures of which are hereby incorporated herein by reference in their entirety.

BACKGROUND

1. Field

The present disclosure relates generally to data networking and in particular to a backhaul radio for connecting remote edge access networks to core networks.

2. Related Art

Data networking traffic has grown at approximately 100% per year for over 20 years and continues to grow at this pace. Only transport over optical fiber has shown the ability to keep pace with this ever-increasing data networking demand for core data networks. While deployment of optical fiber to an edge of the core data network would be advantageous from a network performance perspective, it is often impractical to connect all high bandwidth data networking points with optical fiber at all times. Instead, connections to remote edge access networks from core networks are often achieved with wireless radio, wireless infrared, and/or copper wireline technologies.

Radio, especially in the form of cellular or wireless local area network (WLAN) technologies, is particularly advantageous for supporting mobility of data networking devices. However, cellular base stations or WLAN access points inevitably become very high data bandwidth demand points that require continuous connectivity to an optical fiber core network.

When data aggregation points, such as cellular base station sites, WLAN access points, or other local area network (LAN) gateways, cannot be directly connected to a core optical fiber network, then an alternative connection, using, for example, wireless radio or copper wireline technologies, must be used. Such connections are commonly referred to as "backhaul."

Many cellular base stations deployed to date have used copper wireline backhaul technologies such as T1, E1, DSL, etc. when optical fiber is not available at a given site. However, the recent generations of HSPA+ and LTE cellular base stations have backhaul requirements of 100 Mb/s or more, especially when multiple sectors and/or multiple mobile network operators per cell site are considered. WLAN access points commonly have similar data backhaul requirements. These backhaul requirements cannot be practically satisfied at ranges of 300 m or more by existing copper wireline technologies. Even if LAN technologies such as Ethernet over multiple dedicated twisted pair wiring or hybrid fiber/coax technologies such as cable modems are considered, it is impractical to backhaul at such data rates at these ranges (or at least without adding intermediate repeater equipment). Moreover, to the extent that such special wiring (i.e., CAT 5/6 or coax) is not presently available at a remote edge access network location; a new high capacity optical fiber is advantageously installed instead of a new copper connection.

Rather than incur the large initial expense and time delay associated with bringing optical fiber to every new location, it has been common to backhaul cell sites, WLAN hotspots, or LAN gateways from offices, campuses, etc. using microwave radios. An exemplary backhaul connection using the microwave radios 132 is shown in FIG. 1. Traditionally, such microwave radios 132 for backhaul have been mounted on high towers 112 (or high rooftops of multi-story buildings) as shown in FIG. 1, such that each microwave radio 132 has an unobstructed line of sight (LOS) 136 to the other. These microwave radios 132 can have data rates of 100 Mb/s or higher at unobstructed LOS ranges of 300 m or longer with latencies of 5 ms or less (to minimize overall network latency).

Traditional microwave backhaul radios 132 operate in a Point to Point (PTP) configuration using a single "high gain" (typically >30 dBi or even >40 dBi) antenna at each end of the link 136, such as, for example, antennas constructed using a parabolic dish. Such high gain antennas mitigate the effects of unwanted multipath self-interference or unwanted co-channel interference from other radio systems such that high data rates, long range and low latency can be achieved. These high gain antennas however have narrow radiation patterns.

Furthermore, high gain antennas in traditional microwave backhaul radios 132 require very precise, and usually manual, physical alignment of their narrow radiation patterns in order to achieve such high performance results. Such alignment is almost impossible to maintain over extended periods of time unless the two radios have a clear unobstructed line of sight (LOS) between them over the entire range of separation. Furthermore, such precise alignment makes it impractical for any one such microwave backhaul radio to communicate effectively with multiple other radios simultaneously (i.e., a "point to multipoint" (PMP) configuration).

In wireless edge access applications, such as cellular or WLAN, advanced protocols, modulation, encoding and spatial processing across multiple radio antennas have enabled increased data rates and ranges for numerous simultaneous users compared to analogous systems deployed 5 or 10 years ago for obstructed LOS propagation environments where multipath and co-channel interference were present. In such systems, "low gain" (usually <6 dBi) antennas are generally used at one or both ends of the radio link both to advantageously exploit multipath signals in the obstructed LOS environment and allow operation in different physical orientations as would be encountered with mobile devices. Although impressive performance results have been achieved for edge access, such results are generally inadequate for emerging backhaul requirements of data rates of 100 Mb/s or higher, ranges of 300 m or longer in obstructed LOS conditions, and latencies of 5 ms or less.

In particular, "street level" deployment of cellular base stations, WLAN access points or LAN gateways (e.g., deployment at street lamps, traffic lights, sides or rooftops of single or low-multiple story buildings) suffers from problems because there are significant obstructions for LOS in urban environments (e.g., tall buildings, or any environments where tall trees or uneven topography are present).

FIG. 1 illustrates edge access using conventional unobstructed LOS PTP microwave radios 132. The scenario depicted in FIG. 1 is common for many $2^{nd}$ Generation (2G) and $3^{rd}$ Generation (3G) cellular network deployments using "macrocells". In FIG. 1, a Cellular Base Transceiver Station (BTS) 104 is shown housed within a small building 108 adjacent to a large tower 112. The cellular antennas 116 that communicate with various cellular subscriber devices 120 are mounted on the towers 112. The PTP microwave radios 132 are mounted on the towers 112 and are connected to the BTSs 104 via an nT1 interface. As shown in FIG. 1 by line 136, the radios 132 require unobstructed LOS.

The BTS on the right 104a has either an nT1 copper interface or an optical fiber interface 124 to connect the BTS 104a to the Base Station Controller (BSC) 128. The BSC 128 either is part of or communicates with the core network of the cellular network operator. The BTS on the left 104b is identical to the BTS on the right 104a in FIG. 1 except that the BTS on the left 104b has no local wireline nT1 (or optical fiber equivalent) so the nT1 interface is instead connected to a conventional PTP microwave radio 132 with unobstructed LOS to the tower on the right 112a. The nT1 interfaces for both BTSs 104a, 104b can then be backhauled to the BSC 128 as shown in FIG. 1.

In the conventional PTP radios 132, as described in greater detail in U.S. patent application Ser. No. 13/645,472 and incorporated herein, the antenna is typically of very high gain such as can be achieved by a parabolic dish so that gains of typically >30 dBi (or even sometimes >40 dBi), can be realized. Such an antenna usually has a narrow radiation pattern in both the elevation and azimuth directions. The use of such a highly directive antenna in a conventional PTP radio link with unobstructed LOS propagation conditions ensures that a modem within such radios has insignificant impairments at the receiver due to multipath self-interference and further substantially reduces the likelihood of unwanted co-channel interference due to other nearby radio links. However, the conventional PTP radio on a whole is completely unsuitable for obstructed LOS or PMP operation.

In U.S. patent application Ser. No. 13/645,472 and the related applications and patents summarized above, a novel Intelligent Backhaul Radio (or "IBR") suitable for obstructed LOS and PMP or PTP operation is described in great detail in various embodiments of those inventions. Additionally, in U.S. patent application Ser. No. 13/898,429, certain exemplary antenna assemblies were described. Applicants have identified herein additional improvements to antenna assembly designs for both patch-based and dipole-based radiating element structures.

Aperture-fed antennas have been previously known in the art. For example, in D. M. Pozar, "A microstrip antenna aperture-coupled to a microstripline," *Electron. Lett.*, vol. 21, no. 2, pp. 49-50, 1985, and in D. M. Pozar and S. D. Targonski, "Improved coupling for aperture-coupled microstrip antennas," *Electron. Lett.*, vol. 27, no. 13, pp. 1129-1131, 1991, an aperture-fed patch antenna was disclosed. Additionally, in S. C. Gao et al., "Dual-polarized slot-coupled planar antenna with wide bandwidth," *IEEE Trans. Antennas and Propagation*, vol. 51, no. 3, pp. 441-448, 2003, a dual-polarization aperture-fed antenna was disclosed. However, the conventional art is completely unsuitable for application in an IBR. For example, the conventional aperture fed antennas have insufficient antenna gain for IBR directive gain antenna elements, have unacceptable coupling efficiencies, have unacceptable backwards facing radiation and are impractical to manufacture cost-effectively and reliably.

SUMMARY

The following summary of the invention is included in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

Some embodiments of the claimed inventions are directed to an improved antenna assembly including an array of resonant radiating patch antenna elements and transmission line feed networks that are electromagnetically coupled using apertures. Other embodiments of the claimed inventions are directed to an improved antenna assembly including an array of dipole antenna elements and transmission line feed networks that are conductively connected at junctions formed with substrate tabs and cutouts. Backhaul radios that include the improved antenna assemblies are also disclosed.

According to an aspect of the invention, an antenna assembly is provided that includes a first substrate comprising a plurality of conductive patch elements; a second substrate comprising a first layer with at least a conductive ground plane and a plurality of pairs of apertures, wherein the number of pairs of apertures is equal to the number of conductive patch elements, and a second layer with at least a first transmission line feed network coupled to a first feed point and a second transmission line feed network coupled to a second feed point; and a spacer interposed between the first substrate and the second substrate, the spacer comprising a dielectric material and at least one spacer opening in the dielectric material, wherein the dielectric material is absent within the at least one spacer opening; wherein the first transmission line feed network overlaps a first aperture of each pair of the plurality of pairs of apertures and the second transmission line feed network overlaps a second aperture of each pair of the plurality of pairs of apertures; wherein the first aperture of each pair of the plurality of pairs of apertures electromagnetically couples the first transmission line feed network and the second aperture of each pair of the plurality of pairs of apertures electromagnetically couples the second transmission line feed network to a respective one of the plurality of conductive patch elements; and wherein the first aperture of each pair of the plurality of pairs of apertures is orthogonal to the second aperture of each pair of the plurality of pairs of apertures.

The first substrate may be a printed circuit board. The second substrate may be a printed circuit board. The second substrate may be a printed circuit board having more than two layers.

The first transmission line feed network and the second transmission line feed network each may include striplines. The first transmission line feed network and the second transmission line feed network each may include microstrip lines. The first feed point and the second feed point may each be coupled to respective components on an outside layer of the second substrate. The respective components may be at least one of an RF bandpass filter or a low noise amplifier within a receiver.

The at least one spacer opening may extend beyond a projected area of one or more of the plurality of conductive patch elements by at least a distance equal to a thickness of the spacer.

The first aperture of each pair of the plurality of pairs of apertures may excite a respective resonant radiating cavity formed between each respective one of the plurality of conductive patch elements and the conductive ground plane in an electromagnetic mode corresponding to a vertical polarization far-field pattern, and wherein the second aperture of each pair of the plurality of pairs of apertures may excite said respective resonant radiating cavity in an electromagnetic mode corresponding to a horizontal polarization far-field pattern.

The antenna assembly may further include a plurality of plastic fasteners to hold the first substrate, the second substrate and the spacer together.

The first aperture of each respective pair of the plurality of pairs of apertures may be oriented relative to the second aperture of each respective pair of the plurality of pairs of apertures in a T-shape. Each of the first aperture and the second aperture of each respective pair of the plurality of pairs of apertures may include a rectangular aperture body with an aperture body width and a pair of aperture ends with an aperture end width. Each aperture end may include a rectangular end and a semi-circular end with a radius equal to one half of the aperture end width. The aperture end width may be at least five times greater than the aperture body width. Each aperture end may be tapered or rounded. The rectangular end may have a width equal to the aperture end width and a thickness equal to one sixth of the aperture end width. The aperture end width may be equal to one third of an aperture length.

The first transmission line feed network may be terminated by a first via to the conductive ground plane after a feedline portion of the first transmission line feed network crosses over the rectangular aperture body of the first aperture of each pair of the plurality of pairs of apertures, and the second transmission line feed network may be terminated by a second via to the conductive ground plane after a feedline portion of the second transmission line feed network crosses over the rectangular aperture body of the second aperture of each pair of the plurality of pairs of apertures.

The plurality of conductive patch elements may be arranged in an array with a plurality of rows wherein each row comprises at least one conductive patch element. The plurality of conductive patch elements may be arranged in an array with a plurality of rows and a plurality of columns wherein each row comprises a number of conductive patch elements equal to the number of columns. The number of columns may be equal to two.

A first feedline portion of the first transmission line feed network may cross over a rectangular aperture body of the first aperture of each pair of the plurality of pairs of apertures in a first direction for each first aperture that excites each respective resonant radiating cavity formed between each respective one of the plurality of conductive patch elements and the conductive ground plane for conductive patch elements may be arranged in a first column and a second feedline portion of the first transmission line feed network may cross over the rectangular aperture body of the first aperture of each pair of the plurality of pairs of apertures in a second direction for each first aperture that excites each respective resonant radiating cavity formed between each respective one of the plurality of conductive patch elements and the conductive ground plane for conductive patch elements arranged in a second column, and the second direction may be opposite to the first direction.

The second feedline portion may be electrically longer than the first feedline portion by a distance equivalent to 180 degrees in phase at a target operating frequency for the antenna assembly.

A third feedline portion of the second transmission line feed network may cross over a rectangular aperture body of the second aperture of each pair of the plurality of pairs of apertures in a third direction for each second aperture that excites each respective resonant radiating cavity formed between each respective one of the plurality of conductive patch elements and the conductive ground plane for conductive patch elements arranged in the first column and a fourth feedline portion of the second transmission line feed network may cross over the rectangular aperture body of the second aperture of each pair of the plurality of pairs of apertures in a fourth direction for each second aperture that excites each respective resonant radiating cavity formed between each respective one of the plurality of conductive patch elements and the conductive ground plane for conductive patch elements arranged in the second column, and the third direction may be the same as the fourth direction.

The third feedline portion may be equivalent in electrical length to the fourth feedline portion. Each of the first transmission line feed network and the second transmission line feed network may include at least one meandering line portion. Each meandering line portion may include one or more bends, and wherein an electrical length of each meandering line portion may match a group delay from the respective first or second feed point to at least one of the respective first or second apertures with that of another group delay from the respective first or second feed point to at least one other of the respective first or second apertures.

Each of the first transmission line feed network and the second transmission line feed network may include at least one tunable element. An input signal applied to at least one tunable element may adjust at least one characteristic of the antenna assembly, said characteristic being at least one selected from the group consisting of a far-field radiation pattern, a coupling between the first feed point and the second feed point, and a coupling to one or more nearby antennas.

According to another aspect of the invention, an antenna assembly is provided that includes a plurality of first substrates each comprising a unitary dipole antenna element, wherein each unitary dipole antenna element comprises a first pair of dipole branches, a first coplanar feed line pair and a first conductor connection substrate tab; a second substrate comprising a plurality of coplanar dipole antenna elements, wherein each coplanar dipole antenna element comprises a second pair of dipole branches, a second coplanar feed line pair and a second conductor connection substrate tab; and a third substrate comprising a plurality of conductor connection cutouts, a first layer and a second layer, wherein the first layer comprises a conductive plane with a plurality of conductor connection clearances and wherein the second layer comprises a first transmission line feed network and a second transmission line feed network; wherein the second substrate is orthogonal to each of the plurality of first substrates and wherein the third substrate is orthogonal to the second substrate and each of the plurality of first substrates; wherein the first transmission line feed network conductively connects to each respective unitary dipole antenna element via its respective first coplanar feed line pair at a respective one of a plurality of first conductive junctions, each said first conductive junction comprising the respective first conductor connection substrate tab, a first corresponding one of the plurality of conductor connection cutouts, and a first corresponding one of the plurality of conductor connection clearances; and wherein the second transmission line feed network conductively connects to each respective coplanar dipole antenna element via its respective second coplanar feed line pair at a respective one of a plurality of second conductive junctions, each said second conductive junction comprising the respective second conductor connection substrate tab, a second corresponding one of the plurality of conductor connection cutouts, and a second corresponding one of the plurality of conductor connection clearances.

The first pair of dipole branches of each unitary dipole antenna element may be located on a same surface as the first coplanar feed line pair. Each unitary dipole antenna element may further include a first pair of parasitic elements. The first pair of parasitic elements of each unitary dipole antenna element may be located on the same surface as the first pair of dipole branches.

The first pair of parasitic elements may broaden a radiation pattern of each unitary dipole antenna element in a plane of the same surface as the first pair of dipole branches. The first pair of parasitic elements may include half-wavelength resonant dipole elements at a target operating frequency of the antenna assembly. The first pair of parasitic elements may be asymmetrically offset relative to an axis of the respective first pair of dipole branches towards an end of the respective first substrate having the respective first conductor connection substrate tab.

Each of the plurality of first substrates may further include a first assembly slot and the second substrate may further include a plurality of second assembly slots. A respective one of the plurality of second assembly slots may align with a respective first assembly slot within each respective first substrate.

Each of the plurality of first substrates further include one or more first mechanical tabs. The third substrate may further include additional cutouts, each additional cutout corresponding to a respective first mechanical tab amongst the plurality of first substrates.

Each of the plurality of first substrates may further include one or more first metalized pads corresponding to respective ones of each first mechanical tab. The second layer of the third substrate may further include a plurality of third metalized pads corresponding to respective ones of each first mechanical tab. Each first metalized pad may adjoin a respective third metalized pad.

The second substrate may further include one or more second mechanical tabs. The third substrate may further include additional cutouts, each additional cutout corresponding to a respective second mechanical tab.

The second substrate may further include one or more second metalized pads corresponding to respective ones of each second mechanical tab. The second layer of the third substrate may further include a plurality of third metalized pads corresponding to respective ones of each second mechanical tab. Each second metalized pad may adjoin a respective third metalized pad.

Each of the plurality of conductor connection clearances may be asymmetrically offset relative to a respective one of the plurality of conductor connection cutouts. The asymmetric offset may center each of the plurality of conductor connection clearances relative to a projected intersection with the third substrate for a respective one of first coplanar feed line pairs or second coplanar feed line pairs.

The second substrate may be oriented such that each of the plurality of coplanar dipole antenna elements radiates in a vertical polarization far-field pattern and the plurality of first substrates may be oriented such that each unitary dipole antenna element radiates in a horizontal polarization far-field pattern.

The first transmission line feed network may include a first feed point, a first microstrip distribution portion, and a plurality of first microstrip feed structure portions and the second transmission line feed network may include a second feed point, a second microstrip distribution portion, and a plurality of second microstrip feed structure portions.

Each first microstrip feed structure portion may include a first balun structure that couples a first pair of balanced microstrip lines at a respective one of the plurality of first conductive junctions to a first unbalanced microstrip line within the first microstrip distribution portion and each second microstrip feed structure portion may include a second balun structure that couples a second pair of balanced microstrip lines at a respective one of the plurality of second conductive junctions to a second unbalanced microstrip line within the second microstrip distribution portion.

Each of the first and second balun structures may include a first microstrip line, a second microstrip line, and a T-junction, and the second microstrip line may be electrically longer than the first microstrip line by one half wavelength at a target operating frequency of the antenna assembly and the second microstrip line may include at least one additional bend than the first microstrip line.

Each of the first and second microstrip lines may function as an impedance transformer of an electrical length that is an integer multiple of one quarter wavelength at a target operating frequency of the antenna assembly.

Each of the first microstrip feed structure portion and the second microstrip feed structure portion may further include an impedance transformer from the T-junction within its respective first or second balun structure to its respective first or second unbalanced microstrip line within the respective first or second microstrip distribution portion. The impedance transformer may include an unbalanced microstrip line of an electrical length that is an integer multiple of one quarter wavelength at a target operating frequency of the antenna assembly.

The first feed point and the second feed point may each be coupled to respective components on the second layer of the third substrate. The respective components may be at least one of an RF filter or a power amplifier within a transmitter.

The first microstrip distribution portion may equally divide a first power and matches a first group delay from the first feed point to each of the plurality of first microstrip feed structure portions and the second microstrip distribution portion may equally divide a second power and matches a second group delay from the second feed point to each of the plurality of second microstrip feed structure portions. Each of the first microstrip distribution portion and the second microstrip distribution portion may include at least one tunable element. An input signal applied to at least one tunable element may adjust at least one characteristic of the antenna assembly, said characteristic being one or more of a far-field radiation pattern, a coupling between the first feed point and the second feed point, or a coupling to one or more nearby antennas.

A numerical count of unitary dipole antenna elements may exceed that of a numerical count of coplanar dipole antenna elements.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

DETAILED DESCRIPTION

Figure 1:
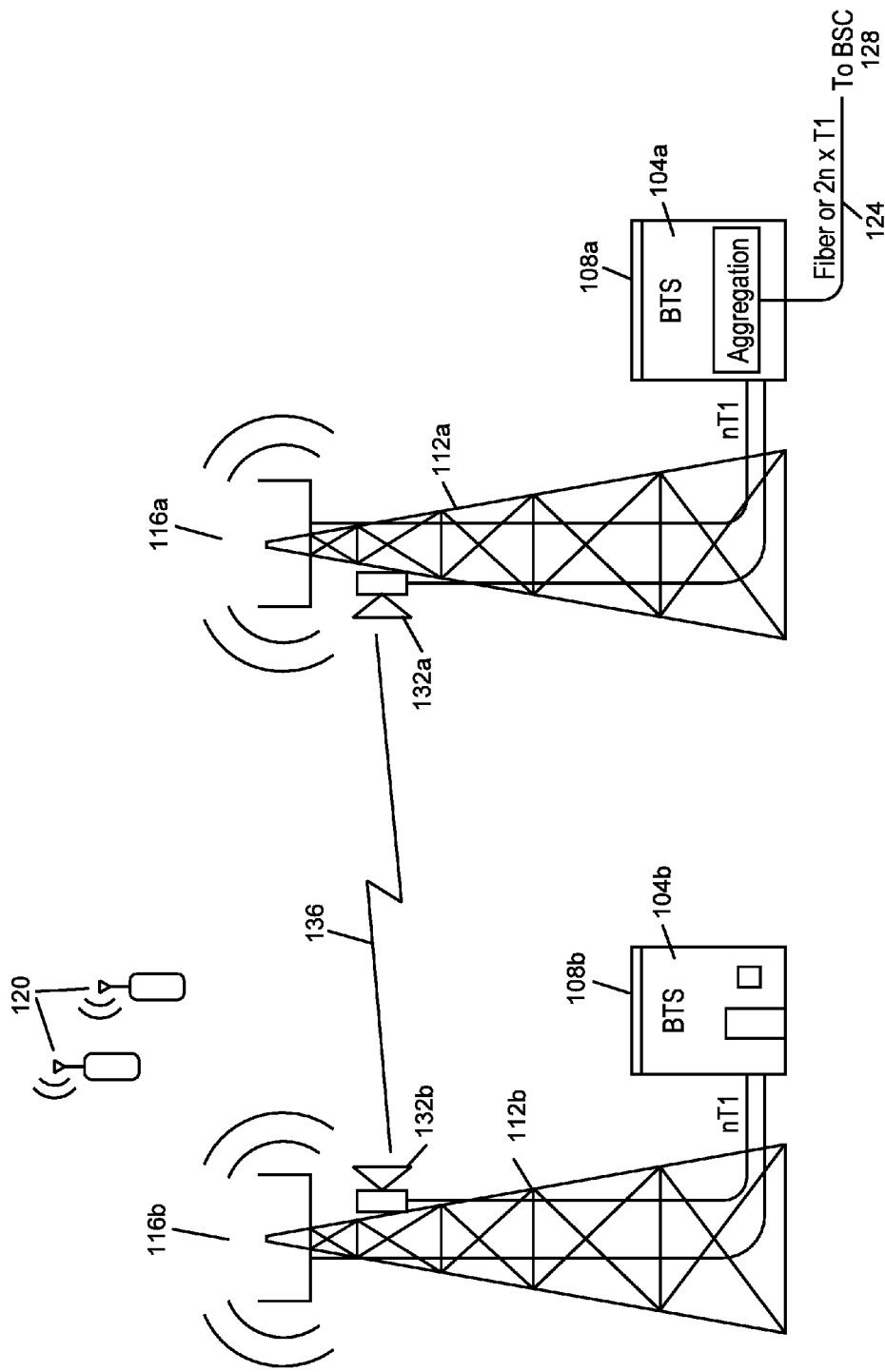
FIG. 1 is an illustration of conventional point to point (PTP) radios deployed for cellular base station backhaul with unobstructed line of sight (LOS).
Figure 2:
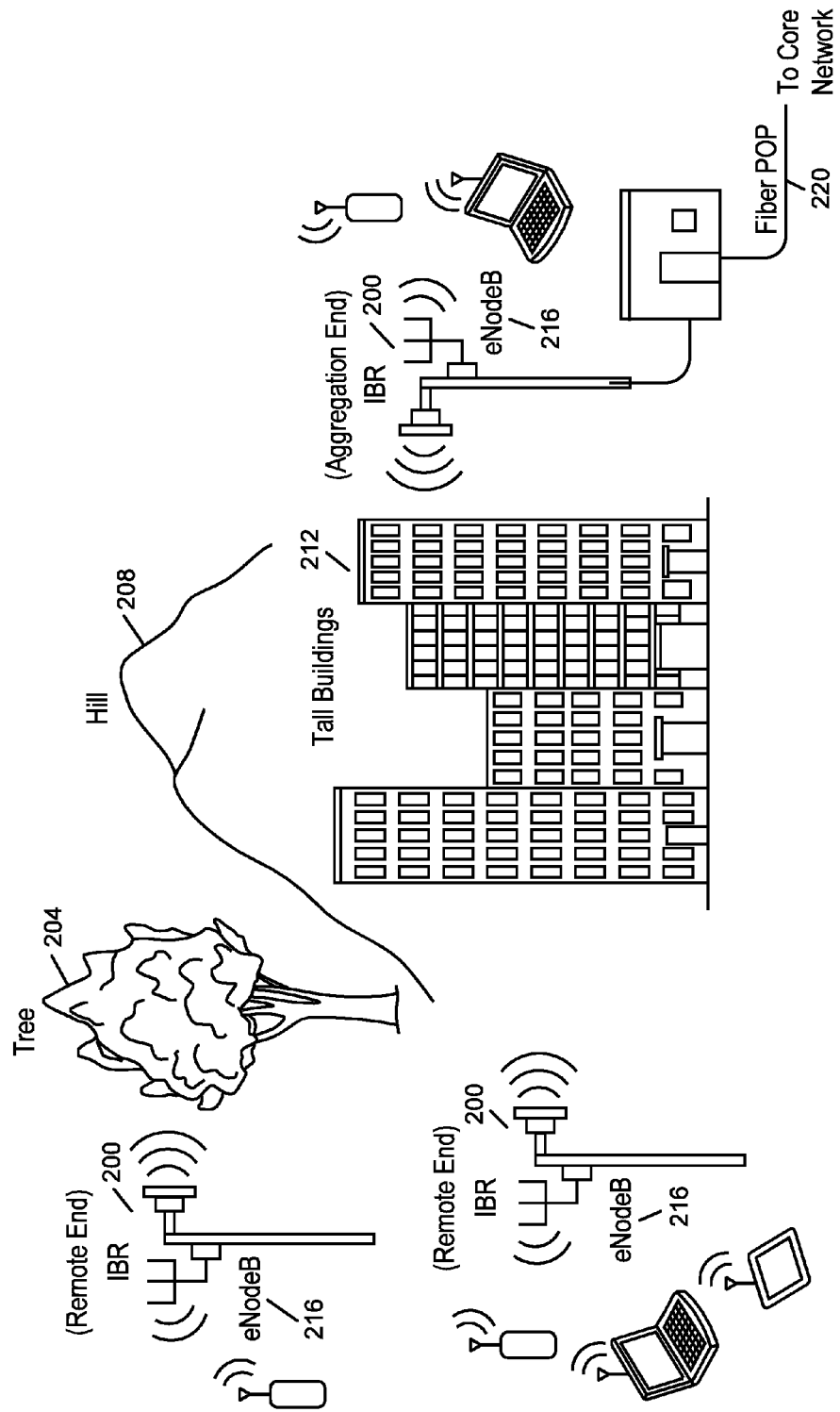
FIG. 2 is an illustration of intelligent backhaul radios (IBRs) deployed for cellular base station backhaul with obstructed LOS according to one embodiment of the invention.

FIG. 2 illustrates deployment of intelligent backhaul radios (IBRs) in accordance with an embodiment of the invention. As shown in FIG. 2, the IBRs 200 are deployable at street level with obstructions such as trees 204, hills 208, buildings 212, etc. between them. The IBRs 200 are also deployable in configurations that include point to multipoint (PMP), as shown in FIG. 2, as well as point to point (PTP). In other words, each IBR 200 may communicate with more than one other IBR 200.

For 3G and especially for 4$^{th}$ Generation (4G), cellular network infrastructure is more commonly deployed using "microcells" or "picocells." In this cellular network infrastructure, compact base stations (eNodeBs) 216 are situated outdoors at street level. When such eNodeBs 216 are unable to connect locally to optical fiber or a copper wireline of sufficient data bandwidth, then a wireless connection to a fiber "point of presence" (POP) requires obstructed LOS capabilities, as described herein.

For example, as shown in FIG. 2, the IBRs 200 include an Aggregation End IBR (AE-IBR) and Remote End IBRs (RE-IBRs). The eNodeB 216 associated with the AE-IBR is typically connected locally to the core network via a fiber POP 220. The RE-IBRs and their associated eNodeBs 216 are typically not connected to the core network via a wireline connection; instead, the RE-IBRs are wirelessly connected to the core network via the AE-IBR. As shown in FIG. 2, the wireless connections between the IBRs include obstructions (i.e., there may be an obstructed LOS connection between the RE-IBRs and the AE-IBR).

Figure 3:
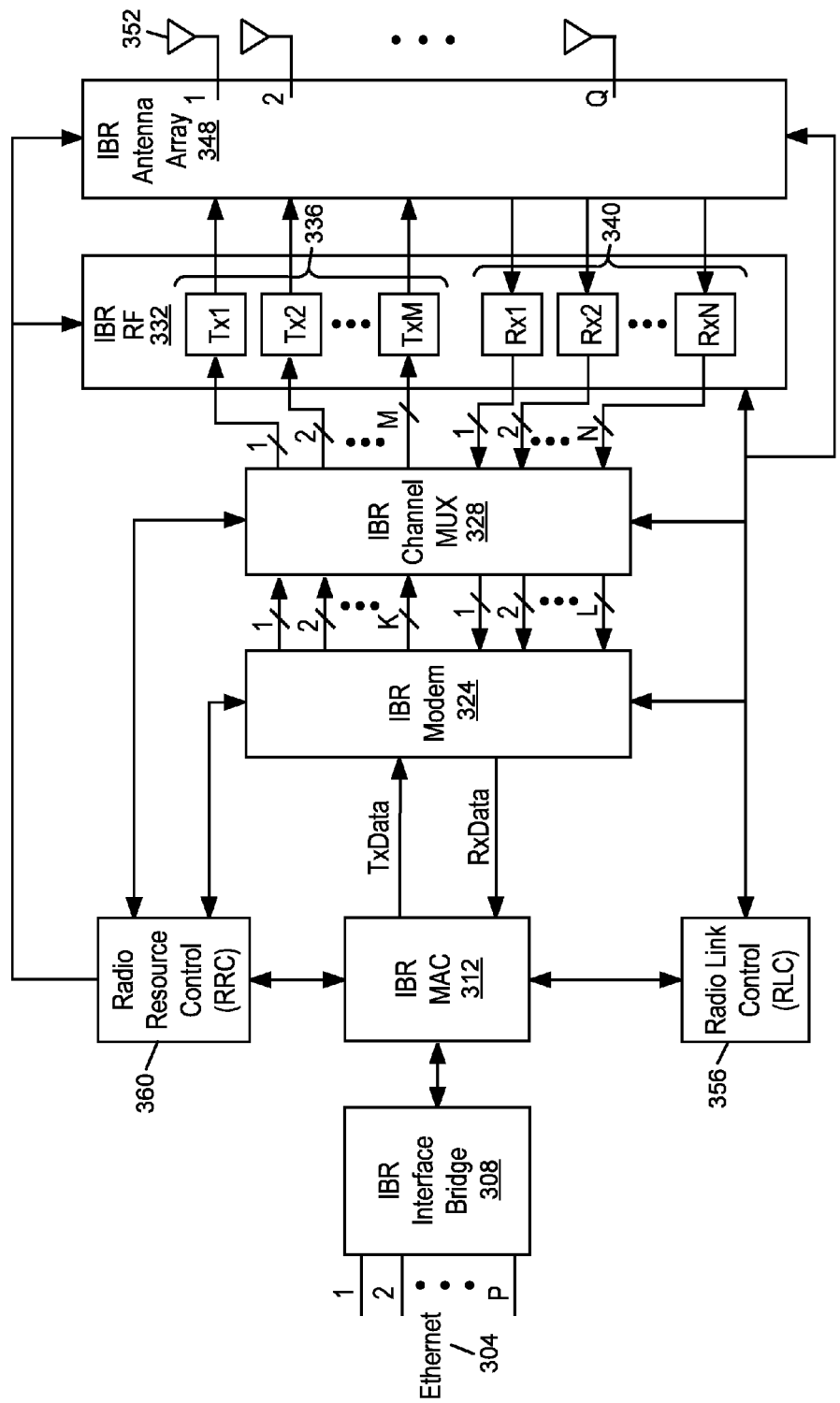
FIG. 3 is a block diagram of an IBR according to one embodiment of the invention.
Figure 7:
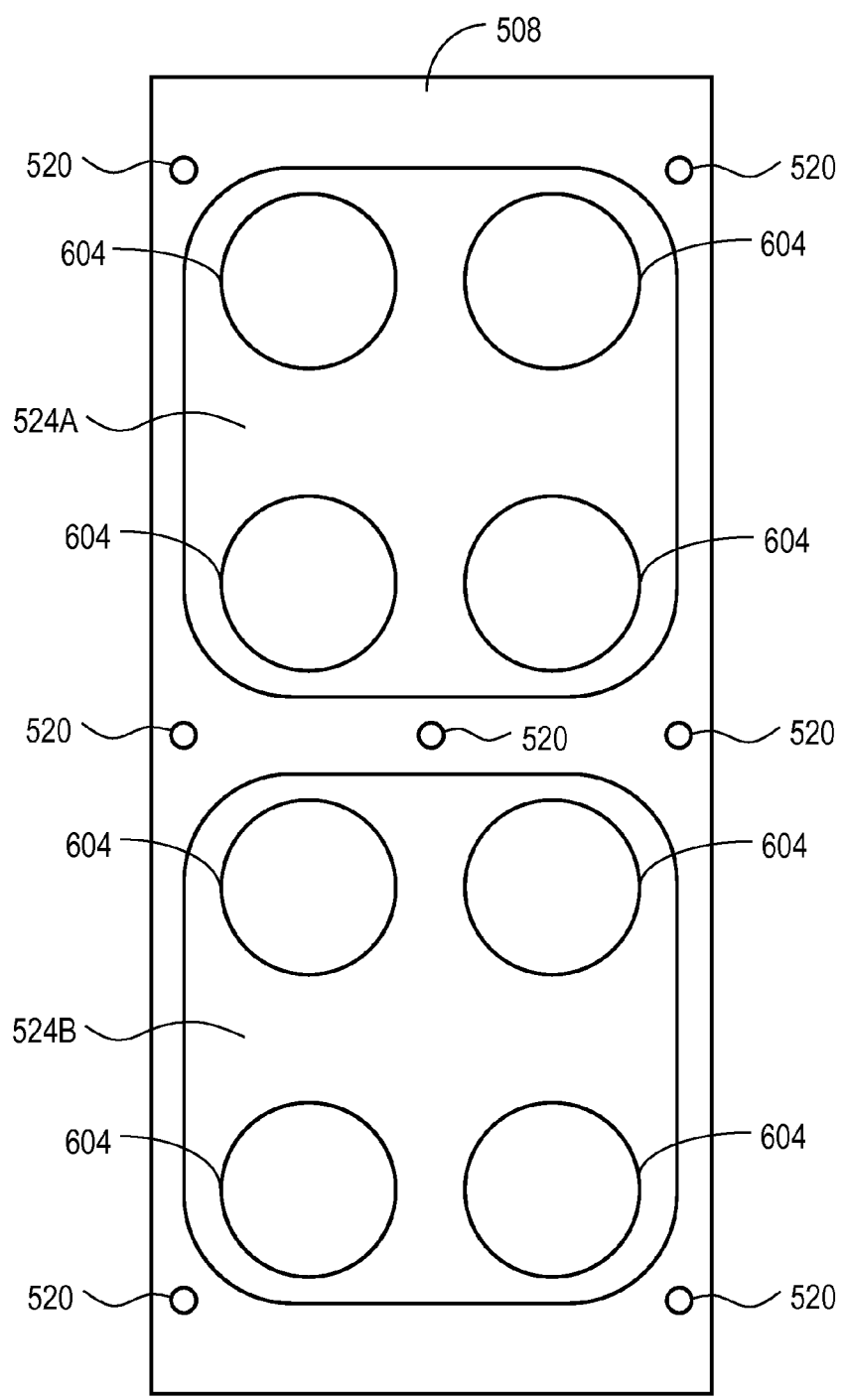
FIG. 7 is a view of the spacer laid over the plurality of conductive patch elements on the first substrate of the antenna assembly according to one embodiment of the invention.

FIG. 3 illustrates an exemplary embodiment of the IBRs 200 shown in FIG. 2. In FIG. 3, the IBRs 200 include interfaces 304, interface bridge 308, MAC 312, modem 324, channel MUX 328, RF 332, which includes Tx1 . . . TxM 336 and Rx1 . . . RxN 340, antenna array 348 (includes multiple antennas 352), a Radio Link Controller (RLC) 356 and a Radio Resource Controller (RRC) 360. The IBR may optionally include an Intelligent Backhaul Management System (IBMS) agent as shown in FIG. 7 of U.S. patent application Ser. No. 13/645,472. It will be appreciated that the components and elements of the IBRs may vary from that illustrated in FIG. 3. U.S. patent application Ser. No. 13/645,472 and the related applications and patents summarized above describe in detail the various elements of the IBR including their structural and operational features in numerous different embodiments both as depicted in FIG. 3 and as depicted with various additional elements not shown in FIG. 3. A brief summary of certain elements of the IBR is also provided herein.

The external interfaces of the IBR (i.e., the IBR Interface Bridge 308 on the wireline side and the IBR Antenna Array 348 (including antennas 352) on the wireless side) are a starting point for describing some fundamental differences between the numerous different embodiments of the IBR 200 and either conventional PTP radios or other commonly known radio systems, such as those built to existing standards including 802.11n (WiFi), 802.11ac (WiFi), 802.16e (WiMax) or 4G LTE.

In some embodiments, the IBR Interface Bridge 308 physically interfaces to standards-based wired data networking interfaces 304 as Ethernet 1 through Ethernet P. "P" represents a number of separate Ethernet interfaces over twisted-pair, coax or optical fiber. The IBR Interface Bridge 308 can multiplex and buffer the P Ethernet interfaces 304 with the IBR MAC 312. In exemplary embodiments, the IBR Interface Bridge 308 preserves "Quality of Service" (QoS) or "Class of Service" (CoS) prioritization as indicated, for example, in IEEE 802.1q 3-bit Priority Code Point (PCP) fields within the Ethernet frame headers, such that either the IBR MAC 312 schedules such frames for transmission according to policies configured within or communicated to the IBR 200, or the IBR interface bridge 308 schedules the transfer of such frames to the IBR MAC 312 such that the same net effect occurs. In other embodiments, the IBR interface bridge 308 also forwards and prioritizes the delivery of frames to or from another IBR over an instant radio link based on Multiprotocol Label Switching (MPLS) or Multiprotocol Label Switching Transport Profile (MPLS-TP). U.S. patent application Ser. No. 13/645,472 provides additional description of exemplary embodiments of the interfaces 304 and the interface bridge 308 of the IBR 200. U.S. patent application Ser. No. 13/271,051 provides additional description of exemplary embodiments of an IBMS that includes an IBMS Agent in communication with or IBMS components and the IBR Interface Bridge 308 as well as MAC 312 and/or RRC 360. U.S. patent application Ser. No. 13/271,051 also describes an IBR with an integrated Carrier Ethernet switch.

Figure 4:
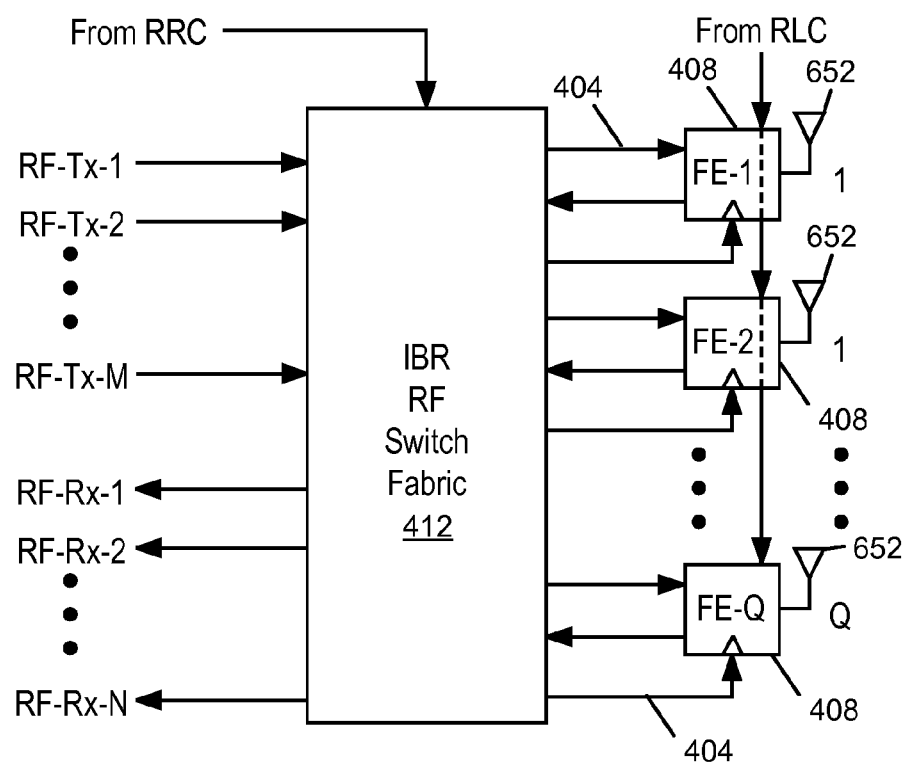
FIG. 4 is a block diagram of an IBR antenna array according to one embodiment of the invention.

FIG. 4 illustrates an exemplary embodiment of an IBR Antenna Array 348. FIG. 4 illustrates an antenna array having Q directive gain antennas 352 (i.e., where the number of antennas is greater than 1). In FIG. 4, the IBR Antenna Array 348 includes an IBR RF Switch Fabric 412, RF interconnections 404, a set of Front-ends 408 and the directive gain antennas 352. The RF interconnections 404 can be, for example, circuit board traces and/or coaxial cables. The RF interconnections 404 connect the IBR RF Switch Fabric 412 and the set of Front-ends 408. Each Front-end 408 is associated with an individual directive gain antenna 352, numbered consecutively from 1 to Q.

U.S. patent application Ser. Nos. 13/645,472, 13/898,429, and 14/108,200 provide additional description of the Front-end 408 and various embodiments thereof as applicable to different IBR duplexing schemes such as Time Division Duplexing (TDD), Frequency Division Duplexing (FDD) and Zero Division Duplexing (ZDD). For example, with TDD embodiments where certain directive gain antenna elements 352 are used for both transmit and receive at different times, then Front-end 408 may include a transmit/receive switch, one or more RF low pass and/or bandpass filters, and either a low-noise amplifier (LNA) in the receive path or a power amplifier (PA) in the transmit path. Similarly, with FDD embodiments where certain directive gain antenna elements 352 are used for both transmit and receive at the same time, then Front-end 408 may include a duplex filter, one or more additional RF low pass and/or bandpass filters, and either a low-noise amplifier (LNA) in the receive path or a power amplifier (PA) in the transmit path. Another common embodiment for FDD has certain directive gain antenna elements 352 used only for transmit and then Front-end 408 for such transmit antenna elements would have a PA and one or more RF filters for a transmit FDD sub-band and has certain directive gain antenna elements 352 used only for receive and then Front-end 408 for such receive antenna elements would have an LNA and one or more RF filters for a receive FDD sub-band. In most ZDD embodiments, certain directive gain antenna elements 352 are used only for transmit and others only for receive with respective Front-ends as described for FDD except that the RF filters overlap in the frequency domain for both transmit and receive (i.e. no separate transmit and receive sub-bands).

Note that each antenna 352 has a directivity gain Gq. For IBRs intended for fixed location street-level deployment with obstructed LOS between IBRs, whether in PTP or PMP configurations, each directive gain antenna 352 may use only moderate directivity compared to antennas in conventional PTP systems at a comparable RF transmission frequency. As described in greater detail in U.S. patent application Ser. Nos. 13/645,472, 13/898,429, and 14/108,200, typical values of Gq are on the order of 10 to 20 dBi for each antenna at RF transmission frequencies below 10 GHz.

In the IBR Antenna Array 348, the total number of individual antenna elements 352, Q, is at least greater than or equal to the larger of the number of RF transmit chains 336, M, and the number of RF receive chains 340, N. In some embodiments, some or all of the antennas 352 may be split into pairs of polarization diverse antenna elements realized by either two separate feeds to a nominally single radiating element or by a pair of separate orthogonally oriented radiating elements. In some embodiments, certain antenna elements 352 may be configured with different antenna gain Gq and/or radiation patterns compared to others in the same IBR. Also, in many embodiments, such as for those employing FDD or ZDD, U.S. patent application Ser. Nos. 13/645,472, 13/898,429, and 14/108,200 provide additional description of advantageous arrangements of separate transmit and receive antenna subsets with the total set Q of individual antenna elements 352.

The IBR RF Switch Fabric 412 provides selectable RF connections between certain RF-Tx-m and/or certain RF-Rx-n to the various individual antenna elements 352 via various front-end 408 embodiments. Note specifically that in certain embodiments the individual antenna elements 352 are coupled via a transmit-only front-end and/or the IBR RF Switch Fabric 412 to only a transmit chain output RF-Tx-m or coupled via a receive-only front-end and/or the IBR RF Switch Fabric 412 to only a receive chain output RF-Rx-n to advantageously enable separate optimization of the receive antenna array from that of the transmit antenna array. U.S. patent application Ser. Nos. 13/645,472, 13/898,429, and 14/108,200 provide additional description of different embodiments of the IBR RF Switch Fabric 412 as applicable to TDD, FDD and ZDD in different product configurations.

With reference back to FIG. 3, the IBR RF 332 also includes transmit and receive chains 336, 340. In one embodiment, each element of transmit chain 336 takes a transmit chain input signal such as digital baseband quadrature signals $I_{Tm}$ and $Q_{Tm}$ and then converts them to a transmit RF signal RF-Tx-m at an RF carrier frequency typically below 10 GHz. Similarly, each element of receive chain 340 converts a receive RF signal RF-Rx-n at an RF carrier frequency typically below 10 GHz to a receive chain output signal such as digital baseband quadrature signals $I_{Rn}$ and $Q_{Rn}$.

Other IBR elements include the IBR MAC 312, the Radio Link Control (RLC) 356, the Radio Resource Control (RRC) 360 and the optional IBMS Agent. Although IBR embodiments are possible wherein the MAC 312, RLC 356, RRC 360 and the optional IBMS Agent are distinct structural entities, more commonly IBRs are realized wherein the MAC 312, RLC 356, RRC 360 and the optional IBMS Agent as well as portions of the IBR Interface Bridge 308 are software modules executing on one or more microprocessors. Note also that in some IBR embodiments that use of a "Software Defined Radio" (SDR) for the IBR Modem 324 and/or IBR Channel MUX 328 or portions thereof may also be realized in software executing on one or more microprocessors. Typically in SDR embodiments, the one or more microprocessors used for elements of the PHY layer are physically separate from those used for the MAC 312 or other layers and are physically connected or connectable to certain hardware cores such as FFTs, Viterbi decoders, DFEs, etc. As SDR processing power increases over time, functions traditionally implemented in hardware cores advantageously migrate to the SDR processor cores as software modules for greater implementation flexibility.

The RRC 360 and RLC 356 interact with the IBR MAC 312 and various elements of the IBR PHY both via "normal" frame transfers and direct control signals via the conceptual IBR Control plane. Both the RRC 360 and the RLC 356 may execute concurrent control loops with the respective goals of optimizing radio resource allocations and optimizing radio link parameters for current resources in view of the dynamic propagation environment conditions (including uncoordinated interference if applicable), IBR loading, and possibly system-wide performance goals (via the optional IBMS Agent or other IBR to IBR control communications links). It is instructive to view the RLC 356 as an "inner loop" optimizing performance to current policies and radio resource allocations for each active link and to view the RRC 360 as an "outer loop" determining if different policies or radio resource allocations are desirable to meet overall performance goals for all IBRs currently interacting with each other (intentionally or otherwise). Typically both the RRC 360 and the RLC 356 are implemented as software modules executing on one or more processors.

The primary responsibility of the RLC 356 in exemplary IBRs is to set or cause to be set the current transmit Modulation and Coding Scheme (MCS) and output power for each active link. The RLC 356 causes the transmit power control (TPC) of the IBR to be maintained both in a relative sense amongst active links, particularly of interest for the AE-IBR in a PMP configuration, and also in an overall sense across all transmits chains and antennas.

In some embodiments, the RLC 356 can determine its MCS and TPC selections across active links based on information from various sources within the IBR. For example, the IBR MAC can deliver RLC control frames from other IBRs with information from such other IBRs (for example, RSSI, decoder metrics, FCS failure rates, etc.) that is useful in setting MCS and TPC at the transmitting IBR. Additionally, such RLC control frames from an associated IBR may directly request or demand that the RLC in the instant IBR change its MCS and/or TPC values for transmit directly on either a relative or absolute basis. U.S. patent application Ser. No. 13/645,472 and U.S. patent application Ser. No. 14/108,200 provide additional description of different embodiments of the RLC 356 as applicable to TDD, FDD and ZDD in different product configurations.

The primary responsibility of the RRC 360 is to set or cause to be set at least the one or more active RF carrier frequencies, the one or more active channel bandwidths, the choice of transmit and receive channel equalization and multiplexing strategies, the configuration and assignment of one or more modulated streams amongst one of more modulator cores, the number of active transmit and receive RF chains, and the selection of certain antenna elements and their mappings to the various RF chains. Optionally, the RRC may also set or cause to be set the superframe timing, the cyclic prefix length, and/or the criteria by which blocks of Training Pilots are inserted. The RRC 360 allocates portions of the IBR operational resources, including time multiplexing of currently selected resources, to the task of testing certain links between an AE-IBR and one or more RE-IBRs. The RRC 360 evaluates such tests by monitoring at least the same link quality metrics as used by the RLC 656. Additionally, in some embodiments, additional RRC-specific link testing metrics are also used. The RRC 360 can also exchange control frames with a peer RRC at the other end of an instant link to, for example, provide certain link testing metrics or request or direct the peer RRC to obtain link specific testing metrics at the other end of the instant link for communication back to RRC 360.

In some embodiments, the RRC 360 causes changes to current resource assignments in response to tested alternatives based on policies that are configured in the IBR and/or set by the optional IBMS Agent. An exemplary policy includes selecting resources based on link quality metrics predicted to allow the highest throughput MCS settings at lowest TPC value. Additional exemplary policies may factor in minimizing interference by the instant link to other AE-IBR to RE-IBR links (or other radio channel users such as conventional PTP radios) either detected at the instant IBRs or known to exist at certain physical locations nearby as set in configuration tables or communicated by the optional IBMS Agent or other IBR to IBR control communications links as described, for example, in co-pending U.S. patent application Ser. No. 14/098,456, the entirety of which is hereby incorporated by reference. For example, U.S. patent application Ser. No. 14/098,456 discloses exemplary systems and methods for control communications links in the form of inline or embedded signals that may be suitable for exchange of control information between IBRs that otherwise lack any IBR to IBR communication path. Such policies may also be weighted proportionately to reach a blended optimum choice amongst policy goals or ranked sequentially in importance.

In some embodiments, for either PTP or PMP deployment configurations, the selection of either the one or more active RF carrier frequencies used by the RF chains of the IBR RF, the one or more active channel bandwidths used by the IBR MAC, IBR Modem, IBR Channel MUX and IBR RF, the superframe timing, the cyclic prefix length, or the insertion policy for blocks of Training Pilots is determined at the AE-IBR for any given link. The RE-IBR in such an arrangement can request, for example, an RF carrier frequency or channel bandwidth change by the AE-IBR by sending an RRC control frame in response to current link conditions at the RE-IBR and its current RRC policies. Whether in response to such a request from the RE-IBR or due to its own view of current link conditions and its own RRC policies, an AE-IBR sends the affected RE-IBRs an RRC control frame specifying at least the parameters for the new RF frequency and/or channel bandwidth of the affected links as well as a proposed time, such as a certain superframe sequence index, at which the change-over will occur (or alternatively, denies the request). The AE-IBR then makes the specified change after receiving confirmation RRC control frames from the affected RE-IBRs or sends a cancellation RRC control frame if such confirmations are not received before the scheduled change.

An RE-IBR typically attempts to utilize all available modulator and demodulator cores and streams as well as all available RF chains to maximize the robustness of its link to a particular AE-IBR. In an RE-IBR embodiment where at least some redundancy in antenna elements amongst space, directionality, orientation, polarization and/or RF chain mapping is desirable, the primary local RRC decision is then to choose amongst these various antenna options. In other embodiments the AE-IBR and RE-IBR optimize their resource allocations independently such that there is little distinction between the RRC strategies at the AE-IBR versus the RE-IBR. U.S. patent application Ser. Nos. 13/645,472, 13/898,429, and 14/108,200 provide additional description of different embodiments of the RRC 360 as applicable to TDD, FDD and ZDD in different product configurations.

The specific details of the IBR Modem 324 and IBR Channel MUX 328 depend somewhat on the specific modulation format(s) deployed by the IBR. In general, the IBR requires a modulation format suitable for a broadband channel subject to frequency-selective fading and multipath self-interference due to the desired PHY data rates and ranges in obstructed LOS propagation environments. Many known modulation formats for such broadband channels are possible for the IBR. Two such modulation formats for the IBR are (1) Orthogonal Frequency Division Multiplexing (OFDM) and (2) Single-Carrier Frequency Domain Equalization (SC-FDE). Both modulation formats are well known, share common implementation elements, and have various advantages and disadvantages relative to each other. U.S. patent application Ser. No. 13/645,472 provides additional detail regarding OFDM and SC-FDE as applicable to various IBR embodiments.

The specific details of the IBR Modem 324 and IBR Channel MUX 328 also depend somewhat on the specific antenna array signal processing format(s) deployed by the IBR. In general, the IBR utilizes multiple antennas and transmit and/or receive chains, which can be utilized advantageously by several well-known baseband signal processing techniques that exploit multipath broadband channel propagation. Such techniques include Multiple-Input, Multiple-Output (MIMO), MIMO Spatial Multiplexing (MIMO-SM), beamforming (BF), maximal ratio combining (MRC), and Space Division Multiple Access (SDMA). U.S. patent application Ser. No. 13/645,472 provides additional detail regarding such techniques as applicable to various IBR embodiments.

In many embodiments, the IBR Modem 324 comprises one or modulator cores each of which comprises such functional elements as scramblers, encoders, interleavers, stream parsers, symbol groupers and symbol mappers. At a high level, each modulator core within the IBR Modem 324 typically transforms a data stream from the IBR MAC 312 into a symbol stream that can be passed to the IBR Channel MUX 328. Similarly, in many embodiments, the IBR Modem 324 also comprises one or demodulator cores each of which comprises such functional elements as descramblers, decoders, deinterleavers, stream multiplexers, and soft decision symbol demappers. At a high level, each demodulator core within the IBR Modem 324 typically transforms a stream of estimated receive symbols, such as represented by a Log-Likelihood Ratio (LLR), from the IBR Channel MUX 328 into a data stream that can be passed to the IBR MAC 312. U.S. patent application Ser. Nos. 13/645,472, 13/898,429, and 14/108,200 provide additional description of different embodiments of the IBR Modem 324 as applicable to TDD, FDD and ZDD in different product configurations.

In many embodiments, the IBR Channel MUX 328 comprises a transmit path channel multiplexer that may or may not be frequency selective and that in turn may comprise such functional elements as block assemblers, transmit channel equalizers, transmit multiplexers, cyclic prefix adders, block serializers, transmit digital front ends, preamble inserters, and pilot inserters. At a high level, the transmit path of the IBR Channel MUX 328 transforms one or more symbol streams from the IBR Modem 324 into inputs for the one or more transmit chains each comprised of baseband symbol samples. Similarly, in many embodiments, the IBR Channel MUX 328 also comprises a frequency selective receive path channel multiplexer that in turn may comprise that in turn comprises such functional elements as synchronizers, receive digital front ends, cyclic prefix removers, channel equalizer coefficients generators, receive channel equalizers, receive stream multiplexers and complex Discrete Fourier Transformers (DFT). At a high level, the receive path of the IBR Channel MUX 328 transforms the outputs of the one or more receive chains each comprised of baseband symbol samples into one or more streams of estimated receive symbols for input into the IBR Modem 324. U.S. patent application Ser. Nos. 13/645,472, 13/898, 429, and 14/108,200 provide additional description of different embodiments of the IBR Channel MUX 328 as applicable to TDD, FDD and ZDD in different product configurations.

In exemplary embodiments, the IBR MAC 312 comprises such functional elements as a management entity, a Tx buffer and scheduler, a control entity, an Rx buffer, a frame check sum (FCS) generator, a header generator, a header analyzer and an FCS analyzer. U.S. patent application Ser. Nos. 13/645,472, 13/898,429, and 14/108,200 provide additional description of different embodiments of the IBR MAC 312 as applicable to TDD, FDD and ZDD in different product configurations.

Additional details regarding numerous optional functional components and regarding additional exemplary embodiments of the IBR are provided in commonly assigned U.S. patent application Ser. No. 13/645,472, U.S. Pat. No. 8,311, 023 and U.S. Pat. No. 8,238,318, U.S. patent application Ser. No. 13/898,429 and U.S. Pat. No. 8,467,363, U.S. patent application Ser. No. 13/271,051 and U.S. Pat. No. 8,300, 590, and U.S. patent application Ser. No. 14/108,200 and U.S. Pat. Nos. 8,638,839 and 8,422,540, the disclosures of which are hereby incorporated herein by reference in their entirety.

Antenna assembles having improved feed mechanisms to address these problems will now be described. The patch array antenna assembly includes an array of resonant radiating patch antenna elements that are aperture-fed (instead of pin or probe-fed). In this improved antenna design, the feed network is coupled to the resonant radiating cavity via apertures in the conductive ground plane. In one embodiment, the feed network is composed of transmission lines such as, for example, microstrip lines on one side of a printed circuit board (PCB) wherein the conductive ground plane is on the other side of the PCB. In another embodiment, the feed network is composed of transmission lines such as, for example, striplines within a multi-layer PCB wherein at least one layer is a conductive ground plane that includes the apertures on the outside of the PCB. Exemplary advantages of an aperture-fed antenna array include, for example, lower cost due to reduced assembly time/complexity and higher reliability due to no solder joints securing any pins. The shape of the aperture also provides distinct advantages over the prior art. In particular, by using an aperture having a modified shape (e.g., rounded or tapered) compared to a conventional art "H" or "dogbone" slot shape, the wanted coupling to the resonant radiating cavity is maximized and unwanted backwards facing radiation from is minimized. The use of a multi-layer PCB and a stripline transmission line feed network further minimizes the unwanted backwards facing radiation as well as enables greater flexibility for placing active electronic components on the opposite side of the PCB from the side with the apertures in the conductive ground plane.

Another improvement is the termination of the feed line. In conventional aperture-fed patch antennas the magnetic (inductive) coupling between the transmission line feed and resonant radiating cavity results in excessive inductive reactance at the antenna feed. To counter this inductive reactance, the feed line is commonly left open-stub after crossing the aperture to provide a series capacitive reactance. This open-stub tuning has the undesirable side effect of increasing backwards-facing radiation. By co-optimizing the conductive patch element dimensions and aperture dimensions, the feed can be tuned for zero-net reactance, and a desired input resistance (e.g. 50 ohms, or 100 ohms). This allows the feed line to be terminated in a short circuit immediately after crossing the aperture, resulting in lower backwards-facing radiation than the conventional art open circuit counterpart.

In some embodiments, a dielectric spacer is provided between the two PCBs to provide the desired spacing between the conductive patch elements and conductive ground plane thereby forming a resonant radiating cavity. In an exemplary embodiment, this spacer can be a simple injection-molded plastic part. The spacer includes one or more symmetric openings that remove any dielectric material from within the resonant radiating cavity between the conductive patch element and conductive ground plane. Dielectric material within the resonant radiating cavity is undesirable because any variation in the material dielectric constant can cause the resonant frequency of the resonant radiating cavity to shift, thereby reducing radiation efficiency. Additional details of this patch array antenna assembly design will now be discussed with reference to several Figures. The exemplary antenna assembly embodiments described herein may be used in the IBR embodiments described above and in the incorporated co-pending applications as a pair of directive gain antenna elements for a facet comprising a first directive gain antenna element with a first polarization and a second directive gain antenna element with a second polarization that is orthogonal to the first polarization.

Figure 5A:
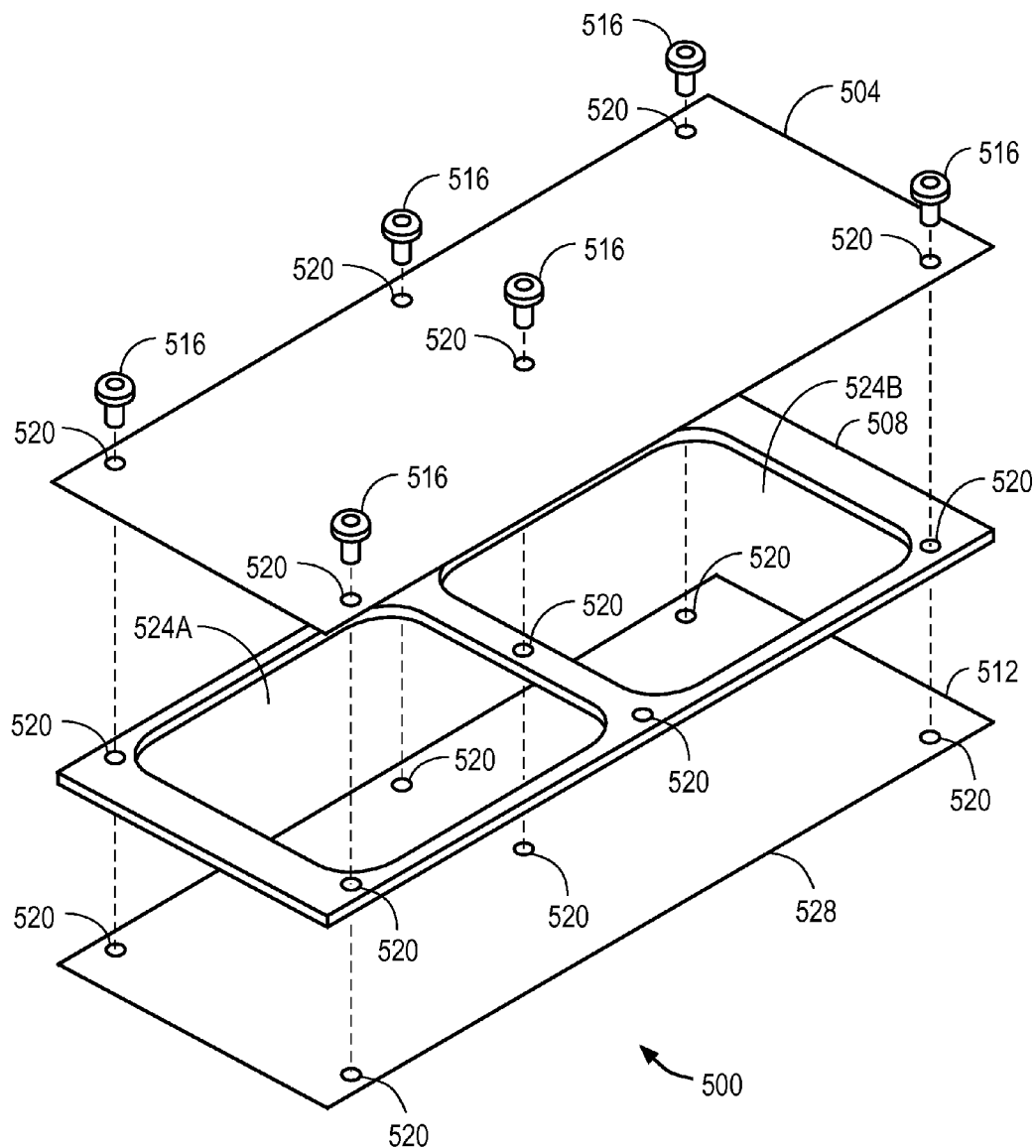
FIG. 5A is an assembly view of an antenna assembly according to one embodiment of the invention.
Figure 5B:
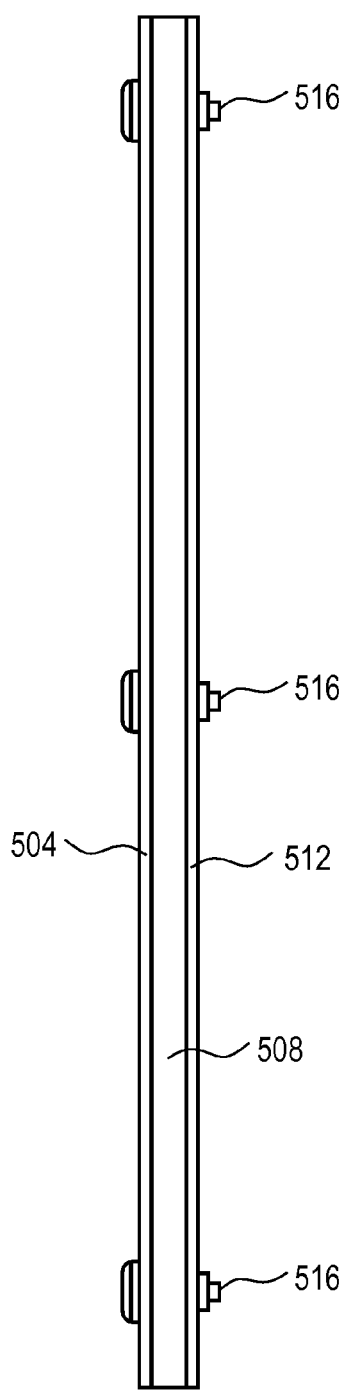
FIG. 5B is a side view of the antenna assembly according to one embodiment of the invention.

FIG. 5A illustrates a patch array antenna assembly 500 in accordance with some embodiments of the invention. A detailed view of the side of the antenna assembly is shown in FIG. 5B.

As shown in FIG. 5A, the patch array antenna assembly 500 includes a first substrate 504, a spacer 508 and a second substrate 512. The first substrate 504, spacer 508 and second substrate 512 have approximately the same overall width and length and are approximately aligned with one another.

In FIG. 5A, a plurality of rivets 516 are inserted into openings 520 in the first substrate 504, spacer 508 and second substrate 512 to hold the first substrate 504, spacer 508 and second substrate 512 together. It will be appreciated that other methods may be used to secure or hold the first substrate 504, spacer 508 and second substrate 512 together. For example, rivets having an alternative shape, different fasteners (e.g., screws, bolts, clamps, etc.), adhesives or other methods known to those of skill in the art may be used to hold the first substrate 504, spacer 508 and second substrate 512 together. It will further be appreciated that fewer than or more than the number of rivets 516 shown in FIG. 5A may be used to secure or hold the first substrate 504, spacer 508 and second substrate 512 together.

The first substrate 504 is typically a printed circuit board (PCB). In some embodiments, the first substrate 504 is at least a conductive patch element carrier. A number of conductive patch elements may be located on one side of the first substrate 504. In some embodiments, the plurality of conductive patch elements is located on the surface of the first substrate 504 adjacent to the spacer 508. The conductive patch elements, as will be described in further detail hereinafter, define a number of resonant radiating patch antenna elements.

The second substrate 512 is also typically a printed circuit board (PCB). The second substrate 512 includes a transmission line feed network for the patch array antenna assembly. The top outer layer of the second substrate 512 may also be a conductive ground plane 528 that, in combination with the conductive patch elements of the first substrate, forms resonant radiating patch antenna elements. As will be described in further detail herein, the conductive ground plane 528 on the second substrate 512 includes a plurality of apertures (or openings) for coupling the resonant radiating cavities to the transmission line feed network on the second substrate 512.

The spacer 508 is positioned between the first substrate 504 and the second substrate 512. The spacer 508 has a thickness that is selected to maintain the proper height within the resonant radiating cavity (said height being the distance between the conductive ground plane 528 on the second substrate 512 and the conductive patch elements on the first substrate 504 in some embodiments) as shown in FIG. 5A. Alternatively, in other embodiments where the conductive patch elements on the first substrate 504 are on the opposite side of substrate 504 from the surface adjacent to spacer 508 or on an inner layer of a multi-layer PCB, the height within the resonant radiating cavity is equal to the thickness of the spacer 508 plus the thickness of any PCB layers between the spacer and the surface with the conductive patch elements.

In FIG. 5A, the spacer 508 includes two openings 524A, 524B where dielectric material is absent. The spacer 508 and the openings 524, in particular, ensure there is no dielectric material in the resonant radiating cavity, other than air, making the structure more robust against variations in the electrical properties of the spacer material. Although two openings 524A, 524B are shown in FIG. 5A, it will be appreciated that the spacer 508 may include fewer than two or more than two openings 524. For example, the spacer 508 may include one opening. In another example, the spacer 508 may include three or more openings. In another example, the number of openings in the spacer 508 may be equal to the number of conductive patch elements on the first substrate 504. Alternatively, the number of openings in the spacer 508 may be one quarter or one half the number or any other number of conductive path elements on the first substrate 504. Further, the shape of the openings may differ from that shown in FIG. 5A. For example, if one opening is provided for each conductive patch element of circular shape, then the spacer openings may also be circular but larger in diameter than that of the circular conductive patch element. In another example, if the shape of the conductive patch element is non-circular and there is a one-to-one correspondence of openings to conductive patch elements, the shape of the opening may be the same shape as the conductive patch element but also a larger dimension than the conductive patch element.

In order to minimize the effect of the spacer electrical properties on the antenna performance, the spacer opening should be larger than the conductive patch element (or alternatively, the spacer opening should extend beyond the projected area of the conductive patch element) by at least the spacer thickness and preferably the spacer opening should be larger than the conductive patch element by two times the spacer thickness. Additional differences in shape and size will be understood by one of skill in the art and additional details regarding the spacer 508 will be described hereinafter. This approach allows more flexibility in the choice of spacer material than the conventional-art (i.e., a solid spacer) because some variation in the dielectric parameters of the spacer 508 can be tolerated with minimal effect on the patch array antenna assembly. This also allows the use of less expensive materials for fabrication of the spacer 508 than the conventional-art (i.e., a solid spacer).

Figure 5C:
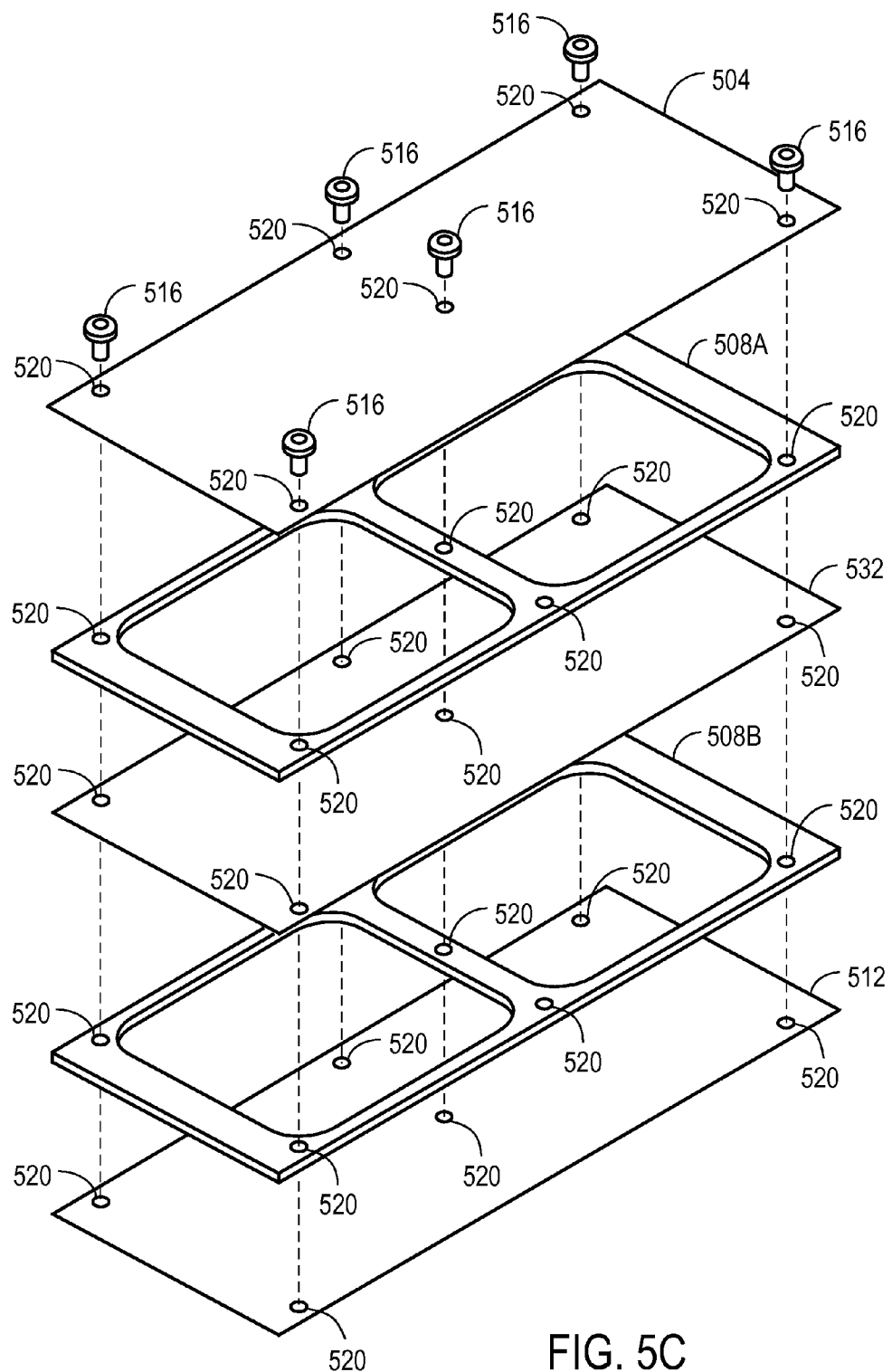
FIG. 5C is an assembly view of an alternate embodiment of the invention.

FIG. 5C shows an exemplary patch antenna assembly that shares the same construction features as shown in FIGS. 5A and 5B, but with the addition of a second instance of spacer 508 and a third substrate 532. This assembly interleaves two spacers, 508A and 508B, between a first substrate 504, a third substrate 532, and a second substrate 512. Third substrate 532 is a conductive patch element carrier, having a plurality of conductive patch elements located on either or both of its two surfaces. In some embodiments, the number of conductive patch elements on the third substrate 532 is equal to the number of conductive patch elements on the first substrate 504, and the plurality of conductive patch elements on the third substrate 532 are concentric with the respective ones of the plurality of conductive patch elements on the first substrate 504 (or alternatively, coincident with a projection of the plurality of conductive patch elements on the first substrate 504). In some embodiments, the conductive patch elements on the first substrate 504 are of a larger area (or diameter if circular) than the conductive patch elements on the third substrate 532. In an embodiment with circular conductive patch elements, the diameter of the conductive patch elements on the first substrate 504 is typically 10% larger than the diameter of the conductive patch elements on the third substrate 532.

The conductive patch elements on the first substrate 504, the conductive patch elements on the third substrate 532, and conductive ground plane 528 on the second substrate 512 form stacked resonant radiating patch antenna elements. A stacked resonant radiating patch antenna element provides wider bandwidth than can be achieved with radiating patch antenna elements comprising a single conductive patch element. Typically, a conventional, single conductive patch element can achieve a resonant radiating patch antenna element with an impedance bandwidth of about 5% of the target operating frequency, whereas a stacked resonant radiating patch antenna element, as described herein, can achieve an impedance bandwidth of up to 20% of the target operating frequency.

In some embodiments, one or both of first substrate 504 and third substrate 532 are formed of a dielectric film material, such as, for example, polyimide. It will be appreciated that other dielectric film materials may used to form the first substrate 504 and/or third substrate 532. The conductive patch elements may be formed by a copper deposition process, such as, for example, copper sputtering. It will be appreciated that alternative methods may be used to form the conductive patch elements. Dielectric film materials are advantageous because they can be used to form a very thin substrate (e.g., 0.1 mm), which, in turn, minimizes undesirable dielectric loading of the resonant radiating cavities by the substrate material. In other embodiments, one or both of the first substrate 504 and third substrate 532 are formed from a printed circuit board. In yet other embodiments, one of either first substrate 504 or third substrate 532 is formed from a printed circuit board while the other is formed from a dielectric film material. The exemplary aperture feeding techniques disclosed below are compatible with this combination three-substrate and two-spacer assembly. In some embodiments, the conductive patch elements 604 are etched in the first substrate 504 using known techniques and known materials. In one embodiment, the conductive patch elements 604 are formed from a metal such as etched copper elements.

Figure 6:
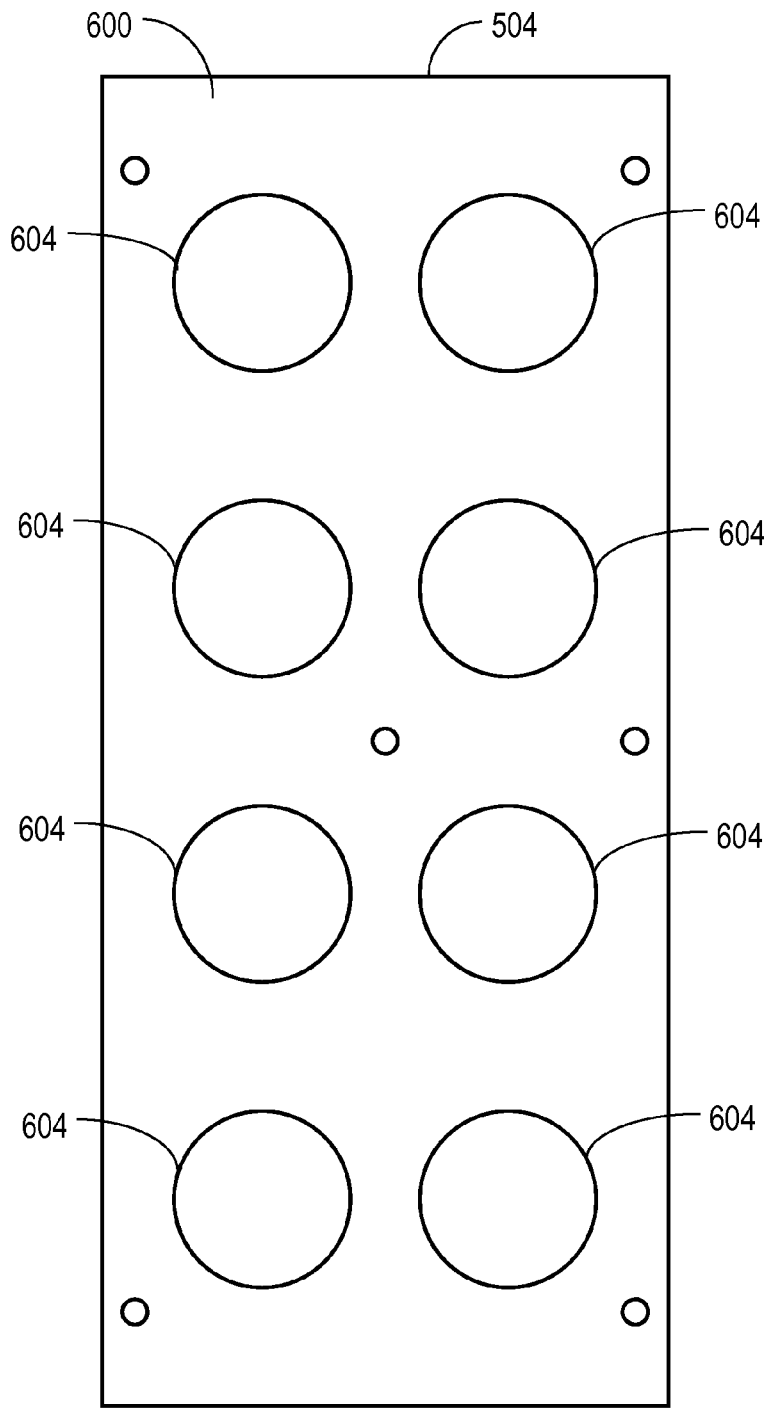
FIG. 6 is a view of the plurality of conductive patch elements on the first substrate of the antenna assembly according to one embodiment of the invention.

FIG. 6 shows a bottom view of the first substrate 504. As shown in FIG. 6, the first substrate 504 includes a surface 600 on which conductive patch elements 604 are located. When assembled, the conductive patch elements 604 on the first substrate 504 and the conductive ground plane 528 on the second substrate 512 form resonant radiating patch antenna elements that can be excited by aperture feeds as described herein. These resonant radiating patch antenna elements support simultaneous excitation in multiple, orthogonal, electromagnetic modes that can correspond to vertical polarization and horizontal polarization or dual-slant 45-degree polarization for the respective far-field directive gain antenna patterns. With the aperture design as described herein, the coupling between the orthogonal modes can be very low.

In some embodiments, the combination of the feed network and the plurality of resonant radiating patch antenna elements form a phased array. In a phased array embodiment, the resonant radiating patch antenna elements are excited in a specific relative phase and amplitude to attain different performance characteristics than what is realizable from a single resonant radiating patch antenna element. Exemplary performance characteristics of a phased array antenna assembly are higher far-field pattern gain, improved spatial selectivity, and increased control over coupling to nearby antennas as also described in greater detail in U.S. patent application Ser. No. 13/898,429 and U.S. Pat. No. 8,467,363, the disclosures of which are hereby incorporated herein by reference in their entirety.

In the embodiment depicted in FIG. 6, the conductive patch elements 604 are arranged in an array of four rows with two columns where each row/column combination corresponds to one conductive patch element 604 within an array. In the embodiment of FIG. 6, the four rows of conductive patch elements 604 in the array are arranged such that the aperture feeds described herein can provide two orthogonal directive gain antenna elements of a patch array antenna assembly each with increased directive gain in the elevation pattern compared to an antenna formed by a single row of one or more resonant radiating patch antenna elements. Similarly, the two columns of conductive patch elements 604 in the array are arranged such that the aperture feeds described herein can provide two orthogonal directive gain antenna elements of an antenna assembly each with increased directive gain in the azimuthal pattern compared to an antenna formed by a single column of one or more resonant radiating patch antenna elements. Other array embodiments (not shown) may have only a single column of conductive patch elements 604 or may have more than two columns of conductive patch elements 604 or may have either more or less than four rows of conductive patch elements 604. It will be further appreciated that the first substrate 504 may include fewer than eight or more than eight conductive patch elements 604.

In the embodiment depicted in FIG. 6, the conductive patch elements 604 are located on the bottom surface (that is, the surface adjacent to the spacer when assembled) of the first substrate 504 so that, when assembled, the material that forms the spacer 508 is not within the resonant radiating cavity formed by the conductive patch elements 604 and the conductive ground plane 528. Those skilled in the art will recognize that the conductive patch elements 604 can alternately be located on the top surface of the first substrate 504. This arrangement is less desirable, since the dielectric parameters of the first substrate 504 will more heavily influence the resonant frequency of the resonant radiating cavity, or hence each resonant radiating patch antenna element. This dielectric loading can be accounted for in design of the conductive patch element shape and size, but in practice, variability in the dielectric parameters of the first substrate will then cause undesirable variability in resonant frequency of the resonant radiating patch antenna element.

FIG. 7 illustrates an exemplary arrangement of the spacer 508 relative to the bottom surface of the first substrate 504. As shown in FIG. 7, the openings 524 in the spacer 508 are designed to coordinate with the conductive patch elements 604. In particular, the opening 524A is aligned with four of the patch elements 604, and opening 524B is aligned with the other four patch elements 604 on the bottom surface of the first substrate 504. As explained above, each of the openings 524A, 524B is designed to ensure the spacer does not significantly impinge into the resonant radiating cavity formed between the conductive patch element and the conductive ground plane. For example, in a specific embodiment optimized for operation at 5.3 GHz, the patch elements have a radius of 12.42 mm, the spacer thickness is 2.4 mm and the spacer opening is larger than the projected area of each conductive patch element by at least 5.08 mm.

As shown in FIG. 7, the openings are shown having a rectangular shape having rounded edges. However, it will be appreciated that alternative shapes may be used. For example, the openings may be circular, the radius of the curve may be less than or greater than that shown in FIG. 7, the openings may be rectangular, etc., as understood by those of skill in the art.

In one embodiment, the openings 524 in the spacer 508 are designed for multiple antenna assemblies that operate at differing target operating frequencies. As understood by those of skill in the art, the dimensions and relative position of the conductive patch elements differ depending on the desired target operating frequency of the antenna assembly. By correctly sizing the openings in the spacer, one spacer may be used with antenna assemblies for these differing operating frequencies. For example, the same spacer 508 may be used with a substrate 504 that is configured for a 5.3 GHz target operating frequency, a 5.6 GHz target operating frequency and a 5.8 GHz target operating frequency. In this example, setting the spacer opening dimensions sufficiently large enough to cause negligible antenna performance variation effects to the 5.3 GHz conductive patch element, as described above, also causes the spacer opening to be large enough for the 5.6 GHz and 5.8 GHz optimized designs.

Figure 8A:
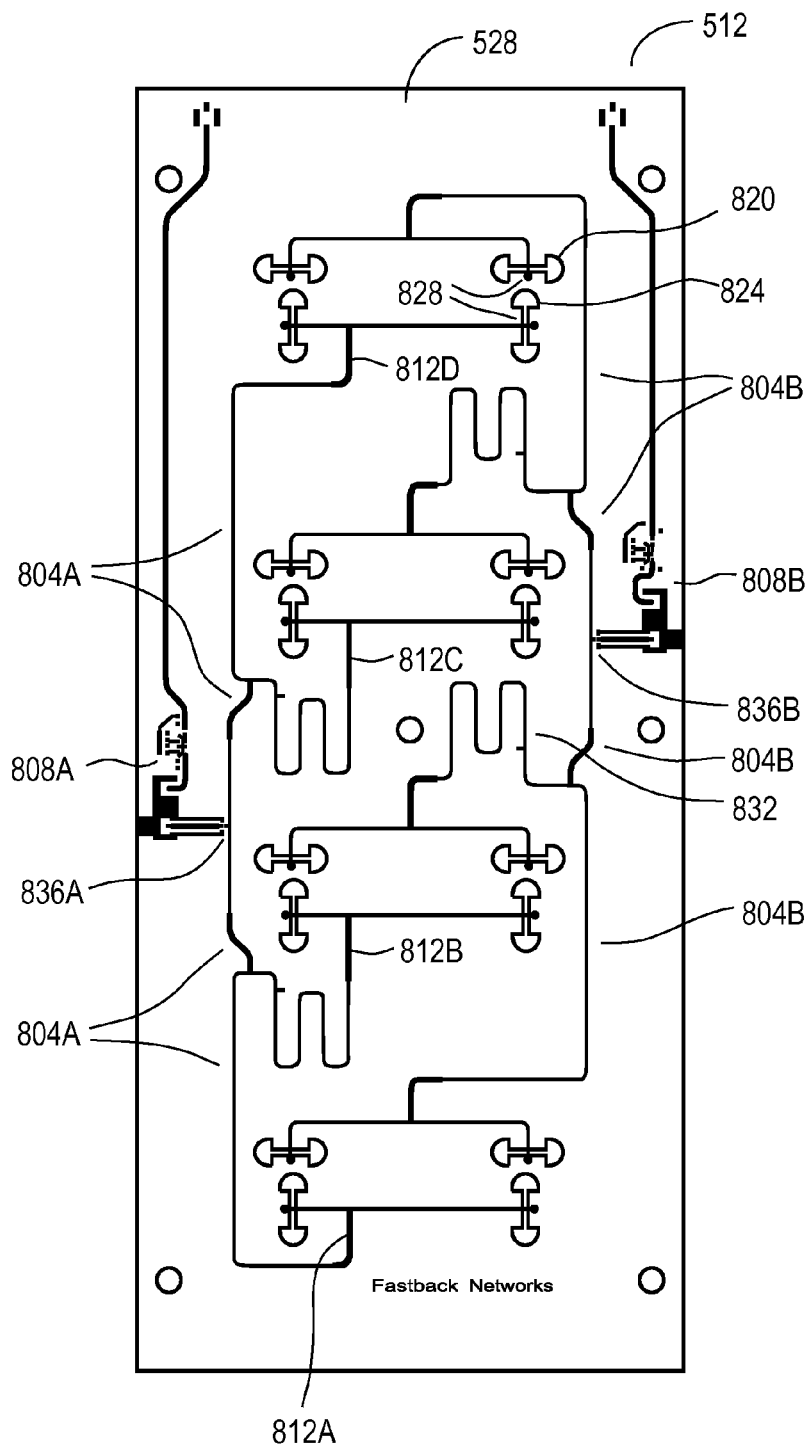
FIG. 8A is a detailed view of both the first layer and the second layer of the second substrate of the antenna assembly according to one embodiment of the invention.

FIG. 8A is a view of the second substrate 512 illustrating both a first layer or "top surface" that comprises a plurality of pairs of apertures 820, 824 being repeated across the conductive ground plane 528 and a second layer or "bottom surface" that comprises transmission line feed networks such as 804A and 804B. As shown in FIG. 8A, the second substrate 512 includes microstrip transmission line feed networks 804A and 804B each with respective feed points 836A and 836B. As understood by those of skill in the art, these feed networks might also be realized as stripline transmission line structures if the second substrate were a multi-layered printed circuit board with more than two layers and multiple ground planes. In FIG. 8A, radio transceiver electronics component placement patterns 808a and 808b are co-located with the microstrip feed networks 804 on the bottom side of the printed circuit board substrate 512 which in this embodiment corresponds to the second layer. The co-location of radio transceiver components on the same substrate as the feed network provides a very short, and in turn low-loss, interconnect between the feed points 836A and 836B and the rest of the radio components. For example, co-locating a low noise amplifier and preferably also at least one RF bandpass filter on the same substrate as the feed network is advantageous because this increases the amount of loss in cables that may be part of the coupling between directive gain antenna elements and receive RF chains that can be tolerated without any degradation in the radio link performance.

In some embodiments, electronic components may be located within the feed networks 804. The integration of electronic components for tunable elements such as tunable capacitors in series or shunt with lumped element or distributed circuit elements within the feed network allows dynamic adjustment of the characteristics of the patch array antenna assembly, such as far-field radiation patterns, cross-coupling between the orthogonal polarizations as measured at their feed points, or coupling to nearby antennas, in order to optimize a desired radio link metric, such as a signal to noise and/or interference ratio or such as a degree of isolation between an directive gain antenna element used for transmit and another used for receive under full duplex operation conditions. In an exemplary IBR embodiment, the RRC 360 (or some other controller such as a ZDD Canceller Loop Coefficients Generator described in U.S. patent application Ser. No. 14/108,200 and U.S. Pat. Nos. 8,638,839 and 8,422,540, the disclosures of which are hereby incorporated herein by reference in their entirety) provides or causes to be provided an input signal to the tunable element so that the antenna assembly characteristic is adjusted according to the desired metric.

FIG. 8A shows a plurality of pairs of apertures 820, 824 being repeated across the conductive ground plane 528 on the top surface, or first layer, of the second substrate in a pattern that matches the distribution of conductive patch elements on the first substrate, as shown within an array in FIG. 7. Preferably, the apertures are divided into pairs 820, 824. Each pair of apertures includes a first aperture 820 in a first direction, and a second aperture 824 in a second direction that is orthogonal to the first aperture 820. In some embodiments, each pair of apertures 820, 824 corresponds to one of the conductive patch elements 604 on the first substrate 504. Each aperture 820 or 824 excites its corresponding resonant radiating patch antenna element in a single respective electromagnetic mode, and the respective modes are then orthogonal to each other in an electromagnetic sense. The two apertures in each pair of apertures are arranged such that the end point of a first aperture 824 is aligned with the mid-point of a second aperture 820, in a T-shape. This T-shape arrangement achieves a very low coupling between the two orthogonal apertures as compared with the more common L-shape arrangement of the conventional art where the two apertures are aligned at one endpoint. Such desirable lower coupling occurs at least because the relative excitation of the T-shape arrangement is in common mode which causes a cancellation effect to the other aperture.

Figure 8B:
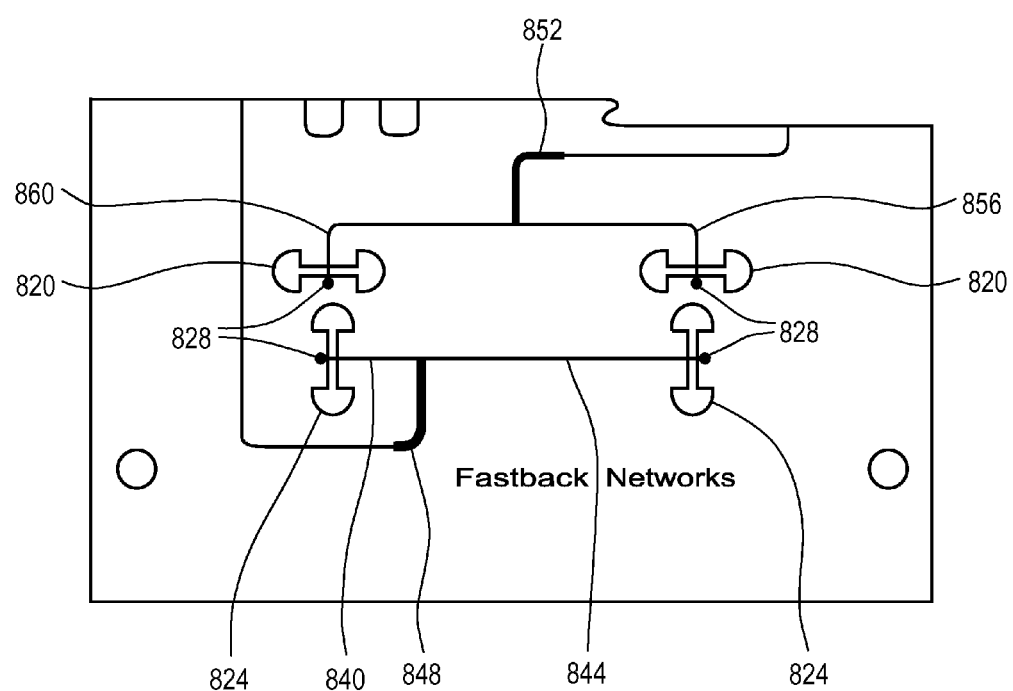
FIG. 8B is a detailed view of the transmission line feed network portions near the apertures of the second substrate of the antenna assembly according to one embodiment of the invention.

As shown in FIG. 8A, the left hand column of vertical apertures 824 is fed from the right-hand side. This means that each respective feedline portions 812A to 812D overlap each aperture by crossing over a rectangular aperture body for each respective left hand vertical aperture 824 from a center point on the right of the rectangular aperture body to a termination point 828 on the left of the rectangular aperture body, as also illustrated in FIG. 8B. Similarly, the right hand column of vertical apertures 824 is fed from the left-hand side. Thus, in some embodiments, the vertical apertures depicted in FIG. 8A for excitation of the resonant radiating patch antenna elements set by the array of conductive patch elements depicted in FIG. 6 are fed in an opposite direction for the first or left hand column of respective pairs of apertures and conductive patch elements from the direction for the second or right hand column of respective pairs of apertures and conductive patch elements. The feedline portions 812A through 812D must be offset by an electrical length of 90 degrees towards one column to phase align the electrical modes excited in the two columns of conductive patch elements in order to achieve the desired array properties. The feedline portions 812A to 812D are shown with an offset of 90 degrees equivalent electrical length at the target operating frequency to the left-hand side of the "center" of each of the feedline portions 812A to 812D, but could also be offset by 90 degrees to the right hand side. This feed arrangement is advantageous because it minimizes the space needed on the substrate 512 so that more feeds, apertures and conductive patch element combinations can be included in the patch array antenna assembly, thereby increasing the potential array gain that can be realized from a given substrate size.

As shown in FIG. 8A, one or more of the feed lines may also include a meandering line portion 832. The meandering line portion 832 may include one or more bends so that the physical distance or electrical length (and hence the group delay) is the same from each common feed point 836A or 836B to each respective aperture 824 or 820 in the array structure Conventional art approaches, such as series feeding techniques, match only the relative phase of each aperture—not the group delay, like the feeding technique illustrated in FIG. 8A. The matched group delay approach (e.g., using the feed line having a meandering line portion shown in FIG. 8A) is advantageous because the resulting feed network maintains proper phase excitation of the array of resonant radiating patch antenna elements independently of frequency, thereby resulting in a very broadband feed structure.

Additionally, as shown in FIG. 8A, the feed lines 804 are terminated in a short circuit. By tuning the aperture width as described herein, the feed lines 804A and 804B can be terminated in a short circuit—rather than an open stub as in the conventional art—using the vias 828. The vias 828 extend from the feed network 804A and 804B on one surface of the second substrate 512 (or optionally, if stripline, from a feed network on an inner layer) and through to the ground plane to the opposing surface of the second substrate 512 to form a short circuit termination, thereby realizing the advantage of lower backwards facing radiation as described above.

FIG. 8B further illustrates the offset arrangement of the feed network. As shown in FIG. 8B, horizontal apertures 820 are fed by a feedline portion 852, which splits into two feedline portions 856 and 860. In FIG. 8B, feedline portions 856 and 860 are the same distance from the 3-way T-junction joining feedline portions 852, 856 and 860, and the resulting symmetric structure ensures horizontal apertures 820 are excited by feedline portions that overlap the rectangular aperture body by overlapping (via crossing over) the rectangular aperture body in the same direction with the same relative phase angle as is desirable for the array performance in this exemplary embodiment. As shown in FIG. 8B, vertical apertures 824 are fed by a feedline portion 848 which splits into feedline portions 840, 844. In FIG. 8B, the feedline portion 844 is electrically longer than the feedline portion 840 by a distance equivalent to 180 degrees in phase to correct for the phase offset of the mirrored feeds (left-hand versus right-hand) as described above.

FIG. 8B further illustrates the short circuit termination. As shown in FIG. 8B, each of the feedline portions 856, 860, 840, 844 terminates with a via 828 that connects to the conductive ground plane 528. As explained above, the vias 828 result in short circuit terminations of each of the feedline portions.

Figure 8C:
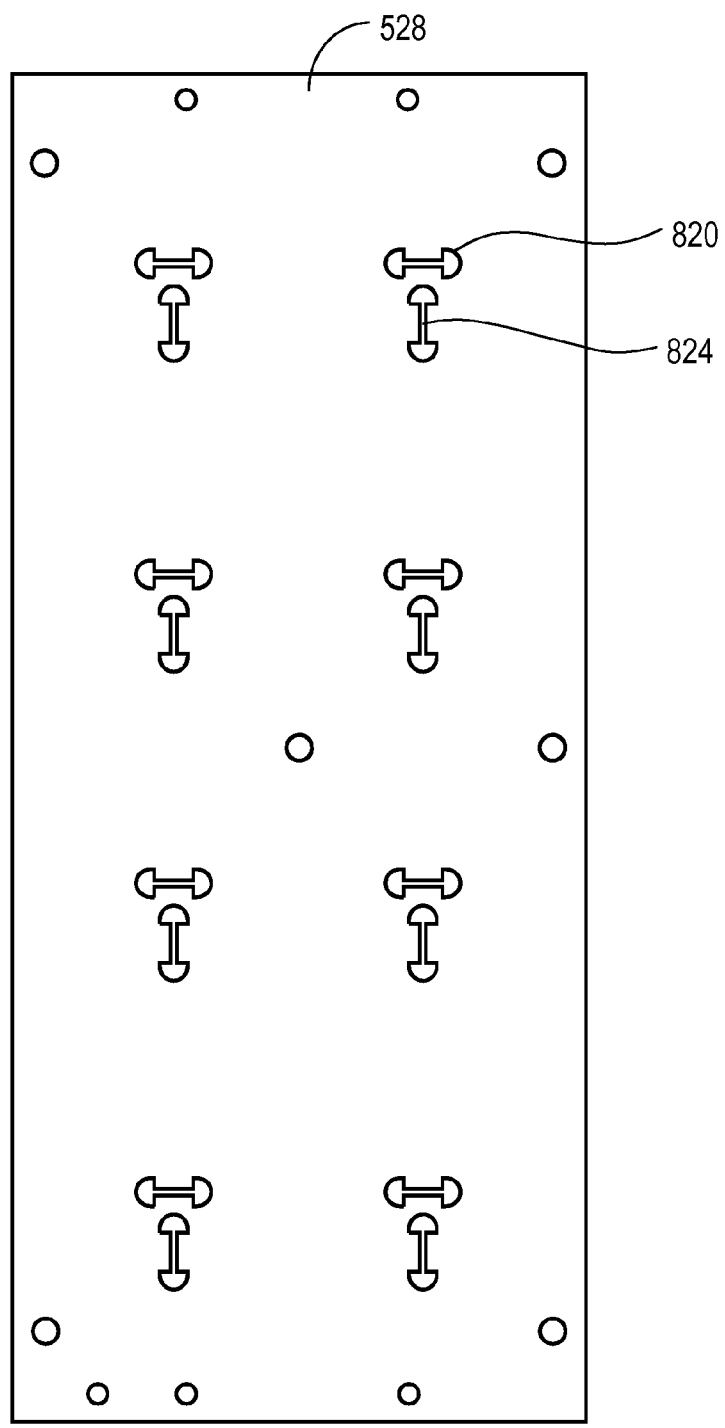
FIG. 8C is a detailed view of the first layer of the second substrate of the antenna assembly according to one embodiment of the invention.

In some embodiments, as shown in FIG. 8C, a first layer of the second substrate 512 is located at the surface adjacent to spacer. In FIG. 8C, the second substrate 512 includes a ground plane with a plurality of apertures 820, 824. Other openings in the conductive ground plane 528 are locations of drilled holes used for assembly purposes and are not additional apertures within the antenna assembly.

Figure 8D:
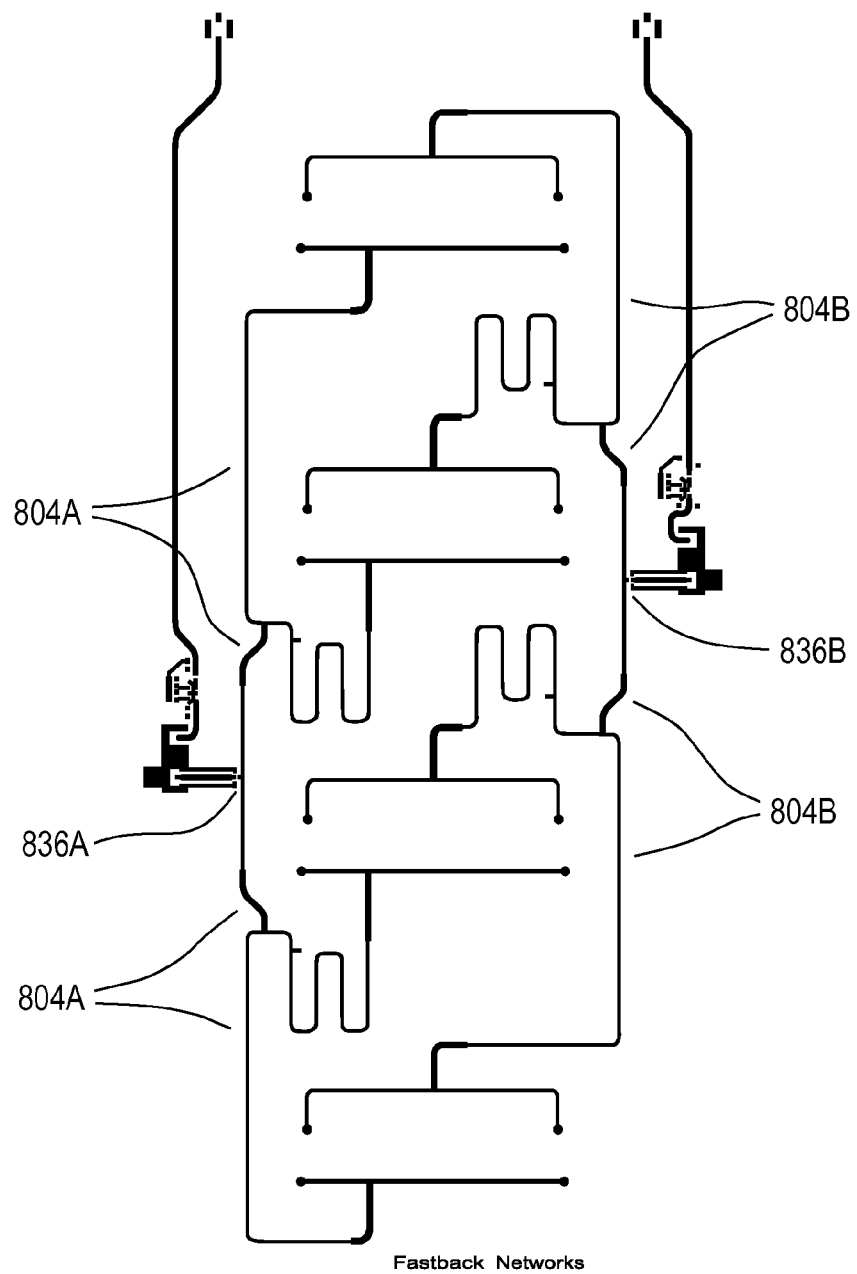
FIG. 8D is a detailed view of the second layer of the second substrate of the antenna assembly according to one embodiment of the invention.

In some embodiments, as shown in FIG. 8D, a second layer is located at the surface opposite to spacer 508 of the second substrate 512, including first and second transmission line feed networks 804A and 804B. In other embodiments that use a multi-layer PCB, the portion of FIG. 8D showing the first and second transmission line feed networks 804A and 804B may be located on an inner layer between two ground planes using stripline structures instead of microstrip.

Figure 8E:
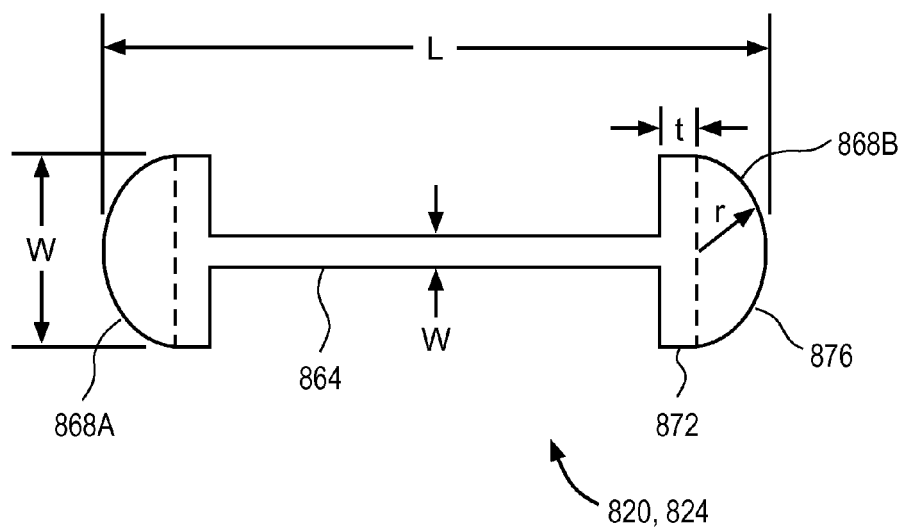
FIG. 8E is a detailed view of one of the plurality of apertures within the first layer of the second substrate of the antenna assembly according to one embodiment of the invention.

FIG. 8E is a detailed view of the apertures 820, 824 that are used to feed the resonant radiating patch antenna elements. As shown in FIG. 8E, the aperture is defined by a rectangular aperture body 864 and two aperture ends 868A and 868B. The aperture ends 868A and 868B are wider than the width of the rectangular aperture body 864. In some embodiments, as shown in FIG. 8E, the edges of the aperture ends 868 are tapered or rounded.

The rectangular aperture body 864 has an aperture body width w that is chosen to be as narrow as can be reliably fabricated by standard printed circuit board construction capabilities for the selected PCB that forms the second substrate 512. Under current processing capabilities, an aperture body width w of about as low as 10 mils (0.38 mm) may be used, although smaller values are already possible. However, it will be understood that as etching process capabilities improve, the width of the aperture body w may decrease. The aperture body width w may also be selected to other widths as known to those of skill in the art. In order to minimize rearward facing radiation and maximize coupling to the resonant radiating cavity, the aperture may have a narrow aperture body width, w, with wider openings at both aperture ends 868A and 868B. In one embodiment, the aperture end width is more than five times wider than the aperture body width. These aperture openings are described further below.

In some embodiments, the shape of the aperture ends 868A and 868B consists of a combination of a rectangular end 872 and a semi-circular end 876. The rectangular end 872 has a width t and a length equal to the aperture end width W, and the semi-circular end 876 has a radius r. In some embodiments, the radius r of the semi-circular end 876 is half of the aperture end width W. In some embodiments, the aperture end width W is selected to be one third of the aperture length L, and the width t of the rectangular end 872 is one third of the radius r of the semi-circular end 876 (or hence one sixth of the aperture end width W). Thus, the shape of the apertures is scalable according to a target operating frequency for the antenna assembly using the relationships between the aperture dimensions described in this paragraph (for example, W=L/3, r=L/6, t=L/18), where a single variable, L, is scaled proportionally to the desired frequency of operation.

In one particular embodiment, the aperture length L is 10.42 mm for a patch array antenna assembly operating at 5300 MHz. In another particular embodiment, the aperture length L is 9.98 mm for a patch array antenna assembly operating at 5600 MHz. In yet another particular embodiment, the aperture length L is 9.7 mm for a patch array antenna assembly operating at 5788 MHz. It will be appreciated that the aperture may have different aperture lengths L depending on, for example, the operating frequency, the thickness of the spacer 508, and the size of the conducting patch element 604, as understood by those of skill in the art. It follows that ability to dynamically alter the electrical size of the aperture, whether by electrical or mechanical mechanism, allows dynamic adjustment of the resonant frequency (or hence, the optimal operating frequency) of the aperture feed structure and hence performance of the antenna assembly.

Figure 8F:
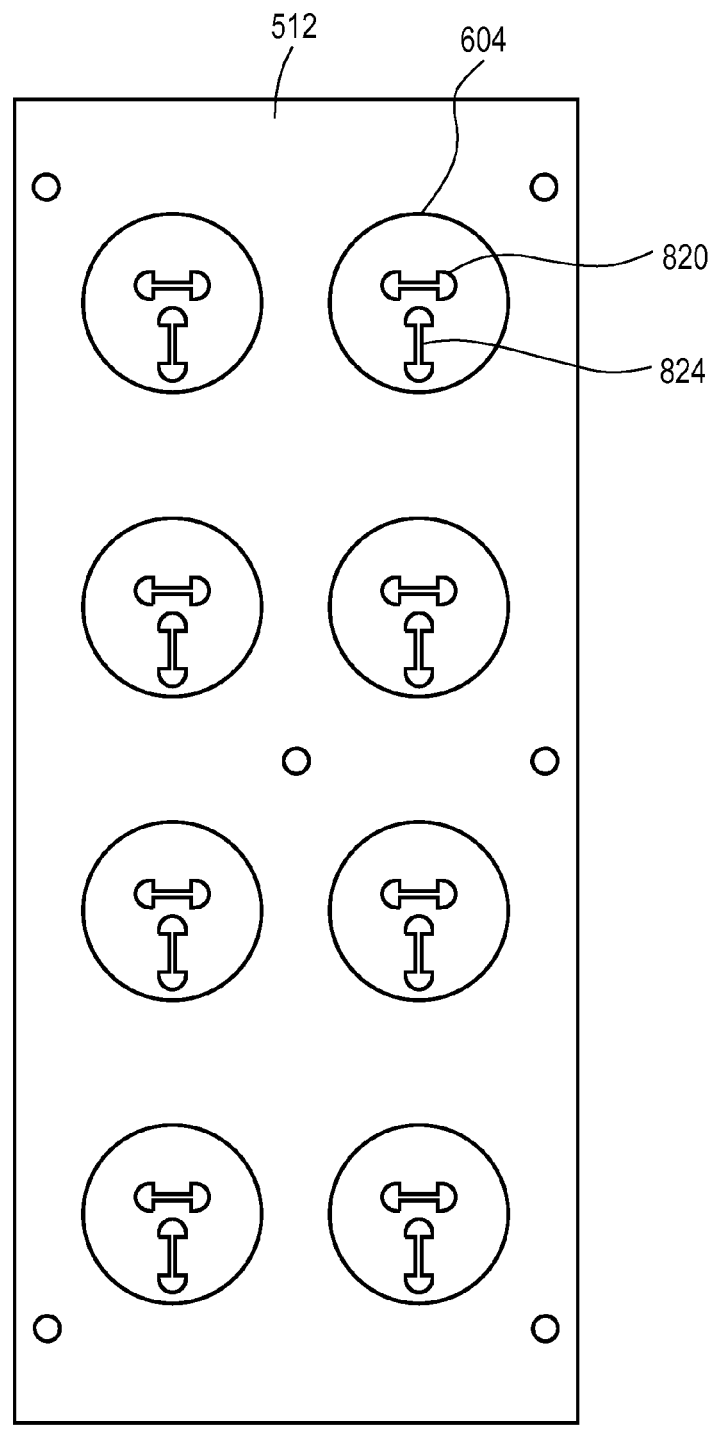
FIG. 8F is a view of the first and second substrates showing how the plurality of pairs of apertures on the first layer of the second substrate align with the plurality of conductive patch elements on the first substrate according to one embodiment of the invention.

In some embodiments, as shown in FIG. 8F, the projection of the respective pairs of apertures 820 and 824 within the first layer of the second substrate 512 located at the surface adjacent to spacer 508 upon the outlines of the conductive patch elements 604 in the first substrate 504. As can be seen from FIG. 8F, the apertures 820 and 824 do not need to be precisely centered relative to each conductive patch element 604. Each of the apertures 820 and 824 has a long axis parallel to the long dimension of the aperture and in the plane of the conductive ground plane, and a narrow axis parallel to the narrow dimension of the aperture and in the plane of the conductive ground plane. The magnetic fields for the respective electromagnetic mode excited by an aperture are approximately constant inside the resonant radiating cavity in the dimension of the long axis, but vary significantly in the dimension of the narrow axis with maximum in the center of the conductive patch element and diminishing to near zero at the edges of the conductive patch element. The aperture electromagnetic coupling is primarily magnetic coupling (inductive). Moving the apertures along the long axis does not significantly affect this magnetic coupling because the magnetic fields within the resonant radiating cavity are approximately constant in this direction. Moving the apertures along the short axis significantly affects the magnetic coupling mechanism because the magnetic fields vary in this direction. Hence, the arrangement of apertures illustrated in FIG. 8F co-optimizes the respective magnetic coupling to the resonant radiating cavity in both apertures 820 and 824. Aperture 824 is shifted significantly along its long axis, and aperture 820 is shifted slightly along its narrow axis.

Figure 9:
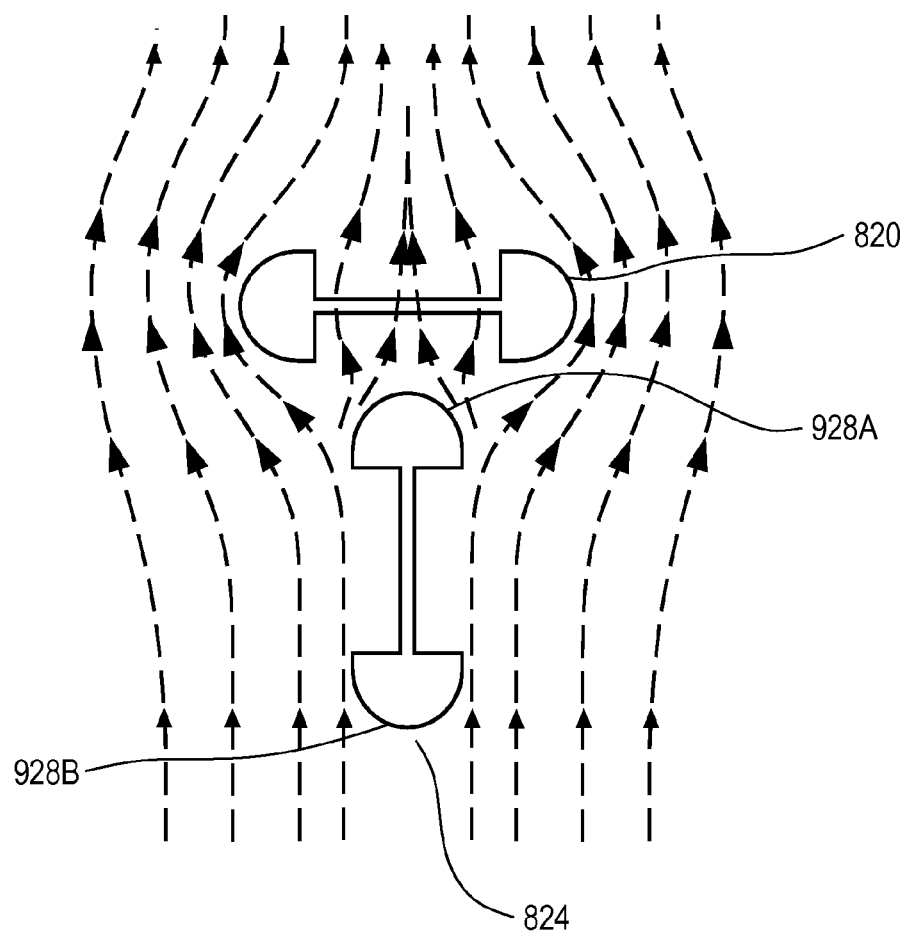
FIG. 9 is a view showing the surface current of the second substrate using the aperture feed arrangement according to one embodiment of the invention.

FIG. 9 illustrates a diagram showing the surface current distribution at a pair of apertures 820, 824 showing additional advantages of the aperture design according to embodiments of the invention. In FIG. 9, feed lines 960 which terminate in a short circuit 828 drive the aperture 820. As shown in FIG. 9, the current distortion owing to the second orthogonal aperture 824 is minimized by rounded edges 928A and 928B, thereby making the input impedance of each aperture evenly balanced and improving the radiation efficiency.

In an embodiment as described herein with four rows and two columns of conductive patch elements operating at a target frequency of 5300 MHz and aperture dimensions as described above, a patch diameter is 28.5 mm, a conductive patch element thickness is 18 um, a spacer thickness is 2.4 mm, a first substrate thickness is 0.508 mm, a second substrate thickness is 0.762 mm, a center to center column spacing is 34 mm, a center to center row spacing is 42.45 mm, outer dimensions for both a first substrate and second substrate are 78 mm×185 mm, aperture 824 offset is 5.5 mm from the center of the respective conductive patch element and aperture 820 offset is 2.5 mm from the center of the respective conductive patch element. This embodiment achieves a patch array antenna assembly with port to port isolation of >35 dB across the operating band of 5250 MHz to 5350 MHz, a vertically polarized far-field radiation pattern with 16.3 dB gain, 16.1 degree vertical beamwidth, 42 degree horizontal beamwidth, −0.8 dB radiation efficiency, and a second horizontally polarized far-field radiation pattern with 16.3 dB gain, 16.9 degree vertical beamwidth, 39 degree horizontal beamwidth, and −0.8 dB radiation efficiency.

Figure 10A:
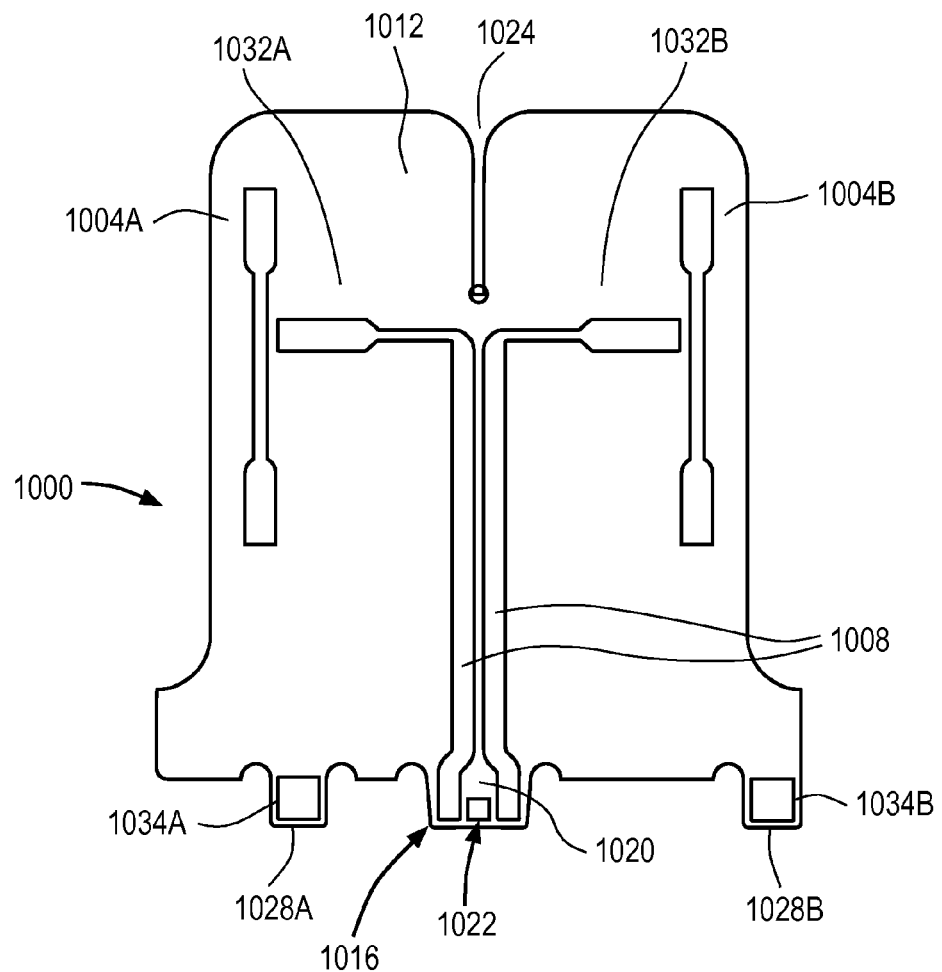
FIG. 10A is a detailed view of a unitary dipole antenna element for a dipole array antenna assembly according to one embodiment of the invention.

FIG. 10A illustrates an exemplary unitary dipole antenna element 1000 having a driven coplanar dipole 1032 with dipole branches 1032A and 1032B and respective parasitic elements 1004A and 1004B. In one embodiment, each unitary dipole antenna element 1000 will be arranged as an array of such elements to provide a horizontally polarized far-field directive gain antenna pattern. The structure of driven coplanar dipole 1032 is referred to as coplanar because both dipole branches 1032A and 1032B are located on the same surface of substrate 1012 as coplanar feed line pair 1008, which serve as the feed transmission line. Parasitic elements 1004A and 1004B broaden the radiation pattern in the plane of the surface of substrate 1012 having the driven coplanar dipole 1032 and the coplanar feed line pair 1008, and may or may not be on the same side of the substrate as driven coplanar dipole 1032 and coplanar feed line pair 1008.

Parasitic elements 1004A and 1004B are approximately half-wavelength resonant dipole elements at the target operating frequency. In some embodiments, these parasitic elements 1004A and 1004B are asymmetrically offset towards the conductor connection end of substrate 1012 relative to the axis of driven coplanar dipole 1032, as shown in FIG. 10A. This offset enhances the mutual coupling between the driven coplanar dipole branches 1032A and 1032B and respective parasitic elements 1004A and 1004B. Driven coplanar dipole 1032 is approximately a one-half wavelength resonant dipole and features strong electric fields at the ends of dipole branches 1032A and 1032B where respective parasitic elements 1004A and 1004B are located. As a result, the coupling mechanism between driven coplanar dipole 1032 and parasitic elements 1004 is primarily electric (capacitive), as opposed to magnetic (inductive). The electric fields created by driven coplanar dipole 1032 are symmetric about the axis of dipole branches 1032A and 1032B. This relative offset between driven coplanar dipole 1032 and parasitic elements 1004 causes the symmetric electrical fields of dipole branches 1032A and 1032B to couple to a differential electromagnetic mode in respective parasitic elements 1004A and 1004B. Half-wave dipoles resonate readily when excited via differential-mode electromagnetic stimulus, but not to a common-mode electromagnetic stimulus, and so the offset is necessary to achieve adequate mutual coupling. Adjusting the length of the parasitic elements 1004A and 1004B controls the relative phase of the mutual coupling, and in turn the relative phase between the electric current on driven coplanar dipole 1032 and the electric current on parasitic elements 1004. Adjusting this relative phase between these electric currents achieves the desired far-field pattern. The input impedance of driven coplanar dipole 1032 can be tuned by adjusting the length and shape of dipole branches 1032A and 1032B, whilst maintaining a fixed relative spacing to respective parasitic elements 1004A and 1004B.

Coplanar feed line pair 1008 connects the driven unitary dipole antenna element 1000. Dipoles are a balanced antenna, and as such are well suited to excitation by balanced transmission lines, such as coplanar strips arranged as a coplanar feed line pair. Coplanar feed line pair 1008 extends onto conductor connection substrate tab 1016. The conductor connection substrate tab 1016 can be inserted into a slot (or conductor connection cutout) on an orthogonal backplane substrate, where the increased spacing 1020 between the branches of the coplanar feed line pair 1008 facilitates connection to another balanced transmission line structure, such as coupled microstrip lines. In some embodiments, each substrate 1012 having a unitary dipole antenna element 1000 is repeated as individual elements in a dipole array antenna assembly, wherein each individual unitary dipole antenna element 1000 is coupled separately to a feed network on the orthogonal backplane substrate. Additional features for mechanical fastening to orthogonal substrates can be included, such as assembly slot 1024 and mechanical tabs 1028A and 1028B. Each mechanical tab 1028A or 1028B can also have one or more metalized pads 1034 as depicted in FIG. 10A that can be on either or both surfaces of the substrate 1012 such that each mechanical tab aligns with an additional cutout in an orthogonal substrate and each metalized pad 1034 adjoins another metalized pad on the orthogonal substrate for soldering. These orthogonal substrates may include, but are not limited to, an orthogonal backplane substrate as described herein. Metalized pad 1022, typically located on the opposite surface of substrate 1012 from the surface comprising the coplanar feed line pair 1008, is an exemplary feature for providing additional mechanical fastening. The use of these mechanical fastening features will be illustrated in further detail hereinafter.

In the embodiment depicted in FIG. 10A, a unitary dipole antenna element for a target operating frequency of 5.66 GHz comprises a driven coplanar dipole 1032 with overall length of 18 mm and outer width of 1.5 mm, and parasitic elements 1004 of length of 16 mm and of outer width of 1.5 mm. The parasitic elements 1004 are located on the opposite side of substrate 1012 from the driven coplanar dipole 1032 with rearward offset of 1.5 mm relative to the centerline of the dipole branches 1032 and spacing of 11.05 mm from the center of coplanar strips to center of parasitic elements. Coplanar feed line pair 1008 have an inside edge-edge spacing of 0.3 mm and each a width of 1 mm. The distance from the axial centerline of dipole branches 1032 to the bottom edge of substrate 1012, the plane of the orthogonal backplane substrate, is 20 mm.

Figure 10B:
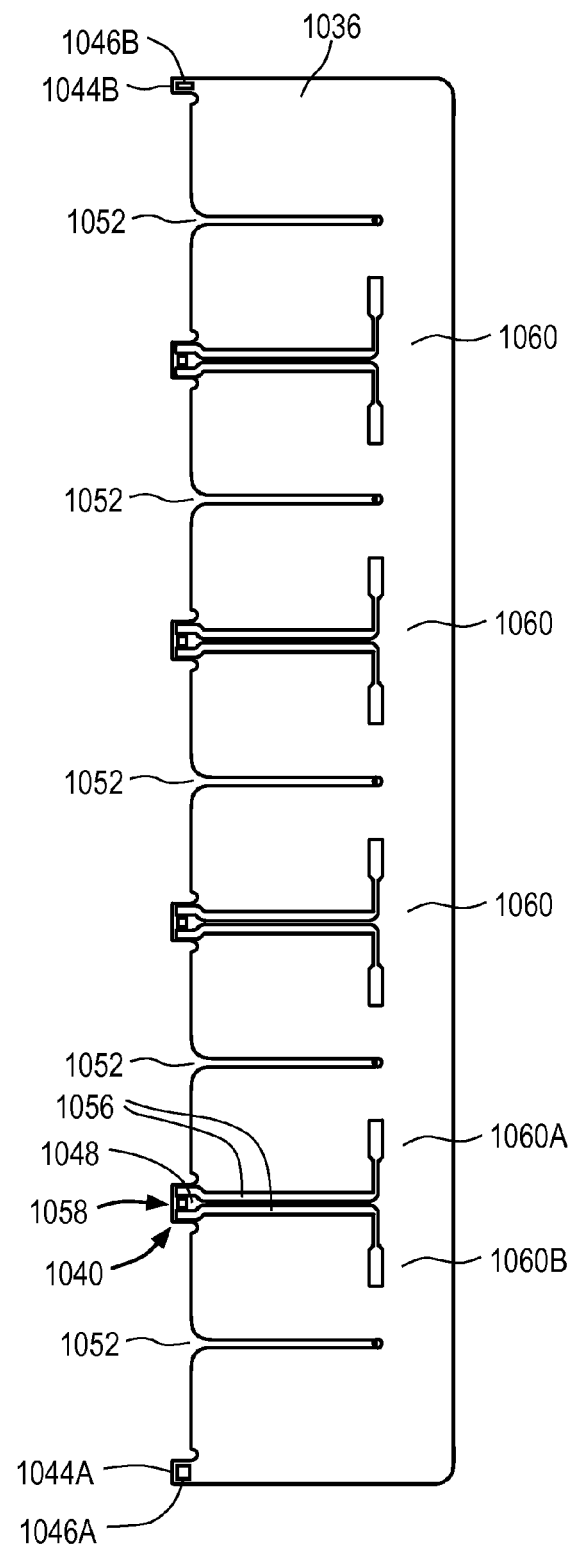
FIG. 10B is a detailed view of a plurality of coplanar dipole antenna elements for a dipole array antenna assembly according to one embodiment of the invention.

FIG. 10B illustrates four coplanar dipole antenna elements 1060 each fed by a respective coplanar feed line pair 1056, and arranged as a vertical array on common substrate 1036 to provide a vertically polarized far-field directive gain antenna pattern. Each coplanar dipole antenna element 1060 comprises dipole branches 1060A and 1060B. For each of coplanar dipole antenna elements 1060, respective ones of coplanar feed line pair 1056 and dipole branches 1060A and 1060B are located on the same surface of substrate 1036, forming a coplanar half-wavelength resonant dipole. The coplanar feed line pair 1056 extends onto conductor connection substrate tab 1040. The conductor connection substrate tab 1040 can be inserted into a slot (or conductor connection cutout) on an orthogonal backplane substrate, where the increased spacing 1048 between the branches of the coplanar feed line pair 1056 allows connection to another balanced transmission line structure, such as coupled microstrip lines. Additional features for mechanical fastening to orthogonal substrates can be included such as assembly slots 1052A to 1052E and mechanical tabs 1044A and 1044B. Each mechanical tab 1044A or 1044B can also have one or more metalized pads 1046A and 1046B as depicted in FIG. 10B that can be on either or both surfaces of the substrate 1036 such that each mechanical tab aligns with an additional cutout in an orthogonal substrate and each metalized pad 1034 adjoins another metalized pad on the orthogonal substrate for soldering. These orthogonal substrates may include, but are not limited to, an orthogonal backplane substrate as described herein. Respective metalized pads 1058, typically located on the opposite surface of substrate 1036 from coplanar feed line pair 1056, are an exemplary feature for providing additional mechanical fastening. The use of these mechanical fastening features will be illustrated in further detail hereinafter.

Coplanar dipoles antenna elements 1060 of FIG. 10B are all located on the same surface of substrate 1036; however, in some embodiments, one or more of coplanar dipole antenna elements 1060 may be located on one side of the substrate 1036 and the remainder of the coplanar dipole antenna elements 1060 on the other side of substrate 1036.

In the embodiment depicted in FIG. 10B, coplanar dipole antenna elements 1060 for a target operating frequency of 5.66 GHz have an overall length of 19.75 mm and outer width of 1.6 mm. Coplanar feed line pair 1056 has an inside edge-to-edge spacing of 0.2 mm and each a width of 1 mm. The center-to-center spacing between adjacent instances of coplanar dipole antenna elements 1060 is 32.46 mm. The distance from the axial centerline of dipole branches 1060 to the left side of substrate 1036, the plane of the orthogonal backplane substrate, is 21 mm.

Figure 11A:
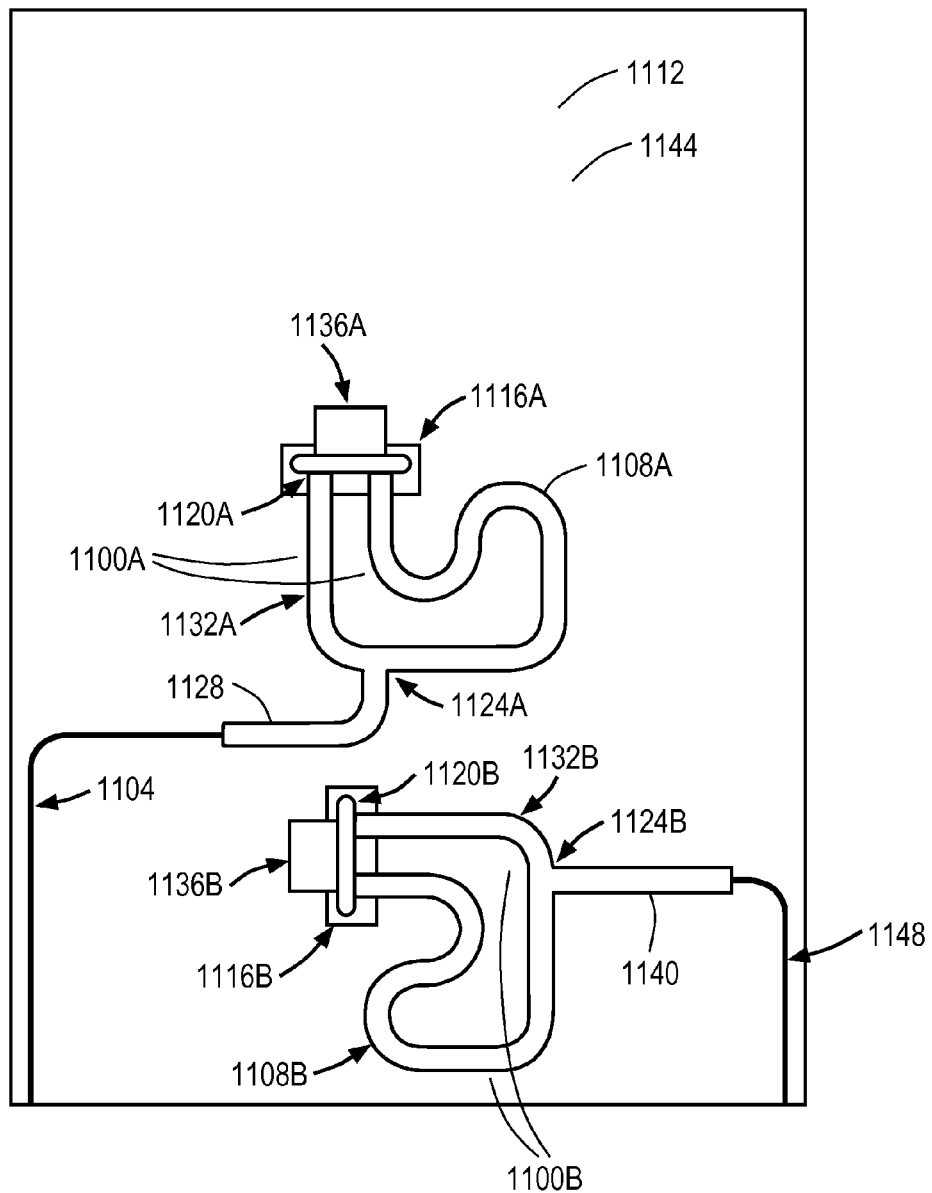
FIG. 11A is a detailed view of a microstrip feed structure portion for a dipole array antenna assembly according to one embodiment of the invention.

FIG. 11A illustrates two instances of exemplary microstrip feed structure portion 1100 of a transmission feed line network that facilitates electrical interconnect between a balanced element, such as one of unitary dipole antenna elements 1000 or coplanar dipole antenna elements 1060, to a feed network on orthogonal backplane substrate 1112. Two alternate orientations of the exemplary microstrip feed structure portion, 1100A and 1100B, are illustrated in FIG. 11A. In some embodiments, the backplane substrate 1112 is a printed circuit board. Orthogonal backplane substrate 1112 features a bottom outer layer (or first layer) that is a conductive plane 1144, which fulfills several functions including providing a reflective plane for unitary dipole antenna elements 1000 and coplanar dipole antenna elements 1060, and also providing a ground plane for the microstrip feed structure portion 1100.

Orthogonal backplane substrate 1112 contains a plurality of conductor connection cutouts 1120 that are sized to accommodate conductor connection substrate tabs 1040 and 1016. When conductor connection substrate tab 1016, for example, is inserted into conductor connection cutout 1120A, substrates 1012 and 1112 are oriented orthogonally to each other. Three distinct connections can be made between the substrates 1012 and 1112 using, for example, solder fillet. These connections include (1) one of the conductors that forms a branch of the coplanar feed line pair 1008 is connected to microstrip line 1132A, (2) the other conductor from the other branch of coplanar feed line pair 1008 is connected to microstrip line 1108A, and (3) metalized pad 1022 is connected to metalized pad 1136A for mechanical fastening (see also FIG. 11B). Likewise, when conductor connection substrate tab 1040 is inserted into conductor connection cutout 1120B that is rotated 90 degrees relative to a conductor connection cutout 1120A, substrates 1036 and 1112 are oriented orthogonally to each other. Again, three distinct connections between substrates 1036 and 1112 can be made using, for example, solder fillet. These three connections include: (1) one of the conductors that forms a branch of the coplanar feed line pair 1056 is connected to microstrip line 1132B, (2) the other conductor from the other branch of coplanar feed line pair 1056 is connected to microstrip line 1108B, and (3) metalized pad 1058 is connected to metalized pad 1136B for mechanical fastening.

Conductive plane 1144 also has a respective conductor connection clearance 1116A and 1116B to reduce parasitic capacitance between coplanar feed line pair 1008 or 1056 and the conductive plane 1144 in the vicinity of the conductive junction for each conductor connection cutout 1120. In one embodiment, conductor connection clearance 1116 is asymmetrically offset from conductor connection cutout 1120 as shown in FIG. 11A so as to be centered, both horizontally and vertically in either orientation of conductor connection cutout 1120, about a projected intersection of the coplanar feed line pair 1008 or 1056 with the orthogonal substrate instead of being centered about the conductor connection substrate tabs 1016 or 1040 (or centered about the conductor connection cutouts 1120). This centering further minimizes parasitic capacitance between the coplanar feed line pair 1008 or 1056 and the conductive plane 1144. For example, at a target operating frequency of 5.66 GHz, the size of the conductor clearance is equivalent to the distance between conductive plane 1144 and the plane that comprises the transmission line feed structures such as microstrip feed structure portions 1100.

In some embodiments, the microstrip feed structure portion 1100 includes balun elements to connect the balanced coplanar feed line pairs 1008 and 1056 to the unbalanced microstrip lines 1104 and 1148 respectively. Microstrip lines 1104 and 1148 are both located within respective transmission feed line networks. Unbalanced microstrip lines are better suited for large parts of the transmission feed line networks as they have fewer conductors (and avoid crossovers) compared to a balanced structure such as coupled microstrip lines. However, at the actual electrical connection point between the balanced coplanar feed line pair 1008 or 1056 and its respective transmission feed line network, the conductive junction is preferably formed by a connection to a separate balanced microstrip line from each branch of a coplanar feed line pair as described above. Thus, microstrip feed structure portion 1100 needs to at least include balanced microstrip lines at the conductive junction and a balun structure that includes impedance matching between such balanced microstrip lines and unbalanced microstrip line 1104 within the transmission feed line network. In some embodiments, the balun structure includes the microstrip lines 1132 and 1108 and the T-junction 1124 as shown in FIG. 11A. In other embodiments (not shown), discrete components may be used instead to transform balanced microstrip lines at the conductive junction to an unbalanced microstrip line 1104 within the transmission feed line network as is known in the conventional art.

In the embodiment of FIG. 11A, the electrical length of microstrip line 1132 is 90 degrees (or ¼ wavelength) at the desired operating frequency, and the electrical length of microstrip line 1108 is 270 degrees (or ¾ wavelength) at the desired operating frequency. The bends in 1108 provide for the additional electrical length required (180 degrees or ½ wavelength) in a compact arrangement, and also provides a structure that minimizes any distance where microstrip line 1108 runs parallel to other parts of the same trace. Parallel lengths of microstrip line increase undesired electrical coupling effects, which reduces the effectiveness of the balun structure. The T-junction 1124 provides a common connection to both the 90 degree microstrip line 1132 and 270 degree microstrip line 1108.

The feed structure 1100 could alternatively be implemented in a stripline structure as opposed to a microstrip structure shown here if orthogonal backplane substrate 1112 is implemented as a multi-layer PCB.

Figure 11B:
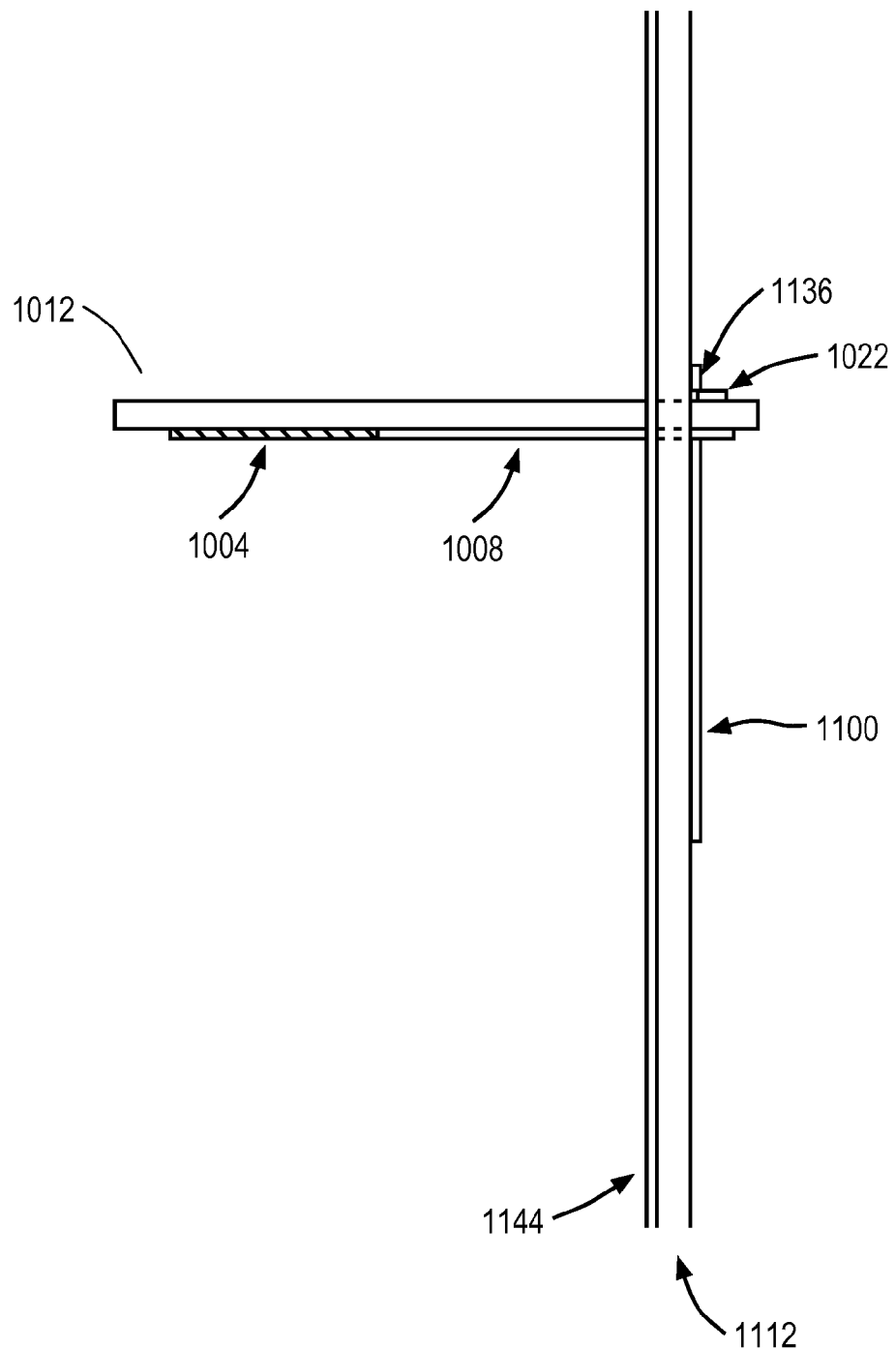
FIG. 11B is a detailed view of an orthogonal interconnection of substrates for a dipole array antenna assembly according to one embodiment of the invention.

FIG. 11B illustrates a cross-sectional view of an exemplary conductive junction between orthogonal substrates 1012 and 1112. In some embodiments, as illustrated in FIG. 11B, the coplanar feed line pair 1008, when assembled, can be easily soldered to the microstrip feed structure portion 1100 to minimize overall feed losses and the metalized pad 1022 can be easily soldered to the metalized pad 1136 to provide additional mechanical ruggedness to the overall assembly.

Figure 12:
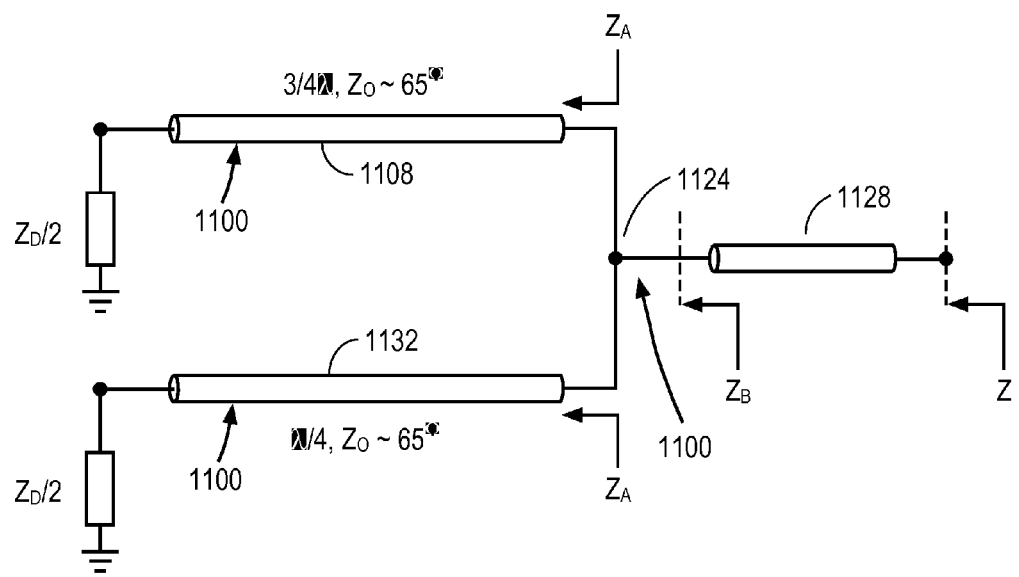
FIG. 12 is a schematic diagram of cascade impedances for a dipole antenna array assembly according to one embodiment of the invention.

FIG. 12 illustrates an equivalent electrical circuit representation of microstrip feed structure portion 1100 for one embodiment. The load impedance, $Z_D$ is the differential impedance of the coplanar feed line pair 1056 or 1008 at the plane where the connection is made to microstrip lines 1132 and 1108. In some embodiments, the driven unitary dipole antenna elements 1000 and driven coplanar dipole elements 1060 are tuned for an input impedance of 100 ohms with the previously described spacing to reflective plane 1144, and the dimensions of coplanar feed line pair 1008 and 1056 are similarly chosen to achieve a characteristic impedance of approximately 100 ohms. This tuning sets load impedance $Z_D$ to approximately 100 ohms. The differential impedance is split evenly between the microstrip lines 1132 and 1108 at the target operating frequency, such that each microstrip line has an effective single-ended load impedance of about 50 ohms. In this exemplary embodiment, each of the microstrip lines 1132 and 1108 has a characteristic impedance of approximately 65 ohms. Microstrip lines 1132 and 1108, both provide for quarter-wavelength impedance transformation and hence transform the 50 ohm load impedance to approximately $65^2/50=85$ ohms, shown as $Z_A$ in FIG. 12. The T-junction 1124 divides the impedance $Z_A$ by a factor of 2, owing to parallel impedances, making $Z_B$ equal to approximately 42 ohms. In some embodiments, an additional microstrip line 1128 is included as a quarter-wavelength impedance transformer, with characteristic impedance of approximately 65 ohms and transforms the load impedance $Z_B$ back to Z=100 ohms, which is convenient for realizing transmission feed line networks for phased array applications. This circuit analysis is reciprocal and applies whether the antenna is receiving or transmitting a signal.

Constraining the microstrip lines 1132 and 1108 to integer lengths of quarter-wavelengths as described above integrates an impedance matching function within the balun. The characteristic impedance of microstrip lines 1132 and 1108 can be set to obtain the desired impedance transformation ratio. In some embodiments, cascading a second quarter-wavelength microstrip line 1128 allows the impedance transformation to be spread over multiple elements, resulting in a more broadband structure than choosing to do the required transformation in only a single element, and provides flexibility to accommodate for variations in element impedance without changing the other elements of the microstrip feed portion 1100.

When conductor connection substrate tabs 1040 and 1016 are inserted into respective conductor connection cutouts 1120, coplanar feed line pair 1008 or 1056 extends a short distance, such as 1 mm in some embodiments, beyond microstrip lines 1108 and 1132. This additional length is necessary to provide adequately large surfaces for reliable solder joints on each branch of coplanar feed line pair 1008 and 1056. This short length of open circuit transmission line creates parasitic capacitance at the conductive junction. The increased spacing 1048 and 1029 results in parasitic inductance near the conductive junction. In one embodiment, the length of the increased spacing 1048 and 1020 is optimized such that the resulting parasitic inductance resonates with the open stub parasitic capacitance, thereby adding no net additional reactance at the conductive junction for the target operating frequency. For example, at a target operating frequency of 5.66 GHz, the length of increased spacing may be 1.25 mm.

Figure 13A:
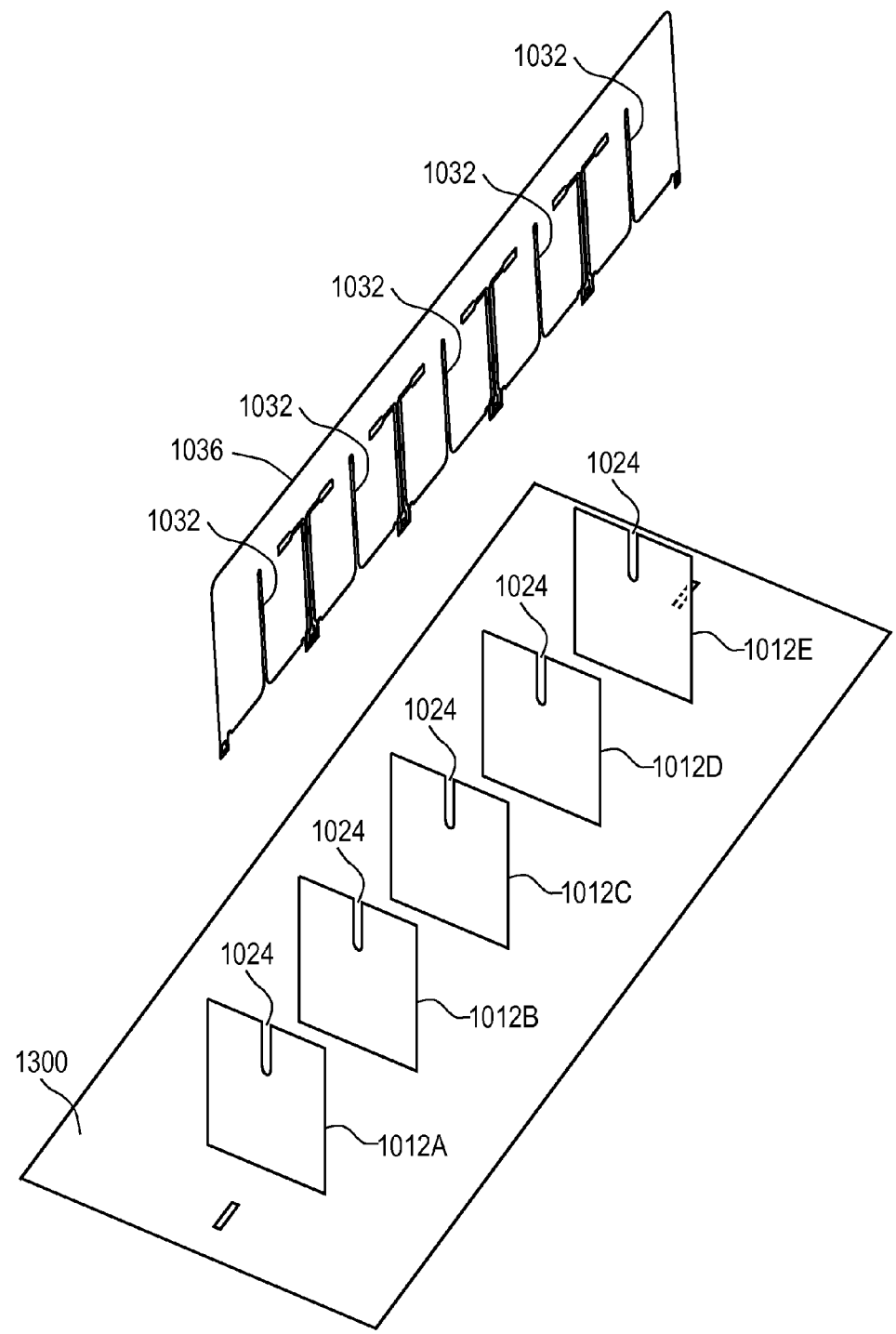
FIG. 13A is an assembly view of a dipole array antenna assembly according to one embodiment of the invention.
Figure 13B:
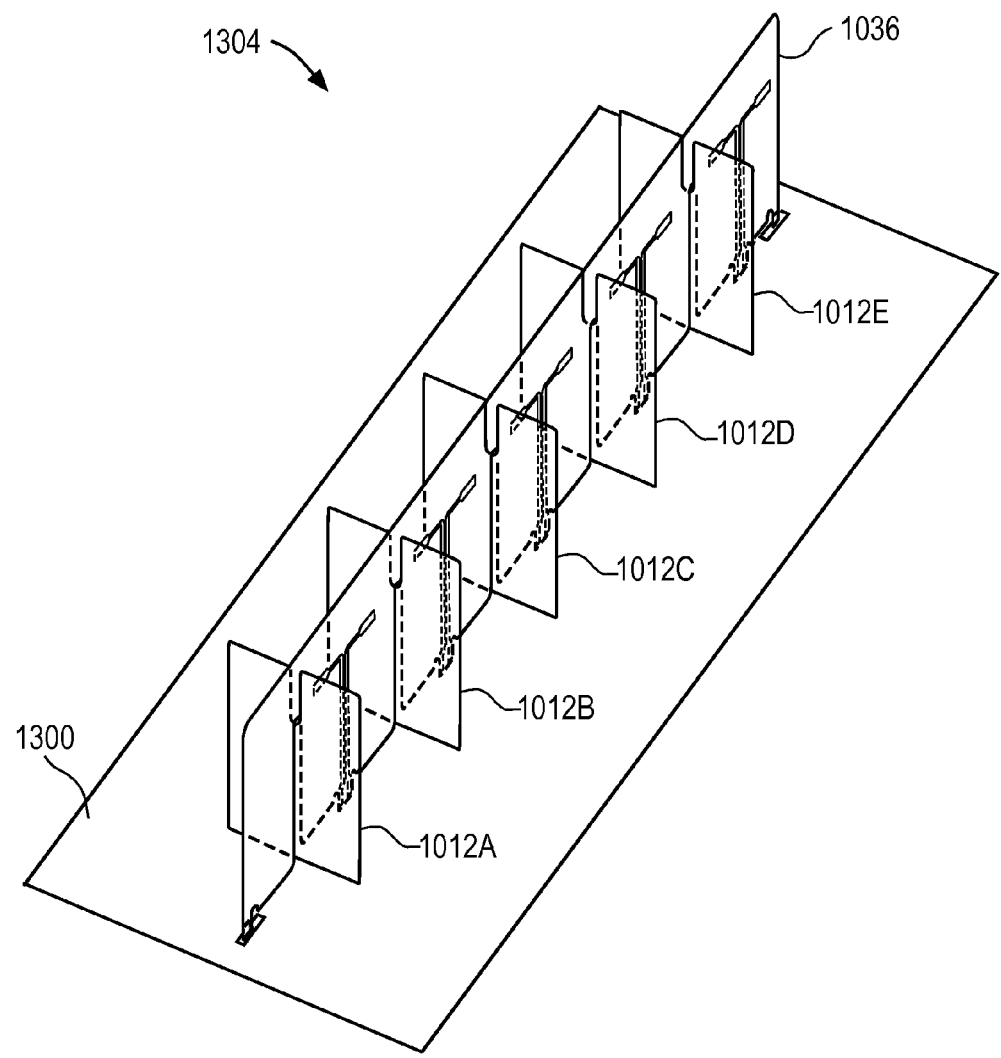
FIG. 13B is an alternative assembly view of a dipole array antenna assembly according to one embodiment of the invention.
Figure 14:
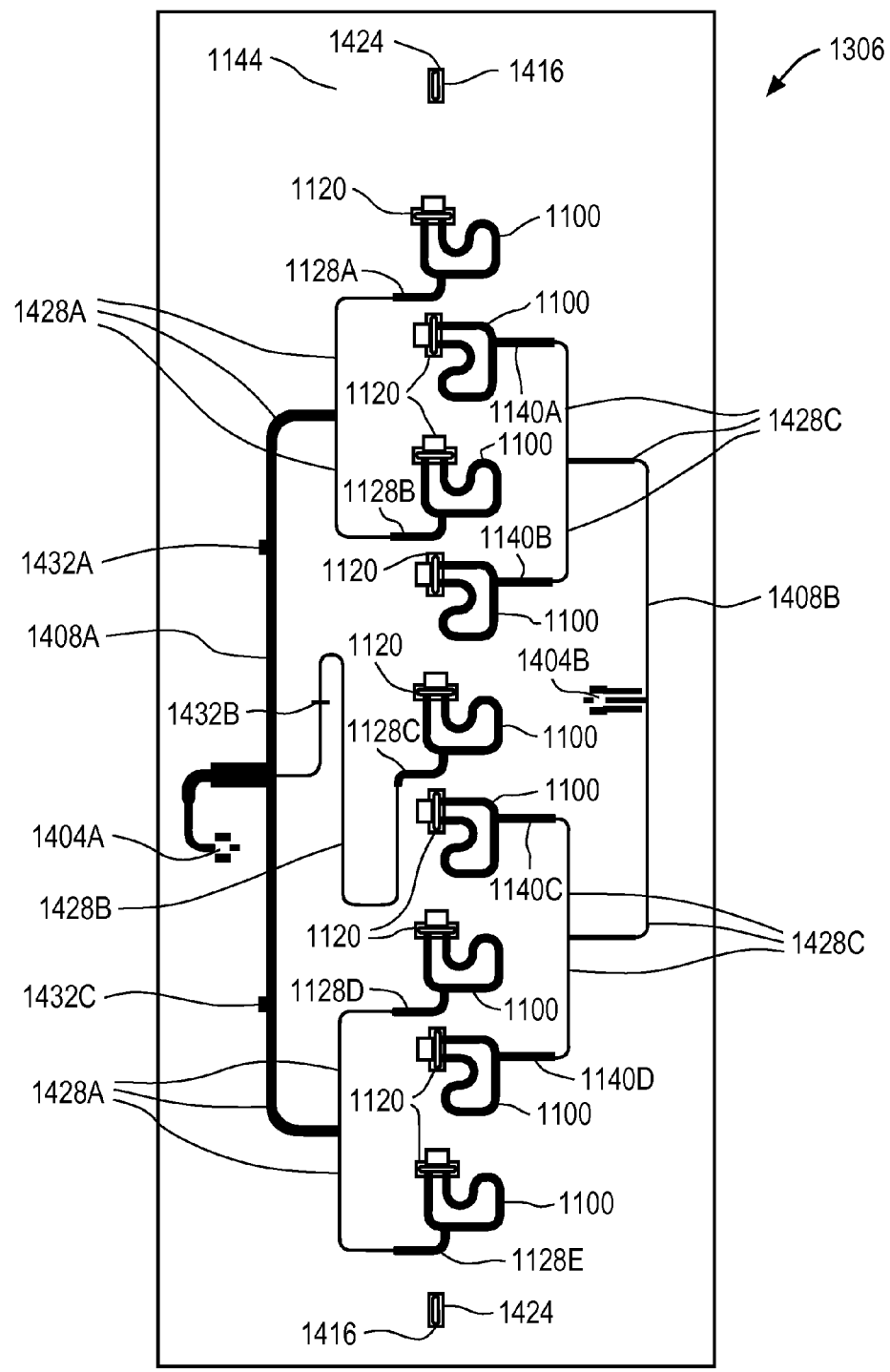
FIG. 14 is a detailed view of first and second layers of the third substrate of a dipole array antenna assembly according to one embodiment of the invention.

FIGS. 13 and 14 illustrate an exemplary dipole array antenna assembly 1304 based on an orthogonal assembly of five first substrates 1012A-E, a second substrate 1036, and a third substrate 1300. Second substrate 1036 contains four instances of coplanar dipole antenna elements 1060A-1060D. Here, the second substrate is used for vertical polarization if the entire antenna assembly 1304 is oriented in a backhaul radio, such as the IBR. The longer dimension of assembly 1304 represents up/down and the smaller dimension represents left/right. Each of the five first substrates 1012A-E contains a unitary dipole antenna element 1000, used here for horizontal polarization given the antenna assembly orientation described above. The third substrate 1300 is the orthogonal backplane substrate 1112 described above with a plurality of conductor connection cutouts 1120, as well as various mechanical connection cutouts. In some embodiments, the third substrate 1300 is a multi-layer substrate having at least two layers. In an exemplary embodiment, the first layer of third substrate 1300 comprises at least the conductive plane 1144 and the respective conductor connection clearances 1116, as well as other slots/clearances associated with mechanical tabs used for mechanical assembly purposes. Also in an exemplary embodiment, the second layer of third substrate 1300 comprises at least the transmission line feed networks including respective microstrip feed structure portions 1100 for each element in the overall array. Thus, dipole array antenna assembly 1304 effectively interleaves vertically and horizontally polarized antenna elements to create a two-port, orthogonally polarized dipole array antenna assembly.

Although two-port, orthogonally polarized dipole array antenna assemblies with crossed dipole elements have been disclosed previously, these conventional antenna assemblies result in a crossed dipole assembly that is more complex, costly, and prone to failure than the novel interleaved array structure described as well as lower performing in terms of antenna efficiency and isolation. FIGS. 13A and 13B further illustrate the functionality of assembly slots 1024 and 1052, which permit the orthogonal, interleaved assembly of substrates 1012 and 1036. Upon assembly, second substrate 1036 effectively captures, retains, and provides additional lateral support for the multiple instances of first substrate 1012. Likewise, the multiple instances of first substrate 1012 provide additional lateral support for substrate 1036. As shown in FIG. 13A, each assembly slot 1052 aligns with a corresponding assembly slot 1024 to set the spacing between successive first substrates in the array and to set the orientation of each first substrate 1012 as orthogonal to the second substrate 1036. In some embodiments, the tabs can be soldered, both for mechanical retention and electrical connectivity, in a single soldering process, to corresponding pads or conductive feed lines on the second layer of the third substrate 1300.

The interleaved arrangement of the dipoles of opposite polarity also achieves very low mutual coupling between the elements of opposite polarity. This is because the symmetric electric field of each element, couples in a common-mode fashion to the dipole elements that are orthogonally polarized. As previously discussed, half-wave dipoles to not resonate in response to a common-mode excitation. There is significant mutual coupling between the elements of a similar polarization, but this coupling, which is deterministically known, can be minimized through proper design of a feed network. It is important to minimize mutual coupling between orthogonally polarized elements, so that the resulting orthogonally polarized antenna arrays do not couple significantly to each other. Mutual coupling between two arrays will reduce the efficiency of each antenna, and also has been shown to increase correlation between the two antennas, resulting in degraded MIMO performance for a backhaul radio that uses such antenna assemblies.

FIG. 14 shows exemplary details of the third substrate 1300 (or orthogonal backplane substrate), which can be realized as a printed circuit board. Third substrate 1300 features a first layer that is a conductive plane 1144, which fulfills several functions including providing a reflective plane for unitary dipole antenna elements 1000 and coplanar dipole antenna elements 1060, and also providing a ground plane for the plurality of microstrip feed structure portions 1100 and the microstrip distribution portions 1428A and 1428B of the first transmission line feed network 1408A and the microstrip distribution portions 1428C of the second transmission line feed network 1408B. Microstrip-based transmission line feed networks 1408A and 1408B connect to unitary dipole antenna elements 1000 and coplanar dipole antenna elements 1060A —1060D, respectively through a plurality of microstrip feed structure portions 1100 as detailed previously in FIGS. 11A and 11B. Each microstrip-based transmission line feed network 1408A and 1408B also comprises a respective feed point 1404A and 1404B and respective microstrip distribution portions 1428A through 1428C as shown in FIG. 14. In some embodiments, additional components such as filters and transmit power amplifiers or receive low noise amplifiers may be located near the feed points 1404A and 1404B to minimize losses and improve isolation performance in view of interconnects such as cables from these dipole array antenna assemblies to the rest of the radio.

FIG. 14 also shows additional cutouts 1416 and metalized pads 1424 where the mechanical tabs 1028 and 1044 are fastened to the third substrate preferably in a single soldering step with the conductor connections to further increase mechanical rigidity and reliability of the overall antenna assembly. FIG. 14 further depicts that for one subset of five of the conductor connection cutouts, each conductor connection cutout 1120 is arranged to align with the conductor connection substrate tabs 1016 of the unitary dipole antenna elements, and that for the other subset of four of the conductor connection cutouts, each conductor connection cutout 1120 is arranged to align with the conductor connection substrate tabs 1040 of the coplanar dipole antenna elements. It will be appreciated that third substrate may have fewer than or more than five conductor connection cutouts in the vertical array subset and fewer than or more than four conductor connection elements in the horizontal array subset.

Horizontally oriented dipoles tend to have a broader pattern beamwidth in elevation than the vertically oriented dipoles. The additional number of elements in the horizontal array compared to the vertical array adds additional array factor gain, such that the resulting elevation beamwidth of the two polarizations is similar. FIG. 14 further illustrates the advantage of the compact size of microstrip feed structure portion 1100, which permits both horizontal and vertical dipole array element interleaving at desirable element spacing, such as, for example 0.65 times the free-space wavelength at the target operating frequency, while leaving adequate room for the remaining transmission feed line network interconnects.

The transmission line feed network 1408B is a corporate feed network providing for uniform and matched group delay excitation of the four vertically oriented coplanar dipole antenna elements 1060. Those skilled in the art will recognize that uniform excitation is commonly used to denote equal amplitude excitation amongst antenna elements, and that the matched group delay excites the elements in the same relative phase. Owing to the 2^N number of elements (here N=2, or hence 4 elements), matched group delay from common feed point 1404B to each coplanar dipole antenna element 1060, and uniform excitation of each coplanar dipole antenna element 1060 is achieved via the symmetry of microstrip distribution portions 1428C. In this exemplary embodiment, the quarter-wavelength microstrip lines 1128 are adjusted differently depending on whether the associated coplanar dipole element 1060 is an outer antenna element in the array or an inner antenna element in the array. This custom tuning is necessary to ensure the desired uniform, phase-aligned excitation of the plurality of coplanar dipole antenna elements 1060.

The transmission line feed network 1408A is also a uniformly excited, matched group delay corporate feed network, but the uneven number of unitary dipole elements 1000 necessitates the inclusion of microstrip distribution portion 1428B which includes additional bends and length necessary to achieve the desired matched group delay from common feed point 1404A to each unitary dipole element 1000. The quarter-wavelength microstrip line 1128 that couples to microstrip distribution portion 1428B is also uniquely shaped to accommodate the bends of microstrip portion 1428B whilst also providing tuning for uniform excitation. Open stub tuning feature 1432 corrects for parasitic effects introduced in the feed network owing to the undesired coupling between parallel lengths of line and undesired parasitic capacitance at bends in the microstrip distribution portions 1428A and 1428B. This open stub tuning feature 1432 further ensures the desired uniform, phase-aligned excitation of the plurality of unitary dipole antenna elements 1000.

Uniform and phase-aligned excitation of antenna elements in an array assembly is known to achieve the maximum realizable far-field directive antenna gain pattern in the broadside direction; however, in some embodiments, non-uniform, and/or non-phase-aligned excitation may be preferable. Both the amplitude and relative phase of each antenna element can be adjusted to optimize some desired characteristic of the antenna array assembly, such as side lobe levels, peak gain orientation, and isolation to nearby antenna assemblies. These parameters may also be dynamically adjustable by including tuning elements within microstrip distribution portions 1428A, 1428B, and 1428C. In particular, adaptive control of the phase, and or amplitude, of either each individual antenna element, or a subset of antenna elements, can be used to dynamically tune both near-field and far-field coupling to an adjacently located antenna assembly to achieve maximum port-to-port isolation between the two antenna assemblies.

In some applications it may be desirable to conform to an EIRP (effective isotropic radiated power) elevation mask, and in this case it is beneficial to shape the transmit antenna far-field radiation pattern, either statically or dynamically, to minimize the transmitted EIRP in the vertical direction. This shaping can be achieved by altering the relative phase and/or the amplitude excitation of each antenna element in the exemplary antenna array assemblies.

One exemplary embodiment for achieving far-field radiation pattern shaping is by tapering the amplitude excitement of the individual antenna elements within the array assembly by some pattern as a function of the location of the antenna element in the array assembly. A tapered amplitude excitation, wherein the inner antenna elements in an antenna array assembly are driven with higher relative amplitude than the outer antenna elements, is known to achieve lower far-field antenna pattern side lobe levels than the equivalent array assembly with uniform excitation. Microstrip lines 1140A to 1140B and 1128A to 1128B can be used to control the input impedances of each element in the dipole array antenna assembly as seen by transmission line feed networks 1408A and 1408B. This impedance can be adjusted to control the relative amplitude excitation of the elements, providing the desired tapered amplitude excitation, and in turn, the desired far-field antenna radiation pattern side lobe suppression. Similarly, these amplitude tapers can be applied to the aperture-fed patch element array described herein.

Another exemplary embodiment for far-field antenna radiation pattern shaping is via a progressive relative phase shift in the relative excitation of each antenna element in the array antenna assembly. A progressive relative phase shift between the antenna elements of an antenna array assembly is known to scan the main beam of the far-field antenna radiation pattern in an angular sense. The lengths of microstrip line distribution portions 1428 can be adjusted to vary the relative phase excitation of each element. Alternatively, electronic phase shifters can be inserted into microstrip line distribution portions 1428 to dynamically vary the individual antenna element relative phase excitation. The ability to dynamically scan the main beam in a downward direction can help conform to the EIRP elevation mask in response to changes in elevation alignment of the IBR. Similarly, these progressive relative phase shifts can be applied to the aperture-fed patch element array described herein.

For example, if the IBR is installed with a tilt angle upwards towards the sky then a sensor such as based on a multi-axis accelerometer can determine the amount of upward tilt and then a controller, such as the RRC, can provide or cause to be provided certain control signals to the antenna array assembly, whether based on aperture-fed patch elements or substrate tab connected dipole elements or otherwise, so that the main beam is either adjusted in a downward direction or has additional sidelobe suppression applied, thereby either optimizing link performance and/or conforming with a regulatory domain elevation mask EIRP limit at a particular elevation angle.

In one embodiment, the use of progressive relative phase shifts and/or amplitude tapers between either aperture-fed patch elements or substrate tab connected dipole elements that can be dynamically altered is applied based on a tilt sensor input to ensure that the maximum EIRP above an upward elevation such as 30 degrees or higher is at least 13 dB lower than the maximum EIRP at zero degrees elevation angle, or alternatively to ensure that the maximum EIRP above an upward elevation such as 30 degrees or higher is not greater than a prescribed limit such as +23 dBm. In other embodiments, the IBR uses the tilt sensor input and the known characteristics of a particular antenna assembly far-field radiation pattern to limit the maximum conducted power into the antenna assembly to ensure that the maximum EIRP above an upward elevation such as 30 degrees or higher is not greater than a prescribed limit such as +23 dBm.

In the example described herein with five elements in the horizontal array and four elements in the vertical array operating at a target frequency of 5660 MHz and with the dipole element dimensions described above, the dipole array antenna assembly achieves port-to-port isolation of more than 35 dB across the operating band of 5470 MHz to 5850 MHz, a vertically polarized far-field radiation pattern with 11.1 dB gain, 19.5 degree vertical beamwidth, 120.1 degree horizontal beamwidth, −0.75 dB radiation efficiency, and a second horizontally polarized far-field radiation pattern with 11.5 dB gain, 16.7 degree vertical beamwidth, 122.7 degree horizontal beamwidth, and −0.75 dB radiation efficiency.

Numerous additional variations of the above-described elements of the IBR and antennas can also be advantageously utilized in substitution for or in combination with the exemplary embodiments described above. For example, in certain embodiments the aperture-fed patch array antenna assemblies are used as directive gain antenna elements that can be coupled to receive RF chains and the dipole array antenna assemblies are used as directive gain antenna elements that can be coupled to transmit RF chains. In other exemplary embodiments, the aperture-fed patch array antenna assemblies are used as directive gain antenna elements that can be coupled to both receive RF chains and transmit RF chains, typically wherein a first subset of such antenna assemblies is configured for receive usage and a second subset is configured for transmit usage. When an aperture-fed patch array antenna assembly is configured for transmit usage, active components such as power amplifiers and filters may also be integrated into such antenna assemblies preferably with minimal loss between the feed points and the power amplifiers.

One or more of the methodologies or functions described herein may be embodied in a computer-readable medium on which is stored one or more sets of instructions (e.g., software). The software may reside, completely or at least partially, within memory and/or within a processor during execution thereof. The software may further be transmitted or received over a network.

The term "computer-readable medium" should be taken to include a single medium or multiple media that store the one or more sets of instructions. The term "computer-readable medium" shall also be taken to include any medium that is capable of storing, encoding or carrying a set of instructions for execution by a machine and that cause a machine to perform any one or more of the methodologies of the present invention. The term "computer-readable medium" shall accordingly be taken to include, but not be limited to, solid-state memories, and optical and magnetic media.

Embodiments of the invention have been described through functional modules at times, which are defined by executable instructions recorded on computer readable media which cause a computer, microprocessors or chipsets to perform method steps when executed. The modules have been segregated by function for the sake of clarity. However, it should be understood that the modules need not correspond to discrete blocks of code and the described functions can be carried out by the execution of various code portions stored on various media and executed at various times.

It should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The invention has been described in relation to particular examples, which are intended in all respects to be illustrative rather than restrictive. Those skilled in the art will appreciate that many different combinations of hardware, software, and firmware will be suitable for practicing the present invention. Various aspects and/or components of the described embodiments may be used singly or in any combination. It is intended that the specification and examples be considered as exemplary only, with a true scope and spirit of the invention being indicated by the claims.

What is claimed is:

1. An antenna assembly comprising: a first substrate comprising:
   a plurality of first substrate conductive patch elements; a second substrate comprising:
   a first layer with at least a conductive ground plane and a plurality of pairs of apertures, wherein a number of the plurality of pairs of apertures is equal to a number of the plurality of first substrate conductive patch elements; and
   a second layer with at least a first transmission line feed network coupled to a first feed point and a second transmission line feed network coupled to a second feed point; a third substrate comprising:
   a plurality of third substrate conductive patch elements, wherein a number of the plurality of third substrate conductive patch elements is equal to the number of the plurality of first substrate conductive patch elements;
   a first spacer interposed between the third substrate and the second substrate, the first spacer comprising a dielectric material and at least one first spacer opening in the dielectric material, wherein the dielectric material is absent within the at least one first spacer opening; and
   a second spacer interposed between the first substrate and the third substrate, the second spacer comprising a dielectric material and at least one second spacer opening in the dielectric material, wherein the dielectric material is absent within the at least one second spacer opening;

wherein the first transmission line feed network overlaps a first aperture of each pair of the plurality of pairs of apertures and the second transmission line feed network overlaps a second aperture of each pair of the plurality of pairs of apertures;

wherein the first aperture of each pair of the plurality of pairs of apertures electromagnetically couples the first transmission line feed network and the second aperture of each pair of the plurality of pairs of apertures electromagnetically couples the second transmission line feed network to at least a respective one of the plurality of third substrate conductive patch elements; and wherein the first aperture of each pair of the plurality of pairs of apertures is orthogonal to the second aperture of each pair of the plurality of pairs of apertures; and wherein the first aperture of each pair of the plurality of pairs of apertures excites a respective stacked resonant radiating antenna element formed amongst each respective one of the plurality of first substrate conductive patch elements, each respective one of the plurality of third substrate conductive patch elements and the conductive ground plane in an electromagnetic mode corresponding to a vertical polarization far-field pattern, and wherein the second aperture of each pair of the plurality of pairs of apertures excites said respective stacked resonant radiating antenna element in an electromagnetic mode corresponding to a horizontal polarization far-field pattern.

2. The antenna assembly of claim 1, wherein the first substrate is formed from a printed circuit board.

3. The antenna assembly of claim 1, wherein the second substrate is formed from a printed circuit board.

4. The antenna assembly of claim 3, wherein the second substrate is formed from a printed circuit board comprising more than two layers.

5. The antenna assembly of claim 4, wherein the first transmission line feed network and the second transmission line feed network each comprise striplines.

6. The antenna assembly of claim 1, wherein the first transmission line feed network and the second transmission line feed network each comprise microstrip lines.

7. The antenna assembly of claim 1, wherein the first feed point and the second feed point are each coupled to respective components on an outside layer of the second substrate.

8. The antenna assembly of claim 7, wherein the respective components are at least one of an RF bandpass filter or a low noise amplifier within a receiver.

9. The antenna assembly of claim 1, wherein the at least one first spacer opening extends beyond a projected area of one or more of the plurality of third substrate conductive patch elements by at least a distance equal to a thickness of the first spacer.

10. The antenna assembly of claim 1, further comprising a plurality of plastic fasteners to hold the first substrate, the second substrate, the third substrate, the first spacer and the second spacer together.

11. The antenna assembly of claim 1, wherein the first aperture of each respective pair of the plurality of pairs of apertures is oriented relative to the second aperture of each respective pair of the plurality of pairs of apertures in a T-shape.

12. The antenna assembly of claim 1, wherein each of the first aperture and the second aperture of each respective pair of the plurality of pairs of apertures comprises an aperture body, wherein the aperture body is a rectangular aperture body with an aperture body width, and wherein each of the first aperture and the second aperture of each respective pair of the plurality of pairs of apertures further comprises a pair of aperture ends with an aperture end width.

13. The antenna assembly of claim 12, wherein each aperture end comprises a rectangular end and a semi-circular end with a radius equal to one half of the aperture end width.

14. The antenna assembly of claim 13, wherein the aperture end width is at least five times greater than the aperture body width.

15. The antenna assembly of claim 12, wherein each aperture end is tapered or rounded.

16. The antenna assembly of claim 13, wherein the rectangular end has a width equal to the aperture end width and a thickness equal to one sixth of the aperture end width.

17. The antenna assembly of claim 12, wherein the aperture end width is equal to one third of an aperture length.

18. The antenna assembly of claim 12, wherein the first transmission line feed network is terminated by a first via to the conductive ground plane after a feedline portion of the first transmission line feed network crosses over the rectangular aperture body of the first aperture of each pair of the plurality of pairs of apertures, and wherein the second transmission line feed network is terminated by a second via to the conductive ground plane after a feedline portion of the second transmission line feed network crosses over the rectangular aperture body of the second aperture of each pair of the plurality of pairs of apertures.

19. The antenna assembly of claim 1, wherein the plurality of first substrate conductive patch elements is arranged in a first array with a plurality of first substrate rows wherein each first substrate row comprises at least one first substrate conductive patch element, and wherein the plurality of third substrate conductive patch elements is arranged in a third array with a plurality of third substrate rows wherein each third substrate row comprises at least one third substrate conductive patch element.

20. The antenna assembly of claim 1, wherein the plurality of first substrate conductive patch elements is arranged in a first array with a plurality of first substrate rows and one or more first substrate columns wherein each first substrate row comprises a number of first substrate conductive patch elements equal to the number of first substrate columns, and wherein the plurality of third substrate conductive patch elements is arranged in a third array with a plurality of third substrate rows and one or more third substrate columns wherein each third substrate row comprises a number of third substrate conductive patch elements equal to the number of third substrate columns.

21. The antenna assembly of claim 20, wherein the number of first substrate columns is equal to two, and wherein the number of third substrate columns is equal to two.

22. The antenna assembly of claim 21, wherein a first feedline portion of the first transmission line feed network crosses over a rectangular aperture body of the first aperture of each pair of the plurality of pairs of apertures in a first direction for each first aperture that excites each respective stacked resonant radiating antenna element formed amongst each respective one of the plurality of first substrate conductive patch elements, each respective one of the plurality of third substrate conductive patch elements and the conductive ground plane for said stacked resonant radiating antenna elements arranged in a first column of said stacked resonant radiating antenna elements and a second feedline portion of the first transmission line feed network crosses over a rectangular aperture body of the first aperture of each pair of the plurality of pairs of apertures in a second direction for each first aperture that excites each respective stacked resonant radiating antenna element formed amongst each respective one of the plurality of first substrate conductive patch elements, each respective one of the plurality of third substrate conductive patch elements and the conductive ground plane for said stacked resonant radiating antenna elements arranged in a second column of said stacked resonant radiating antenna elements, and wherein the second direction is opposite to the first direction.

23. The antenna assembly of claim 22, wherein the second feedline portion is electrically longer than the first feedline portion by a distance equivalent to 180 degrees in phase at a target operating frequency for the antenna assembly.

24. The antenna assembly of claim 23, wherein a third feedline portion of the second transmission line feed network crosses over a rectangular aperture body of the second aperture of each pair of the plurality of pairs of apertures in a third direction for each second aperture that excites each respective stacked resonant radiating antenna element formed amongst each respective one of the plurality of first substrate conductive patch elements, each respective one of the plurality of third substrate conductive patch elements and the conductive ground plane for said stacked resonant radiating antenna elements arranged in the first column of said stacked resonant radiating antenna elements and a fourth feedline portion of the second transmission line feed network crosses over a rectangular aperture body of the second aperture of each pair of the plurality of pairs of apertures in a fourth direction for each second aperture that excites each respective stacked resonant radiating antenna element formed amongst each respective one of the plurality of first substrate conductive patch elements, each respective one of the plurality of third substrate conductive patch elements and the conductive ground plane for said stacked resonant radiating antenna elements arranged in the second column of said stacked resonant radiating antenna elements, and wherein the third direction is the same as the fourth direction.

25. The antenna assembly of claim 24, wherein the third feedline portion is equivalent in electrical length to the fourth feedline portion.

26. The antenna assembly of claim 19, wherein each of the first transmission line feed network and the second transmission line feed network comprises at least one meandering line portion.

27. The antenna assembly of claim 26, wherein each meandering line portion comprises one or more bends, and wherein an electrical length of each meandering line portion matches a group delay from the respective first or second feed point to at least one of the respective first or second apertures with that of another group delay from the respective first or second feed point to at least one other of the respective first or second apertures.

28. The antenna assembly of claim 19, wherein each of the first transmission line feed network and the second transmission line feed network comprises at least one tunable element.

29. The antenna assembly of claim 28, wherein an input signal applied to at least one tunable element adjusts at least one characteristic of the antenna assembly, said characteristic being at least one selected from the group consisting of a far-field radiation pattern, a coupling between the first feed point and the second feed point, and a coupling to one or more nearby antennas.

30. The antenna assembly of claim 1, wherein the second layer of the second substrate contains two feed points and two transmission line feed networks.

31. The antenna assembly of claim 1, wherein the third substrate is formed from a printed circuit board.

32. The antenna assembly of claim 1, wherein at least one of the plurality of third substrate conductive patch elements is located on a surface of the third substrate facing the at least one first spacer opening.

33. The antenna assembly of claim 1, wherein at least one of the plurality of third substrate conductive patch elements is located on a surface of the third substrate facing the at least one second spacer opening.

34. The antenna assembly of claim 1, wherein at least one of the plurality of third substrate conductive patch elements is located on both surfaces of the third substrate.

35. The antenna assembly of claim 1, wherein the number of the plurality of first substrate conductive patch elements located on the first substrate equals a number of all conductive patch elements located on the first substrate.

36. The antenna assembly of claim 1, wherein the number of the plurality of pairs of apertures located on the first layer of the second substrate equals a number of all pairs of apertures located on the first layer of the second substrate.

37. The antenna assembly of claim 1, wherein the number of the plurality of third substrate conductive patch elements located on the third substrate equals a number of all conductive patch elements located on the third substrate.

38. The antenna assembly of claim 1, wherein each one of the plurality of third substrate conductive patch elements located on the third substrate is concentric with a respective one of the plurality of first substrate conductive patch elements located on the first substrate.

39. The antenna assembly of claim 1, wherein each one of the plurality of third substrate conductive patch elements located on the third substrate is coincident with a projection of a respective one of the plurality of first substrate conductive patch elements located on the first substrate.

40. The antenna assembly of claim 1, wherein each one of the plurality of first substrate conductive patch elements located on the first substrate is larger in projected area than a respective one of the plurality of third substrate conductive patch elements located on the third substrate.

41. The antenna assembly of claim 1, wherein each one of the plurality of first substrate conductive patch elements located on the first substrate and each one of the plurality of third substrate conductive patch elements located on the third substrate is circular.

42. The antenna assembly of claim 41, wherein each one of the plurality of first substrate conductive patch elements located on the first substrate is 10% larger in diameter than each respective one of the plurality of third substrate conductive patch elements located on the third substrate.

43. The antenna assembly of claim 1, wherein the third substrate is formed from a dielectric film material.

44. The antenna assembly of claim 1, wherein the first substrate is formed from a dielectric film material.

45. The antenna assembly of claim 1, wherein the third substrate is formed from a dielectric film material and the first substrate is formed from a dielectric film material.

46. The antenna assembly of claim 1, wherein the third substrate is formed from a dielectric film material and the first substrate is formed from a printed circuit board.

47. The antenna assembly of claim 43, wherein the dielectric film material comprises polyimide.

48. The antenna assembly of claim 43, wherein at least one of the plurality of third substrate conductive patch elements is formed by a copper deposition process.

49. The antenna assembly of claim 48, wherein the copper deposition process comprises copper sputtering.

50. The antenna assembly of claim 43, wherein at least one of the plurality of third substrate conductive patch elements is formed as an etched copper element.

51. The antenna assembly of claim 43, wherein the thickness of the dielectric film material is 0.1 mm.

52. The antenna assembly of claim 1, wherein the first aperture of each pair of the plurality of pairs of apertures excites a respective stacked resonant radiating antenna element formed amongst each respective one of the plurality of first substrate conductive patch elements, each respective one of the plurality of third substrate conductive patch elements and the conductive ground plane in an electromagnetic mode corresponding to a first 45-degree far-field pattern, and wherein the second aperture of each pair of the plurality of pairs of apertures excites said respective stacked resonant radiating antenna element in an electromagnetic mode corresponding to a second 45-degree far-field pattern that is orthogonal to the first 45-degree far-field pattern.

53. The antenna assembly of claim 10, wherein the plastic fasteners are rivets.

54. The antenna assembly of claim 1, wherein the first spacer has one first spacer opening.

55. The antenna assembly of claim 1, wherein the first spacer has a number of first spacer openings equal to one quarter or one half of the number of the plurality of third substrate conductive patch elements.

56. The antenna assembly of claim 41, wherein each one of the first spacer openings is circular and the first spacer has a number of first spacer openings equal to the number of the plurality of third substrate conductive patch elements.

57. The antenna assembly of claim 1, wherein the first spacer is identical to the second spacer.

58. The antenna assembly of claim 1, wherein a plurality of respective stacked resonant radiating antenna elements formed amongst each respective one of the plurality of first substrate conductive patch elements, each respective one of the plurality of third substrate conductive patch elements and the conductive ground plane, a plurality of respective first apertures from each respective pair of the plurality of pairs of apertures and the first transmission line feed network form a first phased array antenna.

59. The antenna assembly of claim 58, wherein the plurality of respective stacked resonant radiating antenna elements, a plurality of respective second apertures from each respective pair of the plurality of pairs of apertures and the second transmission line feed network form a second phased array antenna.

60. The antenna assembly of claim 20, wherein the number of first substrate columns is equal to one, and wherein the number of third substrate columns is equal to one.

61. The antenna assembly of claim 20, wherein the number of first substrate rows is equal to four, and wherein the number of third substrate rows is equal to four.

62. The antenna assembly of claim 1, wherein the first layer of the second substrate further comprises at least one drilled hole suitable for assembly and not suitable as an additional aperture.

63. The antenna assembly of claim 12, wherein each aperture body of a first aperture and a second aperture of at least one pair of the plurality of pairs of apertures has a long axis parallel to the long dimension of the aperture and in the plane of the conductive ground plane and a narrow axis parallel to the narrow dimension of the aperture and in the plane of the conductive ground plane, and wherein one of either the first aperture or the second aperture of said at least one pair of the plurality of pairs of apertures is shifted significantly along its long axis from a center relative to its respective one of the plurality of third substrate conductive patch elements and an other one of either the first aperture or the second aperture of said at least one pair of the plurality of pairs of apertures is shifted slightly along its narrow axis from said center relative to its respective one of the plurality of third substrate conductive patch elements.

64. The antenna assembly of claim 63, wherein the one of either the first aperture or the second aperture of said at least one pair of the plurality of pairs of apertures that is shifted significantly along its long axis from said center relative to its respective one of the plurality of third substrate conductive patch elements is shifted at least by a distance at least two times that of a distance shifted by said other one of either the first aperture or the second aperture of said at least one pair of the plurality of pairs of apertures that is shifted slightly along its narrow axis from said center relative to its respective one of the plurality of third substrate conductive patch elements.

65. The antenna assembly of claim 64, wherein the distance that the one of either the first aperture or the second aperture of said at least one pair of the plurality of pairs of apertures that is shifted significantly along its long axis from said center relative to its respective one of the plurality of third substrate conductive patch elements is shifted by is 5.5 mm and the distance that said other one of either the first aperture or the second aperture of said at least one pair of the plurality of pairs of apertures that is shifted slightly along its narrow axis from said center relative to its respective one of the plurality of third substrate conductive patch elements is shifted by is 2.5 mm.

66. The antenna assembly of claim 1, wherein each of the first aperture and the second aperture of each respective pair of the plurality of pairs of apertures comprises an aperture body, wherein the first transmission line feed network is terminated by a first via to the conductive ground plane after a feedline portion of the first transmission line feed network crosses over the aperture body of the first aperture of each pair of the plurality of pairs of apertures, and wherein the second transmission line feed network is terminated by a second via to the conductive ground plane after a feedline portion of the second transmission line feed network crosses over the aperture body of the second aperture of each pair of the plurality of pairs of apertures.

* * * * *